United States Patent
Clark et al.

(10) Patent No.: US 12,485,875 B2
(45) Date of Patent: *Dec. 2, 2025

(54) SYSTEMS AND METHODS FOR PREDICTIVE POWER REQUIREMENTS AND CONTROL

(71) Applicant: Deere & Company, Moline, IL (US)

(72) Inventors: Scott N. Clark, Bettendorf, IA (US); Nathan R. Vandike, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/085,737

(22) Filed: Mar. 20, 2025

(65) Prior Publication Data
US 2025/0242792 A1     Jul. 31, 2025

Related U.S. Application Data

(63) Continuation of application No. 17/716,302, filed on Apr. 8, 2022, now Pat. No. 12,358,493.

(51) Int. Cl.
| | |
|---|---|
| *B60W 20/13* | (2016.01) |
| *A01D 41/127* | (2006.01) |
| *B60W 10/06* | (2006.01) |
| *B60W 10/08* | (2006.01) |
| *B60W 10/30* | (2006.01) |
| *G05B 13/04* | (2006.01) |

(52) U.S. Cl.
CPC .......... *B60W 20/13* (2016.01); *A01D 41/127* (2013.01); *B60W 10/06* (2013.01); *B60W 10/08* (2013.01); *B60W 10/30* (2013.01); *G05B 13/048* (2013.01); *B60W 2300/158* (2013.01); *B60W 2510/244* (2013.01); *B60W 2552/00* (2020.02); *B60W 2556/40* (2020.02)

(58) Field of Classification Search
CPC ...... B60W 20/13; B60W 10/06; B60W 10/08; B60W 10/30; B60W 2552/00; B60W 2556/40; B60W 2300/158; B60W 2510/244; A01D 41/127; G05B 13/048
See application file for complete search history.

(56) References Cited

U.S. PATENT DOCUMENTS

| | | | |
|---|---|---|---|
| 12,358,493 B2 * | 7/2025 | Clark | G05B 13/048 |
| 12,386,354 B2 * | 8/2025 | Vandike | A01B 79/005 |

* cited by examiner

*Primary Examiner* — Huan Le
(74) *Attorney, Agent, or Firm* — Kelly, Holt & Christenson; Joseph R. Kelly

(57) ABSTRACT

An agricultural system includes a control system. The control system obtains an input value of a characteristic corresponding to a geographic location. The control system further obtains a predictive power model, the predictive power model modeling a relationship between values of the characteristic and values of a power characteristic and configured to receive the input value of the characteristic corresponding to the geographic location and output an output value of the power characteristic corresponding to the geographic location. The control system generates a control signal to control a controllable subsystem of a mobile agricultural machine based on the output value of the power characteristic.

20 Claims, 19 Drawing Sheets

SYSTEMS AND METHODS FOR PREDICTIVE POWER REQUIREMENTS AND CONTROL

The present application is a continuation of and claims priority of U.S. patent application Ser. No. 17/716,302, filed Apr. 8, 2022, the content of which is hereby incorporated by reference in its entirety.

FIELD OF THE DESCRIPTION

The present descriptions relates to mobile agricultural machines, particularly mobile agricultural harvesting machines configured to harvest crop at a field.

BACKGROUND

There are a wide variety of different types of agricultural machines. Some agricultural machines include agricultural harvesters, such as combine harvesters, sugar cane harvesters, cotton harvesters, self-propelled forage harvesters, and windrowers. Some harvesters can also be fitted with different types of heads to harvest different types of crops.

The agricultural harvesters can have on-board power plants that power various components of the agricultural harvesters.

The discussion above is merely provided for general background information and is not intended to be used as an aid in determining the scope of the claimed subject matter.

SUMMARY

An agricultural harvesting system includes a control system. The control system identifies a predictive value of a power characteristic based on a relationship between the power characteristic and a characteristic. The control system generates a control signal to control a controllable subsystem of a mobile hybrid agricultural harvesting machine based on the predictive value of the power characteristic.

Example 1 is an agricultural harvesting system comprising:
  a control system that:
  identifies a value of a power characteristic based on a relationship between a characteristic and the power characteristic;
  generates a control signal to control a controllable subsystem of a mobile hybrid harvesting machine based on the relationship.

Example 2 is the agricultural harvesting system of any or all previous examples, wherein the relationship is a predefined relationship that is configured to receive, as an input, a value of the characteristic, and provide, as an output, the value of the power characteristic.

Example 3 is the agricultural harvesting system of any or all previous examples and further comprising:
  an in-situ power sensor that detects a value of the power characteristic corresponding to a geographic location;
  a processing system that generates a value of the characteristic corresponding to the geographic location, based on sensor data from an in-situ sensor that detects the characteristic; and
  a predictive model generator that generates, as the relationship, a predictive power model that models a relationship between values of the characteristic and values of the power characteristic based on the value of the power characteristic detected by the in-situ sensor corresponding to the geographic location and the value of the characteristic, generated by the processing system, corresponding to the geographic location.

Example 4 is the agricultural harvesting system of any or all previous examples and further comprising:
  an in-situ sensor that detects a value of the power characteristic corresponding to a geographic location;
  a predictive model generator that:
  receives an information map that maps values of the characteristic corresponding to different geographic locations; and
  generates, as the relationship, a predictive power model that models a relationship between values of the characteristic and values of the power characteristic based on the value of the power characteristic detected by the in-situ sensor corresponding to the geographic location and a value of the characteristic corresponding to the geographic location to which the detected value of the power characteristic corresponds; and
  a predictive map generator that generates a functional predictive power map of the field that maps predictive values of the power characteristic to the different geographic locations in the field, based on the values of the characteristic in the information map and based on the predictive power model; and
  wherein the control system generates the control signal based on the functional predictive power map.

Example 5 is the agricultural harvesting system of any or all previous examples, wherein the control system is configured to identify a predictive auxiliary operation location indicative of a location where an auxiliary operation is likely to be performed at a field.

Example 6 is the agricultural harvesting system of any or all previous examples, wherein the control system is configured to identify, as the value of the power characteristic, a power requirement value indicative of an amount of power required by the mobile hybrid harvesting machine.

Example 7 is the agricultural harvesting system of any or all previous examples, wherein the controllable subsystem comprises a hybrid powerplant subsystem, and wherein the control signal controls the hybrid powerplant subsystem to adjust a power output of the hybrid powerplant subsystem.

Example 8 is the agricultural harvesting system of any or all previous examples, wherein the controllable subsystem comprises a hybrid powerplant subsystem, and wherein the control signal controls the hybrid powerplant subsystem to charge an electrical storage device.

Example 9 is the agricultural harvesting system of any or all previous examples, wherein the controllable subsystem comprises a hybrid powerplant subsystem, and wherein the control signal controls the hybrid powerplant subsystem to discharge stored energy from an electrical storage device.

Example 10 is a method of controlling a mobile hybrid harvesting machine comprising:
  obtain a value of a characteristic;
  identifying a predictive value of a power characteristic based on the obtained value of the characteristic and a relationship between the characteristic and the power characteristic; and
  controlling the mobile hybrid harvesting machine based on the predictive value of the power characteristic.

Example 11 is the method of any or all previous examples, wherein obtaining the model comprises obtaining a predefined model that provides the predictive value of the power characteristic based on a value of the characteristic.

12. The method of claim 10, wherein obtaining the value of the characteristic comprises detecting a value of the characteristic corresponding to a geographic location, the method further comprising:
  detecting a value of the power characteristic corresponding to the geographic location;
  generating, as the relationship, a predictive model that models a relationship between the characteristic and the power characteristic based on the detected value of the power characteristic corresponding to the geographic location and the detected value of the characteristic corresponding to the geographic location, the predictive model configured to receive, as a model input, a value of the characteristic and generate, as a model output, the predictive value of the power characteristic.

13. The method of claim 10 wherein obtaining the value of the characteristic comprises receiving an information map that maps values of the characteristic to different geographic locations in a field, the method further comprising:
  detecting, with an in-situ sensor, a value of the power characteristic corresponding to a geographic location in the field;
  generating, as the relationship, a predictive model that models a relationship between the characteristic and the power characteristic based on the detected value of the power characteristic corresponding to the geographic location and the value of the characteristic, from the information map, corresponding to the geographic location to which the detected value of the power characteristic corresponds; and
  generating a functional predictive map of the field, that maps predictive values of the power characteristic to the different geographic locations in the field based on values of the characteristic in the information map and the predictive power model; and
  wherein identifying the predictive value of the power characteristic comprises identifying the predictive value of the power characteristic based on the functional predictive map.

Example 14 is the method of any or all previous examples, wherein controlling the mobile hybrid harvesting machine comprises controlling a hybrid powerplant subsystem to adjust power output based on the predictive value of the power characteristic.

Example 15 is the method of any or all previous examples, wherein controlling the mobile hybrid harvesting machine comprises controlling a hybrid power plant subsystem to charge an electrical storage device or discharge the electrical storage device based on predictive value of the power characteristic.

Example 16 is a mobile harvesting machine comprising:
  a controllable subsystem; and
  a control system that:
    identifies a predictive value of a power characteristic based on a relationship between the power characteristic and a characteristic; and
    generates a control signal to control the controllable subsystem based on the predictive value of the power characteristic.

Example 17 is the mobile agricultural harvesting machine of any or all previous 13 examples, wherein the relationship is a predefined relationship that provides the predictive value of the power characteristic based on a value of the characteristic.

Example 18 is the mobile agricultural harvesting machine of any or all previous examples and further comprising:
  an in-situ power sensor that detects a value of the power characteristic corresponding to a geographic location;
  an in-situ sensor that detects a value of the characteristic corresponding to the geographic location; and
  a predictive model generator that generates, as the relationship, a predictive power model that models a relationship between values of the characteristic and values of the power characteristic based on the value of the power characteristic detected by the in-situ power sensor corresponding to the geographic location and the value of the characteristic, detected by the in-situ sensor, corresponding to the geographic location, the predictive power model configured to receive, as a model input, a value of the characteristic and generate, as a model output, the predictive value of the power characteristic.

Example 19 is the mobile agricultural harvesting machine of any or all previous examples and further comprising:
  an in-situ sensor that detects a value of the power characteristic corresponding to a geographic location;
  a predictive model generator that:
  receives an information map that maps values of the characteristic corresponding to different geographic locations in a field; and
  generates, as the relationship, a predictive power model that models a relationship between values of the characteristic and values of the power characteristic based on the value of the power characteristic detected by the in-situ sensor corresponding to the geographic location and a value of the characteristic corresponding to the geographic location to which the detected value of the power characteristic corresponds; and
  a predictive map generator that generates a functional predictive power map of the field that maps the predictive values of the power characteristic to a geographic location in the field, based on a value of the characteristic in the information map and based on the predictive power model;
  a geographic position sensor that detects a geographic location of the mobile hybrid agricultural harvesting machine at the field; and
  wherein the control system generates the control signal based on the predictive power characteristic value, in the functional predictive power map, and the geographic location of the mobile agricultural harvesting machine.

Example 20 is the mobile agricultural harvesting machine of any or all previous examples, wherein the controllable subsystem comprises a hybrid powerplant subsystem and wherein the control signal controls the hybrid powerplant subsystem to adjust power output of the hybrid powerplant subsystem, charge an electrical storage device of the hybrid powerplant subsystem, or discharge stored energy from the electrical storage device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
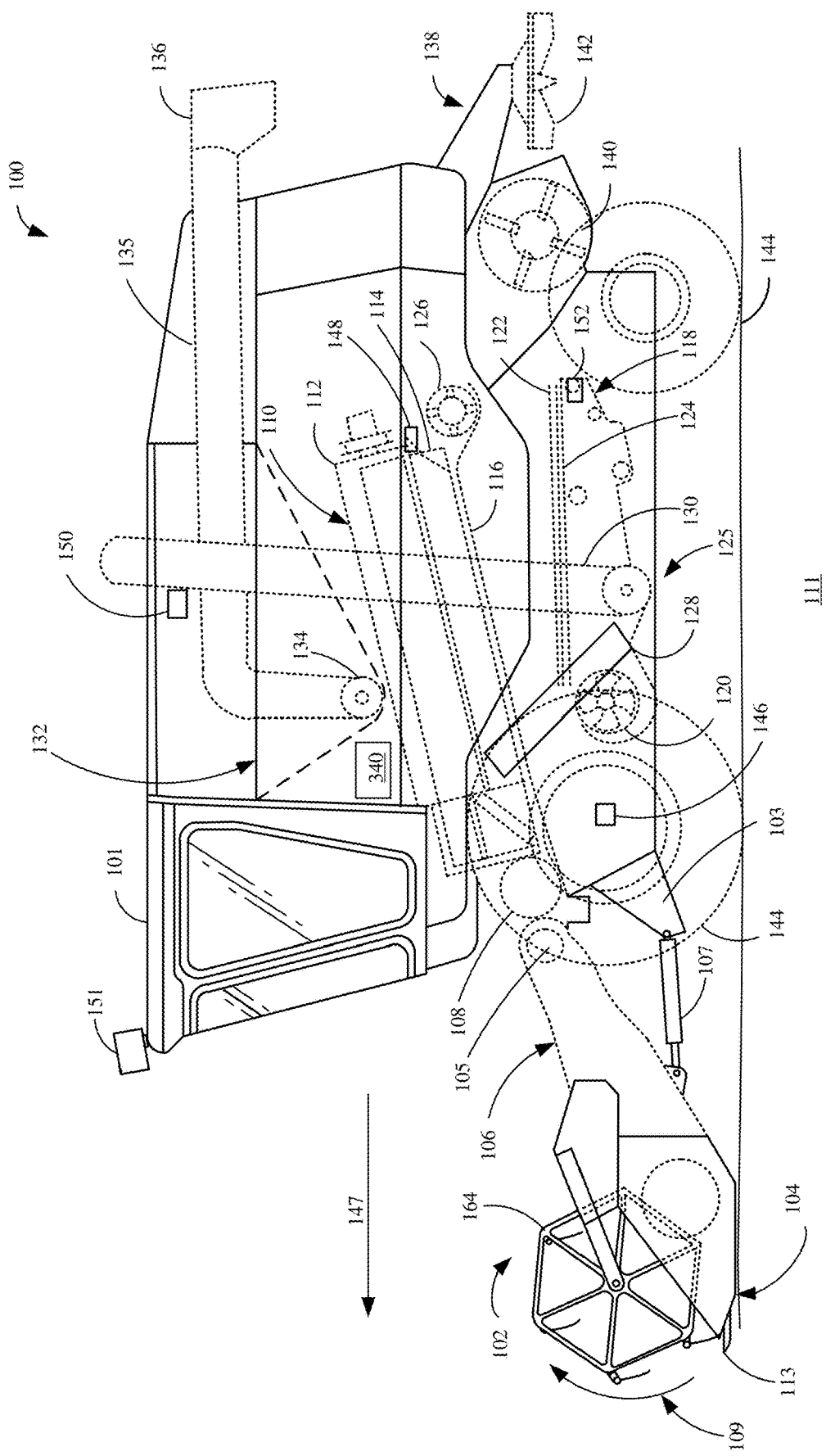
FIG. 1 is a partial pictorial, partial schematic illustration of one example of an agricultural harvester.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

Mobile agricultural machines, such as mobile agricultural harvesters operate to harvest crop at a field. Conventional agricultural harvesters utilize an internal combustion engine to power operation of the agricultural harvester. The internal combustion engine may be capable of providing a power of, for example, 450 kilowatts (kW). Typically, an amount of power output is held in reserve (e.g., a power bulge). For example, the internal combustion engine may provide power of 400 kW during operation, with 50 kW held in reserve and used only in given circumstances, such as during the performance of an auxiliary operation (e.g., a material transfer operation, module building operation, etc.). This arrangement is less than ideal as the full power capacity of the engine cannot be used for normal harvesting operation. Additionally, the reserve power may be insufficient in given conditions. Alternatively, the power reserve may be beyond what is required in given conditions, and thus the engine is operated at an unnecessary level which can result in increased wear and inefficiency.

Some agricultural harvesters can have on-board hybrid powerplant assemblies (or a hybrid powerplant subsystem), which can include, among other things, multiple movers, such as an engine (e.g., internal combustion engine) and an electrical motor/generator and stored energy supplies, such as stored fuel and stored electrical energy (e.g., batteries, capacitors, etc.), as well as various other associated items.

During operation, the internal combustion engine may operate to provide power to the various systems of the combine and the electrical motor/generator may provide assistance or boost where necessary or desired to provide power to the various systems. For example, the power requirement of the agricultural harvester may vary throughout the operation due to varying conditions at the worksite as well as due to performance of auxiliary operations. For instance, in the context of harvesters, such auxiliary operations may include material transfer operations (e.g., offloading harvested material from an on-board storage tank), module building and offloading, as well as various other operations. However, current systems typically provide a default amount of power from the motor/generator to provide boost. The default amount of power may not be sufficient or may be excessive. In other examples, even where the current systems detect a load on the powerplant and operate the motor/generator to meet that load, the latency in operation can lead to a period of operation in which the harvester operates below desired levels, for instance, the travel speed may be reduced. Additionally, it is difficult to manage power storage (e.g., charging of batteries or capacitors) in current hybrid system. Current systems may attempt to maintain a threshold amount of charge. Such operation can lead to overcharging or may not provide enough available charge in given conditions.

Thus, it would be useful to have a system that predicts the necessary power usage or power requirement of the harvester in order to proactively manage power distribution, such as to generate the amount or more closely approximate amount of power required, as well as to manage charge and discharge of the stored energy supply (e.g., batteries, capacitors, etc.). In this way, inefficiencies and other detrimental performance outcomes can be reduced or eliminated.

In one example, the present description relates to using in-situ data taken concurrently with an operation, in combination with a model, to control power distribution.

In one example, the present description relates to using in-situ data taken concurrently with an operation to generate a model that predicts power characteristics (e.g., power usage or power requirement) of the agricultural harvester. The predictive model, in combination with further in-situ data, can be used to control power distribution.

In one example, the present description relates to using in-situ data taken concurrently with an operation, in combination with prior or predicted data, such as prior or predicted data represented in a map, to generate a predictive model and a predictive map, such as a predictive power model and predictive power map. In some examples, the predictive power map can be used to control a mobile machine.

In one example, the present description relates to obtaining a map such as a topographic map. The topographic map includes geolocated values of topographic characteristics (topographic characteristic values, sometimes referred to herein as topographic values) across different locations at a field of interest. For example, the topographic map can include elevation values indicative of the elevation of the field at various locations, as well as slope values indicative of the slope of the field at various locations. The topographic map, and the values therein, can be based on historical data, such as topographic data detected during previous operations at the worksite by the same mobile machine or by a different mobile machine. The topographic map, and the values therein, can be based on fly-over or satellite-based sensor data, such as lidar data of the worksite, as well as scouting data provided by a user or operator such as from a scouting operation of the worksite. These are merely some examples. The topographic map can be generated in a variety of other ways.

In one example, example, the present description relates to obtaining a map, such as a soil moisture map. A soil moisture map includes geolocated values of soil moisture across different geographic locations in a field of interest. The soil moisture map, and the values therein, can be based on soil moisture values detected during prior operations at the field such as prior operations by the same mobile machine or a different mobile machine. The soil moisture values can be based on detected soil moisture data from sensors disposed in the field. Thus, the soil moisture values can be measured soil moisture values. The soil moisture map, and the values therein, can be a predictive soil moisture map with predictive soil moisture values. In one example, the predictive soil moisture values can be based on images generated during a survey of the field, such as an aerial survey of the field. In another example, the predictive soil moisture map is generated by obtaining a map of the field that maps a characteristic to different locations at the field, and a sensed in-situ soil moisture (such as soil moisture data obtained from a data signal from a soil moisture sensor) and determining a relationship between the obtained map, and the values therein, and the in-situ sensed soil moisture data. The determined relationship, in combination with the obtained map(s), is used to generate a predictive soil moisture map having predictive soil moisture values. The soil moisture map can be based on historical soil moisture values. The soil moisture map can be based on soil moisture modeling, which may take into account, among other things, weather characteristics and characteristics of the field, such as topography, soil type, remaining crop stubble/residue, etc. These are merely some examples. The soil moisture map can be generated in a variety of other ways.

In one example, the present description relates to obtaining a map, such as a soil type map. A soil type map includes geolocated values of soil type across different geographic locations in a field of interest. Soil type can refer to taxonomic units in soil science, wherein each soil type includes defined sets of shared properties. Soil types can include, for example, sandy soil, clay soil, silt soil, peat soil, chalk soil, loam soil, and various other soil types. Thus, the soil type map provides geolocated values of soil type at different locations in the field of interest which indicate the type of soil at those locations. The soil type map can be generated on the basis of data collected during another operation on the field of interest, for example, previous operations in the same season or in another season. The machines performing the previous operation can have onboard sensors that detect characteristics indicative of soil type. Additionally, operating characteristics, machine settings, or machine performance characteristics during previous operations can be indicative of soil type. In other examples, surveys of the field of interest can be performed, either by various machines with sensors such as imaging systems (e.g., an aerial survey) or by humans. For example, samples of the soil at the field of interest can be taken at one or more locations and observed or lab tested to identify the soil type at the different location(s). In some examples, third-party service providers or government agencies, for instance, the Natural Resources Conservation Services (NRCS), the United States Geological Survey (USGS), as well as various other parties may provide data indicative of soil type at the field of interest. These are merely examples. The soil type map can be generated in a variety of other ways.

In one example, the present description relates to obtaining a map, such as a vegetative index (VI) map. A VI map includes geolocated VI values across different geographic locations in the field of interest. VI values may be indicative of vegetative growth or vegetation health, or both. One example of a vegetative index includes a normalized difference vegetation index (NDVI). There are many other vegetative indices that are within the scope of the present disclosure. In some examples, a vegetative index may be derived from sensor readings of one or more bands of electromagnetic radiation reflected by the plants or plant matter. Without limitations, these bands may be in the microwave, infrared, visible, or ultraviolet portions of the electromagnetic spectrum. A VI map can be used to identify the presence and location of vegetation (e.g., crop, weeds, plant matter, such as residue, etc.). These are merely some examples. The VI map can be generated in a variety of other ways.

In one example, the present description relates to obtaining a map, such as an optical map. An optical map illustratively includes geolocated electromagnetic radiation values (or optical characteristic values) across different geographic locations in a field of interest. Electromagnetic radiation values can be from across the electromagnetic spectrum. This disclosure uses electromagnetic radiation values from infrared, visible light and ultraviolet portions of the electromagnetic spectrum as examples only and other portions of the spectrum are also envisioned. An optical map may map datapoints by wavelength (e.g., a vegetative index). In other examples, an optical map identifies textures, patterns, color, shape, or other relations of data points. Textures, patterns, or other relations of data points can be indicative of presence or identification of vegetation on the field (e.g., crops, weeds, plant matter, such as residue, etc.). Additionally, or alternatively, an optical map may identify the presence of standing water or wet spots on the field. The optical map can be derived using satellite images, optical sensors on flying vehicles such as UAVS, or optical sensors on a ground-based system, such as another machine operating in the field prior to the current operation. In some examples, optical characteristic maps may map three-dimensional values as well such as vegetation height when a stereo camera or lidar system is used to generate the map. These are merely some examples. The optical characteristic map can be generated in a variety of other ways.

In one example, the present description relates to obtaining a map such as a prior operation map. The prior operation map includes geolocated values of prior operation characteristics across different geographic locations in a field of interest. Prior operation characteristics can include characteristics detected by sensors during prior operations at the field, such as characteristics of the field, characteristics of vegetation on the field, characteristics of the environment, as well as operating parameters of the machines performing the prior operations. In other examples, the prior operation map can be based on data provided by an operator or user. In other examples, the prior operation map may be based on a prescriptive map used to control the machine in the prior operation. These are merely some examples. The prior operation map can be generated in a variety of other ways.

One example of a prior operation map is a seeding map. The prior seeding operation map includes geolocated values of seeding characteristics across different geographic locations in a field of interest. Seeding characteristics can include crop genotype data, seed spacing, row spacing, population, etc. The seeding map may be derived from sensor readings from sensors, which may be on-board the seeding machine (e.g., planter, air seeder, etc.), generated during the prior seeding operation. In other examples, the seeding map may be derived from a prescriptive seeding map that was used in the control of the seeding machine during the prior seeding operation. These are merely some examples. The seeding map can be generated in a variety of other ways.

Another example of a prior operation map is a material application map. The material application includes geolocated values of material application characteristics across different geographic locations in a field of interest. Material application characteristics May include locations where material was applied and not applied, the type of material applied (e.g., water, fertilizer, herbicide, pesticide, etc.), the volumes or rates at which the material was applied, as well as various other characteristics. The material application map may be derived from sensor readings from sensors, which may be on-board the material application machine (e.g., sprayer, dry spreader, irrigation machine, etc.), generated during the prior material application operations. In other examples, the material application map may be derived from a prescriptive material application map that was used in the control of the material application machine during the prior material application operation. These are merely some examples. The material application map can be generated in a variety of other ways.

In one example, the present description relates to obtaining a map, such as a crop moisture map. A crop moisture map includes geolocated values of crop moisture across different geographic locations in a field of interest. Crop moisture can include grain moisture or material other than grain (MOG) moisture, or both. The crop moisture map may be derived from other data at the field of interest, such as vegetative index data or optical data. The crop moisture map may be derived from sensor readings during a previous operation on the field of interest, such as during a previous material application operation. The crop moisture map may be based on crop moisture modeling and various other input data. The crop moisture map, and the values therein, can be a predictive crop moisture map with predictive crop moisture values. In one example, the predictive crop moisture values can be based on images generated during a survey of the field, such as an aerial survey of the field. In another example, the predictive crop moisture map is generated by obtaining a map of the field that maps a characteristic to different locations at the field, and a sensed in-situ crop moisture (such as crop moisture data obtained from a data signal from a crop moisture sensor) and determining a relationship between the obtained map, and the values therein, and the in-situ sensed crop moisture data. The determined relationship, in combination with the obtained map(s), is used to generate a predictive crop moisture map having predictive crop moisture values. The crop moisture map can be based on historical crop moisture values. The crop moisture map can be based on crop moisture modeling, which may take into account, among other things, weather characteristics and characteristics of the field, such as topography, soil type, etc. These are merely some examples. The crop moisture map can be generated in a variety of other ways.

In one example, the present description relates to obtaining a map, such as a yield map. A yield map includes geolocated values of yield across different geographic locations in a field of interest. The yield map may be predictive in that the yield values are predictive yield values. The predictive yield values may be based on various sensor measurements of the field of interest, vegetative index data, soil moisture data, crop genotype data, as well as a variety of other data. In other examples, the yield may be a historical yield map that includes historical yield values from prior harvesting operations at the field of interest or from other fields, such as other fields having similar characteristics and/or similar crop genotypes. These are merely some examples. The yield map can be generated in a variety of other ways.

In one example, the present description relates to obtaining in-situ data from in-situ sensors on the mobile agricultural machine taken concurrently with an operation. The in-situ sensor data can include power data which indicates the power characteristics (e.g., power usage) of the agricultural harvester or of components of the agricultural harvester, or both. The in-situ sensor data can include characteristics of the crop at the field, characteristics of the field, characteristics of the environment of the field, as well as machine operating parameters.

The present discussion proceeds, in some examples, with respect to systems that obtain one or more maps of a field, such as one or more of a topographic map, a soil moisture map, a soil type map, a vegetative index (VI) map, an optical map, a prior operation map (e.g., a seeding map or a material application, or both), a crop moisture map, as well as various other types of maps and also use an in-situ sensor to detect a variable indicative of an agricultural characteristic value, such as values of one or more power characteristics. The systems generate a model that models a relationship between the values on the obtained map(s) and the output values from the in-situ sensor. The model is used to generate a predictive map that predicts agricultural characteristic values, such as values of one or more power characteristics. The predictive map, generated during an operation, can be presented to an operator or other user or used in automatically controlling a mobile agricultural harvesting machine during an operation, or both. In some examples, the predictive map can be used to control the mobile agricultural harvesting machine during an operation.

FIG. 1 is a partial pictorial, partial schematic, illustration of a self-propelled agricultural harvester 100. In the illustrated example, agricultural harvester 100 is a combine harvester. Further, although combine harvesters are provided as examples throughout the present disclosure, it will be appreciated that the present description is also applicable to other types of harvesters, such as cotton harvesters, sugarcane harvesters, self-propelled forage harvesters, windrowers, or other agricultural work machines. Consequently, the present disclosure is intended to encompass the various types of harvesters described and is, thus, not limited to combine harvesters. Consequently, the present disclosure is intended to encompass these various types of harvesters and other work machines and is, thus, not limited to combine harvesters.

As shown in FIG. 1, agricultural harvester 100 illustratively includes an operator compartment 101, which can have a variety of different operator interface mechanisms, for controlling agricultural harvester 100. Agricultural harvester 100 includes front-end equipment, such as a header 102, and a cutter generally indicated at 104. While header 102 is illustratively shown as a reel-type header in FIG. 1, it will be understood that various other types of headers can be used with agricultural harvester 100, such as draper headers, corn headers, etc. Agricultural harvester 100 also includes a feeder house 106, a feed accelerator 108, and a thresher generally indicated at 110. The feeder house 106 and the feed accelerator 108 form part of a material handling subsystem 125. Header 102 is pivotally coupled to a frame 103 of agricultural harvester 100 along pivot axis 105. One or more actuators 107 drive movement of header 102 about axis 105 in the direction generally indicated by arrow 109. Thus, a vertical position of header 102 (the header height) above ground 111 over which the header 102 travels is controllable by actuating actuator 107. While not shown in FIG. 1, agricultural harvester 100 may also include one or more actuators that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground. The tilt angle is decreased by controlling header 102 to point the distal edge 113 of cutter 104 more away from the ground. The roll angle refers to the orientation of header 102 about the front-to-back longitudinal axis of agricultural harvester 100.

Thresher 110 illustratively includes a threshing rotor 112 and a set of concaves 114. Further, agricultural harvester 100 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, and clean grain elevator 130. The clean grain elevator moves clean grain into clean grain tank 132.

As illustrated, agricultural harvester 100 includes an auxiliary subsystem, in the form of a material transfer subsystem that includes a conveying mechanism 134, a chute 135, and a spout 136. Conveying mechanism 134 can be a variety of different types of conveying mechanisms, such as an auger or blower. Conveying mechanism 134 is in communication with clean grain tank 132 and is driven (e.g., hydraulicly or electrically) to convey material from grain tank 132 through chute 135 and spout 136. Chute 135 is rotatable through a range of positions (shown in the storage position in FIG. 1) away from agricultural harvester 100 to align spout 136 relative to a material receptacle (e.g., grain cart, towed trailer, etc.) that is configured to receive the material. Spout 136, in some examples, is also rotatable to adjust the direction of the crop stream exiting spout 136.

Agricultural harvester 100 also includes a residue subsystem 138 that can include chopper 140 and spreader 142. Agricultural harvester 100 also includes a propulsion subsystem that includes an engine that drives ground engaging components 144, such as wheels or tracks. In some examples, a combine harvester within the scope of the present disclosure may have more than one of any of the subsystems mentioned above. In some examples, agricultural harvester 100 may have left and right cleaning subsystems, separators, etc., which are not shown in FIG. 1.

In operation, and by way of overview, agricultural harvester 100 illustratively moves through a field in the direction indicated by arrow 147. As agricultural harvester 100 moves, header 102 (and the associated reel 164) engages the crop to be harvested and gathers the crop toward cutter 104. An operator of agricultural harvester 100 can be a local human operator, a remote human operator, or an automated system. The operator of agricultural harvester 100 may determine one or more of a height setting, a tilt angle setting, or a roll angle setting for header 102. For example, the operator inputs a setting or settings to a control system, described in more detail below, that controls actuator 107. The control system may also receive a setting from the operator or control system for establishing the tilt angle and roll angle of the header 102 and implement the inputted settings by controlling associated actuators, not shown, that operate to change the tilt angle and roll angle of the header 102. The actuator 107 maintains header 102 at a height above ground 111 based on a height setting and, where applicable, at desired tilt and roll angles. Each of the height, roll, and tilt settings may be implemented independently of the others. The control system responds to header error (e.g., the difference between the height setting and measured height of header 104 above ground 111 and, in some examples, tilt angle and roll angle errors) with a responsiveness that is determined based on a sensitivity level. If the sensitivity level is set at a greater level of sensitivity, the control system responds to smaller header position errors, and attempts to reduce the detected errors more quickly than when the sensitivity is at a lower level of sensitivity.

Returning to the description of the operation of agricultural harvester 100, after crops are cut by cutter 104, the severed crop material is moved through a conveyor in feeder house 106 toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow. In other examples, the residue subsystem 138 can include weed seed eliminators (not shown) such as seed baggers or other seed collectors, or seed crushers or other seed destroyers.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in agricultural harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

FIG. 1 also shows that agricultural harvester 100 includes a hybrid powerplant subsystem 340, which may include an internal combustion engine, an electric motor/generator, stored energy supply (e.g., stored fuel and stored electrical energy), as well as various other items. Hybrid powerplant subsystem supplies power to the various items of agricultural harvester 100. Hybrid powerplant subsystem 340 will be discussed in greater detail below.

Agricultural harvester 100 can include a variety of sensors, some of which are illustrated in FIG. 1, such as ground speed sensor 146, one or more separator loss sensors 148, a clean grain camera 150, one or more loss sensors 152 provided in the cleaning subsystem 118, and an observation sensor system 151, which may include, one or more of one or more imaging systems (e.g., mono or stereo cameras), optical sensors, lidar, radar, ultrasonic sensors, thermal or infrared sensors, as well as various other sensors, such as other sensors that emit and/or received 11 electromagnetic radiation.

Ground speed sensor 146 senses the travel speed of agricultural harvester 100 over the ground. Ground speed sensor 146 may sense the travel speed of the agricultural harvester 100 by sensing the speed of rotation of the ground engaging components (such as wheels or tracks), a drive shaft, an axle, or other components. In some instances, the travel speed may be sensed using a positioning system, such as a global positioning system (GPS), a dead reckoning system, a long range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when agricultural harvester 100 is on a slope, the orientation of agricultural harvester 100 relative to the slope is known. For example, an orientation of agricultural harvester 100 could include ascending, descending or transversely travelling the slope. Machine or ground speed, when referred to in this disclosure can also include the two or three dimension direction of travel.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 1. The separator loss sensors 148 may be associated with the left and right separators and may provide separate grain loss signals or a combined or aggregate signal. In some instances, sensing grain loss in the separators may also be performed using a wide variety of different types of sensors as well.

Agricultural harvester 100 may also include other sensors and measurement mechanisms. For instance, agricultural harvester 100 may include power sensors that detect the power output of hybrid powerplant subsystem 340 or the power requirement of one or more systems of agricultural harvester 100, or both. Agricultural harvester 100 may include operating parameter sensors that sense one or more operating parameters of agricultural harvester 100 that sense operating parameters of one or more items of agricultural harvester 100. Agricultural harvester 100 may include one or more crop characteristic sensors that sense one or more characteristics of the crop at the field. Agricultural harvester 100 may include one or more environmental characteristic sensors that sense characteristics of the environment of the field. Agricultural harvester 100 may include a variety of other types of sensors.

Examples of sensors used to detect or sense the power characteristics include, but are not limited to, a voltage sensor, a current sensor, a torque sensor, engine speed sensor, motor speed sensor, a hydraulic pressure sensor, a hydraulic flow sensor, a force sensor, a bearing load sensor and a rotational sensor (e.g., sensing rotational speed). Power characteristics can be measured at varying levels of granularity. For instance, power usage can be sensed machine-wide, subsystem-wide, and/or by individual components of the subsystems.

While the example in FIG. 1 shows a combine harvester having a reel-type header, it will be understood that in other examples, other types of headers, such as corn headers, draper headers, etc., can be used.

Additionally, while examples herein describe auxiliary subsystem in the form of a material transfer subsystem, it will be understood that agricultural harvesters can have one or more other auxiliary subsystems. Additionally, some agricultural harvesters may have different auxiliary subsystems. Further, other agricultural machines may have other types of auxiliary subsystems. The systems and methods described herein are applicable to various agricultural machines having various types of auxiliary subsystems.

Figure 2:
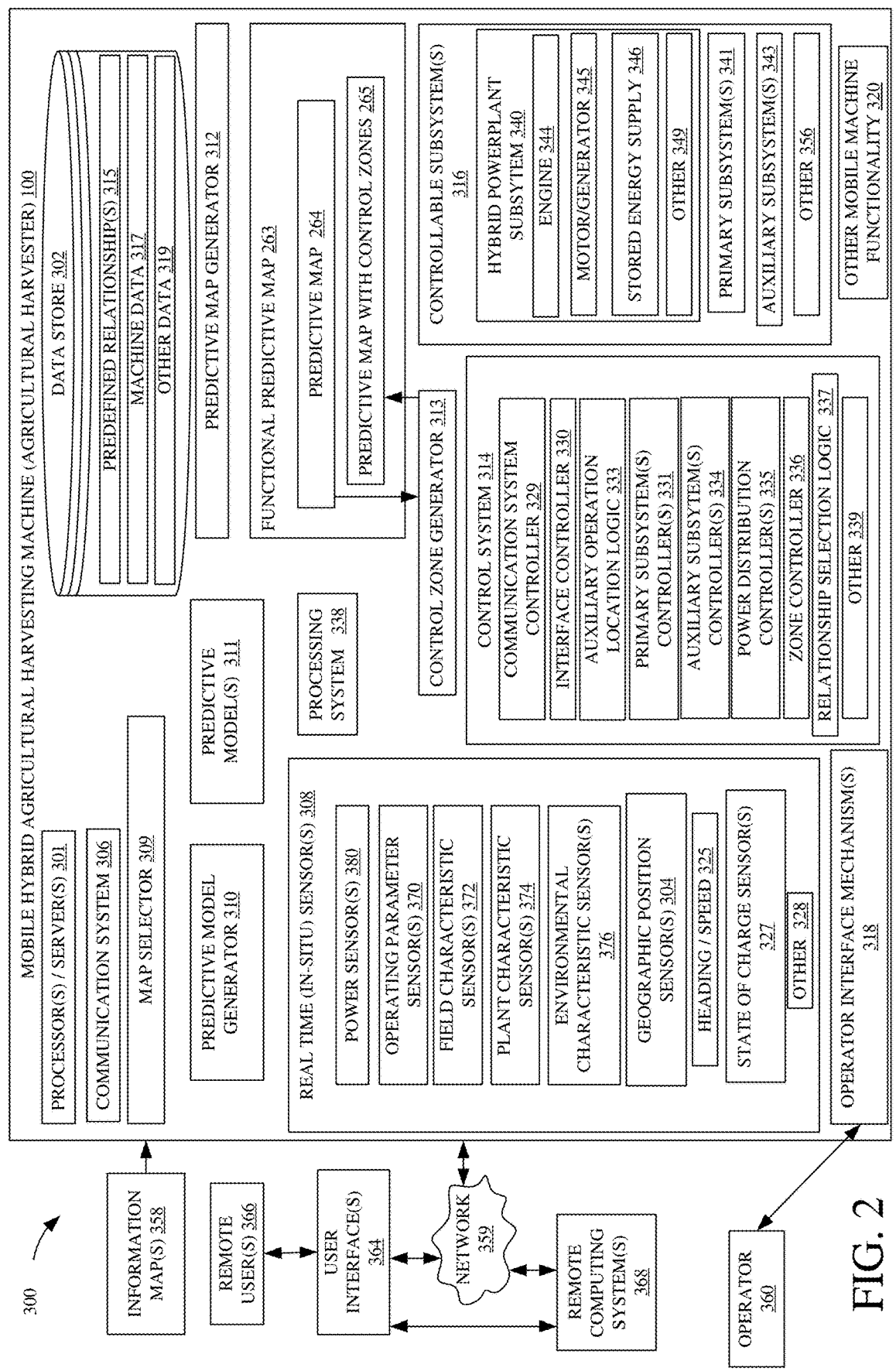
FIG. 2 is a block diagram showing some portions of an agricultural harvesting system architecture, including a mobile agricultural harvesting machine, in more detail, according to some examples of the present disclosure.

FIG. 2 is a block diagram showing some portions of an agricultural harvesting system architecture 300. FIG. 2 shows that agricultural harvesting system architecture 300 includes mobile agricultural harvesting machine 100. Agricultural system 300 also includes one or more remote computing systems 368, one or more remote user interfaces 364, network 359, and one or more information maps 358. Mobile agricultural harvesting machine 100, itself, illustratively includes one or more processors or servers 301, data store 302, communication system 306, one or more in-situ sensors 308 that sense one or more characteristics of at field concurrent with an operation, and a processing system 338 that processes the sensor data (e.g., sensor signals, images, etc.) generated by in-situ sensors 308 to generate processed sensor data. The in-situ sensors 308 generate values corresponding to the sensed characteristics. Mobile machine 100 also includes a predictive model or relationship generator (collectively referred to hereinafter as "predictive model generator 310"), predictive model or relationship (collectively referred to hereinafter as "predictive model 311"), predictive map generator 312, control zone generator 313, control system 314, one or more controllable subsystems 316, and an operator interface mechanism 318. The mobile machine can also include a wide variety of other machine functionality 320.

Data store 302, itself, includes one or more predefined relationships 315, machine data 317, as well as various other data 319, which may include, but is not limited to, data provided by an operator or user.

The in-situ sensors 308 can be on-board mobile machine 100, remote from mobile machine, such as deployed at fixed locations on the worksite or on another machine operating in concert with mobile machine 100, such as an aerial vehicle, and other types of sensors, or a combination thereof. In-situ sensors 308 sense characteristics at the worksite during the course of an operation. In-situ sensors 308 illustratively include power sensors 380, operating parameter sensors 370, field characteristic sensors 372, crop characteristic sensors 374, environmental characteristic sensors 376, geographic position sensors 304, heading/speed sensors 325, state of charge sensors 327, and can include various other sensors 328, such as the various other sensors described in FIG. 1.

Power sensors 380 illustratively detect power characteristics of agricultural harvester 100, such as output power of the powerplant or power requirement or usage of various items of agricultural harvester 100, or both. The sensors used to detect or sense the power characteristics can include, but are not limited to, voltage sensors, current sensors, torque sensors, hydraulic pressure sensors, engine speed sensors, motor speed sensors, hydraulic flow sensors, force sensors, bearing load sensors and rotational sensors. Power characteristics can be measured at varying levels of granularity. For instance, power usage or requirement can be sensed machine-wide (e.g., total power usage or requirement), subsystem-wide (e.g., auxiliary [e.g., material transfer] subsystem power usage or requirement) or individual components (e.g., conveyance mechanism [e.g., auger or blower] power usage or requirement). These are merely some examples.

Operating parameter sensors 370 illustratively detect operating parameters of the agricultural harvester 100. Operating parameter sensors 370 can include various different types of operating parameter sensors 370, such as header parameter sensors that sense various header parameters (e.g., header height, header tilt, header roll, reel speed, cross auger speed, cutter position, etc.), threshing rotor speed sensors, cleaning fan speed sensors, chaffer parameter sensors, sieve parameter sensors, discharge beater parameter sensors, tailings elevator parameter sensors, clean grain elevator parameter sensors, material transfer subsystem parameter sensors that sense various material transfer subsystem parameters (e.g., conveyance mechanism parameters, chute parameters, spout parameters, etc.), grain tank parameter sensors (e.g., grain tank fill level, mass of grain in crop material in grain tank, profile of crop material pile [e.g., angle of repose] in grain tank, etc.), chopper parameter sensors, spreader parameter sensors, machine dynamics sensors that detect various machine dynamics (e.g., harvester yaw, pitch, and roll) as well as various other parameter sensors that sense various other parameters of various other items of agricultural harvester. In some examples, a sensor may not sense that operating parameters (or a characteristic indicative of the operating parameter), instead, a sensor may detect an operator, user, or control system input that establishes a setting of the component. These are merely some examples.

Field characteristic sensors 372 illustratively detect characteristics of the field at which agricultural harvester 100 operates. Field characteristic sensors 372 can include various different types of field characteristic sensors, such as sensors that detect topographic characteristics (e.g., elevation, slope, etc.) of the field, sensors that detect soil type, sensors that detect soil moisture, sensors that detect compaction, as well as various other field characteristic sensors that detect various other field characteristics. These are merely some examples.

Plant characteristic sensors 374 illustratively detect characteristics of the vegetation (plants) at the field. Plant characteristic sensors 374 can include various different types of plant characteristic sensors 374, such as crop height sensors, crop density sensors, crop biomass sensors, crop moisture (e.g., grain moisture and/or material other than grain moisture) sensors, yield sensors (e.g., mass flow sensors, on-board tank camera, mass/weight sensors, etc.), crop state sensors, weed presence sensors, weed type sensors, weed intensity sensors, as well as various other plant characteristic sensors that sense various other plant characteristics. These are merely some examples.

Environmental characteristic sensors 376 illustratively detect characteristics of the environment. Environmental characteristic sensors 376 can include various different types of environmental characteristic sensors 376, such as temperature sensors, humidity sensors, wind speed sensors, wind direction sensors, as well as various other environmental characteristic sensors that detect various other environmental characteristics. In some examples, environmental characteristic sensors 376 are located on-board agricultural harvester 100 or can be remote from agricultural harvester but otherwise disposed at the field or disposed to detect environmental characteristics relative to the field. In other examples, environmental characteristic sensors 376 may obtain environmental data from other sources, such as weather stations, web-based sources, as well as various other sources. These are merely some examples.

State of charge sensors 327 illustratively detect characteristic indicative of a state of charge of the stored energy supply 346 (e.g., electrical storage device such as batteries, capacitors, etc.). State of charge sensors 327 can include current sensors, voltage sensors, and temperature sensors. Based on the current, voltage (e.g., individual cell voltage where a battery pack), and temperature (e.g., individual cell temperature where a battery pack), the state of charge of the stored energy supply 346 can be calculated. Thus, processing system 338 can generate a state of charge value based on sensor data generated by state of charge sensors 327.

Geographic position sensors 304 illustratively sense or detect the geographic position or location of mobile harvesting machine 100. Geographic position sensors 304 can 28 include, but are not limited to, a global navigation satellite system (GNSS) receiver that receives 29 signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors.

Heading/speed sensors 325 detect a heading and speed at which mobile machine 100 is traversing the worksite during the operation. This can include sensors that sense the movement of ground-engaging elements (e.g., wheels or tracks 144), such as sensors 146, or can utilize signals received from other sources, such as geographic position sensor 304, thus, while heading/speed sensors 325 as described herein are shown as separate from geographic position sensor 304, in some examples, machine heading/speed is derived from signals received from geographic positions sensor 304 and subsequent processing. In other examples, heading/speed sensors 325 are separate sensors and do not utilize signals received from other sources.

Other in-situ sensors 328 may be any of a wide variety of other sensors, including the other sensors described above with respect to FIG. 1. Other in-situ sensors 328 can be on-board mobile machine 100 or can be remote from mobile machine 100, such as other in-situ sensors 328 on-board another mobile machine that capture in-situ data of characteristics at the field or sensors at fixed locations throughout the field. The remote data from remote sensors can be obtained by mobile machine 100 via communication system 306 over network 359.

In-situ data includes data taken from a sensor on-board the mobile harvesting machine 100 or taken by any sensor where the data are detected during the operation of mobile harvesting machine 100 at a field.

Processing system 338 processes the sensor data (e.g., signals, images, etc.) generated by in-situ sensors 308 to generate processed sensor data indicative of one or more characteristics. For example, processing system generates processed sensor data indicative of characteristic values based on the sensor data generated by in-situ sensors 308, such as power characteristic values (e.g., total power usage, subsystem power usage, individual component power usage, etc.) based on sensor data generated by power sensors 380. Processing system 338 also processes sensor data generated by other in-situ sensors 308 to generate processed sensor data indicative of other characteristic values, such as operating parameter values based on sensor data generated by operating parameter sensors 370, field characteristic values based on sensor data generated by field characteristic sensors 372, plant characteristic values based on sensor data generated by plant characteristic sensors 374, environmental characteristic values based on sensor data generated by environmental characteristic sensors 376, machine speed characteristic (travel speed, acceleration, deceleration, etc.) values based on sensor data generated by heading/speed sensors 325, machine heading values based on sensor data generated by heading/speed sensors 325, geographic position (or location) values based on sensor data generated by geographic position sensors 304, state of charge values based on sensor data generated by state of charge sensors 327, as well as various other values based on sensors signals generated by various other in-situ sensors 328.

It will be understood that processing system 338 can be implemented by one or more processers or servers, such as processors or servers 301. Additionally, processing system 338 can utilize various sensor signal filtering functionalities, noise filtering functionalities, sensor signal categorization, aggregation, normalization, as well as various other processing functionalities. Similarly, processing system 338 can utilize various image processing techniques such as, sequential image comparison, RGB color extraction, edge detection, black/white analysis, machine learning, neural networks, pixel testing, pixel clustering, shape detection, as well any number of other suitable image processing and data extraction functionalities.

FIG. 2 also shows remote users 366 interacting with mobile machine 100 or remote computing systems 368, or both, through user interfaces mechanisms 364 over network 359. In some examples, user interface mechanisms 364 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, user 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, mobile machine 100 can be controlled remotely by remote computing systems or by remote users 366, or both. As will be described below, in some examples, one or more of the components shown being disposed on mobile machine 100 in FIG. 2 can be located elsewhere, such as at remote computing systems 368.

FIG. 2 also shows that an operator 360 may operate mobile machine 100. The operator 360 interacts with operator interface mechanisms 318. In some examples, operator interface mechanisms 318 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, operator 360 may interact with operator interface mechanisms 318 using touch gestures. In some examples, at least some operator interface mechanisms 318 may be disposed in an operator compartment of mobile harvesting machine 100 (e.g., 101). In some examples, at least some operator interface mechanisms 318 may be remote (or separable) from mobile harvesting machine 100 but are in communication therewith. Thus, the operator 360 may be local or remote.

These examples described above are provided as illustrative examples and are not intended to limit the scope of the present disclosure. Consequently, other types of operator interface mechanisms 318 may be used and are within the scope of the present disclosure.

FIG. 2 also shows that mobile machine 100 can obtain one or more information maps 358. As described herein, the information maps 358 include, for example, a topographic map, a soil moisture map, a soil type map, a vegetative index (VI) map, an optical map, a prior operation map, such as a seeding map or a prior material application map, or both, a crop moisture map, a yield map, as well as various other maps. However, information maps 358 may also encompass other types of data, such as other types of data that were obtained prior to a current operation or a map from a prior operation. In other examples, information maps 358 can be generated during a current operation, such a map generated by predictive map generator 312 based on a predictive model 311 generated by predictive model generator 310.

Information maps 358 may be downloaded onto mobile harvesting machine 100 over network 359 and stored in data store 302, using communication system 306 or in other ways. In some examples, communication system 306 may be a cellular communication system, a system for communicating over a wide area network or a local area network, a system for communicating over a near field communication network, or a communication system configured to communicate over any of a variety of other networks or combinations of networks. Network 359 illustratively represents any or a combination of any of the variety of networks. Communication system 306 may also include a system that facilitates downloads or transfers of information to and from a secure digital (SD) card or a universal serial bus (USB) card or both.

As described above, the present description relates to the use of relationships to predict power characteristics of agricultural harvester 100. In some examples, the relationships can be generated prior to or based on data collected prior to the current operation. Such relationships are referred to as predefined relationships 315. The predefined relationships 315 can be based on expert knowledge, learning data, based on historical operation data (of the same machine or machine(s) of the same type, or both), as well as obtained from a variety of other sources. The predefined relationships 315 identify a relationship between power characteristics (e.g., auxiliary subsystem power usage or requirement) and other characteristics. Thus, during operation, a predefined model 315 can be used in control of harvester 100 by providing one or more other characteristics as inputs to relationship 315 to identify a power characteristic as an output. Some examples of predefined relationships 315 include models, functions, lookup tables, as well as various other types of relationships.

As illustrated, predefined relationships 315 may be downloaded onto mobile harvesting machine 100 over network 359 and can be stored in data store 302. As illustrated, machine data 317 can also be stored in data store 302. Machine data 317 can include machine type data (e.g., identifying a model of agricultural harvester 100), powerplant subsystem characteristic data (e.g., maximum power output, stored power capacities, speed ranges, etc.), auxiliary subsystem characteristic data (e.g., auger or blower size, chute and spout dimensions, auger or blower speeds or flow rates, etc.), as well as various other machine data. Various other types of data 319 can be stored on data store 302.

In other examples, the relationships can be generated, such as by predictive model generator 310, during the current operation.

In one example, predictive model generator 310 generates a predictive model 311 that is indicative of a relationship between the values sensed by the in-situ sensors 308. For example, predictive model generator 310 may generate a predictive model 311 in the form of a predictive power model that models a relationship between values of one or more power characteristics and one or more other values sensed by in-situ sensors 308, such as values of one or more of operating parameters sensed by operating parameter sensors 370, values of one or more field characteristics sensed by field characteristic sensors 372, values of one or more plant characteristics sensed by plant characteristic sensors 374, values of one or more environmental characteristics sensed by environmental characteristic sensors 376, and machine speed values sensed by heading/speed sensors 325. As an illustrative example, predictive model generator 310 may generate a predictive power model that models a relationship between a power characteristic, such as auxiliary subsystem (e.g., material transfer subsystem) power usage, and crop moisture (e.g., as a plant characteristic). That power model can be used to predict auxiliary subsystem power usage, as an output, based on a crop moisture value, as a model input. Thus, as the agricultural harvester 100 operates at the field, the system can predict power usage requirements of the auxiliary subsystem based on the crop moisture. This is merely one example.

In one example, predictive model generator 310 generates a predictive model 311 that is indicative of a relationship between the values sensed by the in-situ sensors 308 and values mapped to the field by the information maps 358. For example, if the information map 358 maps topographic values to different locations in the worksite, and the in-situ sensor 308 are sensing values indicative of one or more power characteristics, then model generator 310 generates a predictive power model that models the relationship between the topographic values and the values of one or more power characteristics. In another example, if the information map 358 maps soil type values to different locations in the worksite, and the in-situ sensors 308 are sensing values indicative of one or more power characteristics, then model generator 310 generates a predictive power model that models the relationship between the soil type values and the values of one or more power characteristics. These are merely some examples.

In some examples, the predictive map generator 312 uses the predictive models generated by predictive model generator 310 to generate functional predictive maps that predict the value of a characteristic, sensed by the in-situ sensors 308, at different locations in the field based upon one or more of the information maps 358.

For example, where the predictive model is a predictive power model that models a relationship between values of one or more power characteristics sensed by in-situ sensors 308 and one or more of topographic characteristics values from a topographic map, soil moisture values from a soil moisture map, soil type values from a soil type map, vegetative index values from a vegetative index map, optical characteristic values from an optical map, seeding characteristic values from a seeding map, material application characteristic values from a material application map, crop moisture values from a crop moisture map, and other characteristic values from another map, then predictive map generator 312 generates a functional predictive power map that predicts values of one or more power characteristics (e.g., one or more of total power usage, power usage of one or more subsystems, and power usage of one or more individual components) at different locations at the worksite based on one or more of the mapped values at those locations and the predictive power model.

In some examples, the type of values in the functional predictive map 263 may be the same as the in-situ data type sensed by the in-situ sensors 308. In some instances, the type of values in the functional predictive map 263 may have different units from the data sensed by the in-situ sensors 308. In some examples, the type of values in the functional predictive map 263 may be different from the data type sensed by the in-situ sensors 308 but have a relationship to the type of data type sensed by the in-situ sensors 308. For example, in some examples, the data type sensed by the in-situ sensors 308 may be indicative of the type of values in the functional predictive map 363. In some examples, the type of data in the functional predictive map 363 may be different than the data type in the information maps 358. In some instances, the type of data in the functional predictive map 263 may have different units from the data in the information maps 358. In some examples, the type of data in the functional predictive map 263 may be different from the data type in the information map 358 but has a relationship to the data type in the information map 358. For example, in some examples, the data type in the information maps 358 may be indicative of the type of data in the functional predictive map 263. In some examples, the type of data in the functional predictive map 263 is different than one of, or both of, the in-situ data type sensed by the in-situ sensors 308 and the data type in the information maps 358. In some examples, the type of data in the functional predictive map 263 is the same as one of, or both of, of the in-situ data type sensed by the in-situ sensors 308 and the data type in information maps 358. In some examples, the type of data in the functional predictive map 263 is the same as one of the in-situ data type sensed by the in-situ sensors 308 or the data type in the information maps 358, and different than the other.

As shown in FIG. 2, predictive map 264 predicts the value of a sensed characteristic (sensed by in-situ sensors 308), or a characteristic related to the sensed characteristic, at various locations across the worksite based upon one or more information values in one or more information maps 358 at those locations and using a predictive model 311. For example, if predictive model generator 310 has generated a predictive model indicative of a relationship between vegetative index (VI) values and values of one or more power characteristics then, given the VI value at different locations across the worksite, predictive map generator 312 generates a predictive map 264 that predicts values of one or more power characteristics at different locations across the worksite. The VI value, obtained from the VI map, at those locations and the relationship between VI values and values of one or more power characteristics, obtained from a predictive model 311, are used to generate the predictive map 264. This is merely one example.

Some variations in the data types that are mapped in the information maps 358, the data types sensed by in-situ sensors 308, and the data types predicted on the predictive map 264 will now be described.

In some examples, the data type in one or more information maps 358 is different from the data type sensed by in-situ sensors 308, yet the data type in the predictive map 264 is the same as the data type sensed by the in-situ sensors 308. For instance, the information map 358 may be an optical map, and the variable(s) sensed by the in-situ sensors 308 may be one or more power characteristics. The predictive map 264 may then be a predictive power map that maps predictive values of one or more power characteristics to different geographic locations in the in the worksite.

Also, in some examples, the data type in the information map 358 is different from the data type sensed by in-situ sensors 308, and the data type in the predictive map 264 is different from both the data type in the information map 358 and the data type sensed by the in-situ sensors 308.

In some examples, the information map 358 is from a prior pass through the field during a prior operation and the data type is different from the data type sensed by in-situ sensors 308, yet the data type in the predictive map 264 is the same as the data type sensed by the in-situ sensors 308. For instance, the information map 358 may be a prior operation map, such as a prior seeding map or a material application map, generated during a previous operation on the field, and the variable(s) sensed by the in-situ sensors 308 may be one or more power characteristics. The predictive map 264 may then be a predictive power map that maps predictive values of one or more power characteristics to different geographic locations in the field.

In some examples, the information map 358 is from a prior pass through the field during a prior operation and the data type is the same as the data type sensed by in-situ sensors 308, and the data type in the predictive map 264 is also the same as the data type sensed by the in-situ sensors 308. For instance, the information map 358 may be a power map generated during a previous year, and the variable(s) sensed by the in-situ sensors 308 may be one or more power characteristics. The predictive map 264 may then be a predictive power map that maps predictive values of one or more power characteristics to different geographic locations in the field. In such an example, the relative power characteristic differences in the georeferenced information map 358 from the prior year can be used by predictive model generator 310 to generate a predictive model that models a relationship between the relative power characteristic differences on the information map 358 and the values of one or more power characteristics sensed by in-situ sensors 308 during the current operation. The predictive model is then used by predictive map generator 310 to generate a predictive power map.

In another example, the information map 358 may be a map, such as a soil moisture map, generated during a prior operation in the same year, and the variable(s) sensed by the in-situ sensors 308 during the current operation may be one or more power characteristics. The predictive map 264 may then be a predictive power map that maps predictive values of one or more power characteristics to different geographic locations in the field. In such an example, a map of the soil moisture values at time of the prior operation is georeferenced, recorded, and provided to mobile machine 100 as an information map 358 of soil moisture values. In-situ sensors 308 during a current operation can detect one or more power characteristics at geographic locations in the field and predictive model generator 310 may then build a predictive model that models a relationship between values of one or more power characteristics at the time of the current operation and soil moisture values at the time of the prior operation. This is because the soil moisture values at the time of the prior operation are likely to be the same as at the time of the current harvesting operation or may be more accurate or otherwise may be more reliable than soil moisture values obtained in other ways. Soil moisture is merely one example.

In some examples, predictive map 264 can be provided to the control zone generator 313. Control zone generator 313 groups adjacent portions of an area into one or more control zones based on data values of predictive map 264 that are associated with those adjacent portions. A control zone may include two or more contiguous portions of a worksite, such as a field, for which a control parameter corresponding to the control zone for controlling a controllable subsystem is constant. For example, a response time to alter a setting of controllable subsystems 316 may be inadequate to satisfactorily respond to changes in values contained in a map, such as predictive map 264. In that case, control zone generator 313 parses the map and identifies control zones that are of a defined size to accommodate the response time of the controllable subsystems 316. In another example, control zones may be sized to reduce wear from excessive actuator movement resulting from continuous adjustment. In some examples, there may be a different set of control zones for each controllable subsystem 316 or for groups of controllable subsystems 316. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265.

It will also be appreciated that control zone generator 313 can cluster values to generate control zones and the control zones can be added to predictive control zone map 265, or a separate map, showing only the control zones that are generated. In some examples, the control zones may be used for controlling or calibrating mobile machine 100 or both. In other examples, the control zones may be presented to the operator 360 and used to control or calibrate mobile machine 100, and, in other examples, the control zones may be presented to the operator 360 or another user, such as a remote user 366, or stored for later use.

Predictive map 264 or predictive control zone map 265 or both are provided to control system 314, which generates control signals based upon the predictive map 264 or predictive control zone map 265 or both. In some examples, communication system controller 329 controls communication system 306 to communicate the predictive map 264 or predictive control zone map 265 or control signals based on the predictive map 264 or predictive control zone map 265 to other mobile machines (e.g., other mobile harvesting machines) that are operating at the same worksite or in the same operation. In some examples, communication system controller 329 controls the communication system 306 to send the predictive map 264, predictive control zone map 265, or both to other remote systems, such as remote computing systems 368.

Control system 314 includes one or more communication system controllers 329, one or more interface controllers 330, one or more primary subsystem(s) controllers 331, auxiliary operation location logic 333, one or more auxiliary subsystem(s) controllers 334, one or more power distribution controllers 335, one or more zone controllers 336, relationship selection logic 337, and control system 314 can include other items 339. Controllable subsystems 316 include powerplant subsystem 340, one or more primary subsystems 341, one or more auxiliary subsystems 343, and subsystem 316 can include a wide variety of other controllable subsystems 356. Hybrid powerplant subsystem 340, itself, includes, an engine (e.g., internal combustion engine) 344, electrical motor/generator 345, stored energy supply 346 (e.g., fuel tank and electrical storage device such as batteries, capacitors, etc.), and can include various other items 349, such as converters, inverters, variable voltage sources, pumps, valves, etc.

Control system 314 can control various items of agricultural harvesting system 300 based on sensor data detected by sensors 308, relationships 311 or 315, predictive map 264 or predictive map 265 with control zones, operator or user inputs, as well as various other bases.

Interface controllers 330 are operable to generate control signals to control interface mechanisms, such as operator interface mechanisms 318 or user interface mechanisms 364, or both. While, operator interface mechanisms 318 are shown as separate from controllable subsystems 316, it will be understood that operator interface mechanisms 318 are controllable subsystems. The interface controllers 330 are also operable to present the predictive map 264 or predictive control zone map 265 or other information derived from or based on the predictive map 264, predictive control zone map 265, or both, to operator 360 or a remote user 366, or both. Operator 360 may be a local operator or a remote operator. As an example, interface controller 330 generates control signals to control a display mechanism to display one or both of predictive map 264 and predictive control zone map 265 for the operator 360 or a remote user 366, or both. Interface controller 330 may generate operator or user actuatable mechanisms that are displayed and can be actuated by the operator or user to interact with the displayed map. The operator or user can edit the map by, for example, correcting a value displayed on the map, based on the operator's or the user's observation.

Primary subsystem(s) controllers 331 illustratively generate control signals to control one or more primary subsystems 341 of agricultural harvester 100 throughout the operation of agricultural harvester 100. Primary subsystems 341 are distinguished from auxiliary subsystems 343, in that primary subsystems 341 are generally operated throughout the harvesting operation to support the primary operation of agricultural harvester 100 (e.g., harvesting), whereas auxiliary subsystems 343 are generally operated during the operation to support a secondary operation (e.g., material transfer). Often, auxiliary subsystems 343 are operated intermittently during the operation, such as for relatively short periods of time. For example, a material transfer operation is an auxiliary operation that may be conducted intermittently throughout a harvesting operation at a field. Primary subsystems 341 can include the various subsystems, and components thereof, some examples of which are discussed above in FIG. 1, as well as various other subsystems such as steering subsystem to steer mobile machine 100 according to a desired path or according to desired parameters and a propulsion subsystem (e.g., powerplant subsystem 340 and other powertrain components) that drives tires or tracks 144 to propel agricultural harvester 100 over the field.

Auxiliary subsystem(s) controllers 334 illustratively generate control signals to control one or more auxiliary subsystems 343 of agricultural harvester 100 during the operation of agricultural harvester 100. One example of an auxiliary subsystem 343 is a material transfer subsystem that includes conveyance mechanism 134 (e.g., auger or blower), chute 135, and spout 136. As an example, auxiliary subsystem(s) controllers 334 may generate control signals to power conveyance mechanism 134 on and off, to control the speed of conveyance mechanism 134, to control the position of chute 135 and to control the position of spout 136.

Power distribution controllers 335 illustratively generate control signals to control powerplant subsystem 340 to control the distribution of power. For example, power distribution controller(s) 335 may adjust (e.g., increase or decrease) the power output generated by drawing more or less energy from stored energy supply 346. For example, power distribution controller(s) 335 may increase the power output by an internal combustion engine 344 by controlling pumps or valves to supply more fuel from stored energy supply 346 (e.g., fuel tank) to internal combustion engine 344. Power distribution controller(s) 335 may decrease the power output by an internal combustion engine 344 by controlling pumps or valves to supply less fuel from stored energy supply 346 (e.g., fuel tank) to internal combustion engine 344. Power distribution controller(s) 335 may also generate control signals to control a speed of the engine 344 to adjust a power output of the engine 344. In another example, power distribution controller(s) 335 may adjust the power output generated by an electric motor 345 by providing (e.g., discharging) more or less electrical energy from the stored energy supply (e.g., batteries, capacitors, etc.) to the motor 345. For example, power distribution controller(s) 335 may increase the power output generated by electric motor 345 by providing (e.g., discharging) more electrical energy from the stored energy supply 346 (e.g., batteries, capacitors, etc.) to the motor 345. Power distribution controller(s) 335 may decrease the power output generated by electrical motor 345 by providing (e.g., discharging) less electrical energy from the stored energy supply 346 (e.g., batteries, capacitors, etc.) to the motor 345.

In one example, motor/generator 345 can be used to supply power to operate one or more primary subsystems 341 or one or more auxiliary subsystems 343, or both. For instance, motor/generator 345 can be used to provide power to assist engine 344 in powering one or more primary subsystems 341 of the mobile machine 100, such as by assisting in powering a propulsion 11 subsystem that propels the mobile machine 100 or by assisting in powering one or more other primary subsystems 341 (e.g., threshing subsystem, cleaning subsystem, etc.). In another example, motor/generator 345 can be used to provide power to assist engine 344 in powering one or more auxiliary subsystems 343 (e.g., material transfer subsystem, etc.). Motor/generator 345 may be one unit or may be separate. For example, motor/generator 345 may one unit that acts as both a motor and a generator. Motor/generator 345 may be bidirectional. In some examples, motor/generator 345 is controllably coupled to and uncoupled from engine 344 or other powertrain components (e.g., a drive shaft). In other examples, motor/generator 345 may be continually coupled to engine 344 and be controlled in one mode to deliver power to engine 344 or other powertrain components, be controlled in another mode to receive power from engine 344 or other powertrain components to generate energy for stored energy supply 346, and be controlled in another mode (e.g., float mode or neutral) such that motor/generator 345 neither delivers power to engine 344 or other powertrain components nor generates energy for storage. In another example, motor/generator 345 may comprise a separate generator (e.g., an alternator) that is coupled to engine 344 to charge energy supply 346 (e.g., batteries, capacitors, etc.) and further comprise one or more separate electrical motors that are coupled to the energy supply 346 and may be used to power operation of one or more primary subsystems 341 or one or more auxiliary subsystems 343, or both.

Power distribution controllers 335 can generate control signals to control powerplant subsystem 341 to controllably charge stored energy supply 346 or discharge electrical energy from stored energy supply 346. Additionally, power distribution controllers 335 can generate control signals to control the amount of energy provided by stored energy supply 346 to motor/generator 345 which in turn controls the power output of motor/generator 345. As an illustrative example, during the course of the operation, there may be a power surplus (e.g., the load on engine 344 does not exceed its power output capacity) such that engine 344 can be used to drive motor/generator 345 to charge stored energy supply 346. In other examples, during the course of the operation, there may be a power deficit (e.g., the load on the engine 344 exceeds its power output capacity) such that motor/generator 345 can be used (by discharging electrical energy from stored energy supply 346) to assist engine 344 or provide boost.

Zone controller 336 illustratively generates control signals to control one or more controllable subsystems 316 to control operation of the one or more controllable subsystems 316 based on the predictive control zone map 265.

Relationship selection logic 337 illustratively selects a relationship (e.g., a model 311 or a predefined relationship 315) for use in the control of mobile agricultural harvesting machine 100. As an illustrative example, relationship selection logic 337 may select a predefined relationship 315 during an initial part of an operation, until an amount of time has passed such that a power model 311 with a sufficient sample size can be generated and used in the control of mobile harvesting machine 100. In other examples, relationship selection logic 337 may select the particular relationship based on operator or user preferences, or various other criteria. In a particular example, when selecting a predefined relationship 315, relationship selection logic 337 may identify the particular predefined relationship 315 based on machine data 317.

Auxiliary operation location logic 333 identifies or predicts locations at the field along the route of the mobile machine at which an auxiliary operation is likely to take place. For instance, based on yield data of the field (e.g., in a map), route data of the mobile machine 100, and fill level data (e.g., current fill level and threshold fill level limits), auxiliary operation location logic 333 can predictively identify locations at the field along the route of mobile machine 100 where an auxiliary material transfer operation is to take place. In other examples, auxiliary operation location logic 333 identifies or predicts locations at the field along the route of the mobile machine at which an auxiliary operation is likely to take place in various other ways, for example, but not by limitation, preset locations that may be provided by an operator or user, as well various other ways.

Other controllers 339 included on the mobile machine 100, or at other locations in agricultural system 300, can control other subsystems 316.

While the illustrated example of FIG. 2 shows that various components of agricultural harvesting system architecture 300 are located on mobile harvesting machine 100, it will be understood that in other examples one or more of the components illustrated on mobile harvesting machine 100 in FIG. 2 can be located at other locations, such as one or more remote computing systems 368. For instance, one or more of data stores 302, map selector 309, predictive model generator 310, predictive model 311, predictive map generator 312, functional predictive 8 maps 263 (e.g., 264 and 265), control zone generator 313, and control system 314 (or components thereof) can be located remotely from mobile machine 100 but can communicate with (or be communicated to) mobile machine 100 via communication system 306 and network 359. Thus, the predefined relationships 315, predictive models 311, and functional predictive maps 263 may be generated and/or located at remote locations away from mobile machine 100 and communicated to mobile machine 100 over network 302, for instance, communication system 306 can download the predefined relationships 315 and/or the predictive models 311 and functional predictive maps 263 from the remote locations and store them in data store 302. In other examples, mobile machine 100 may access the predefined relationships 315 and/or the predictive models 311 and functional predictive maps 263 at the remote locations without downloading the predefined relationships 315 and/or predictive models 311 and functional predictive maps 263. The information used in the generation of the predictive models 311 and functional predictive maps 263 may be provided to the predictive model generator 310 and the predictive map generator 312 at those remote locations over network 359, for example in-situ sensor data generator by in-situ sensors 308 can be provided over network 359 to the remote locations. Similarly, information maps 358 can be provided to the remote locations.

In some examples, control system 314 may remain local to mobile machine 100, and a remote system (e.g., 368 or 364) may be provided with functionality (e.g., such as a control signal generator) that communicates control commands to mobile machine 100 that are used by control system 314 for the control of mobile harvesting machine 100.

Similarly, where various components are located remotely from mobile machine 100, those components can receive data from components of mobile machine 100 over network 359. For example, where predefined relationships 315 and/or predictive model generator 310 and predictive map generator 312 are located remotely from mobile machine 100, such as at remote computing systems 368, data generated by in-situ sensors 308 and geographic position sensors 304, for instance, can be communicated to the remote computing systems 368 over network 359. Additionally, information maps 358 can be obtained by remote computing systems 368 over network 359 or over another network.

Figure 3A:
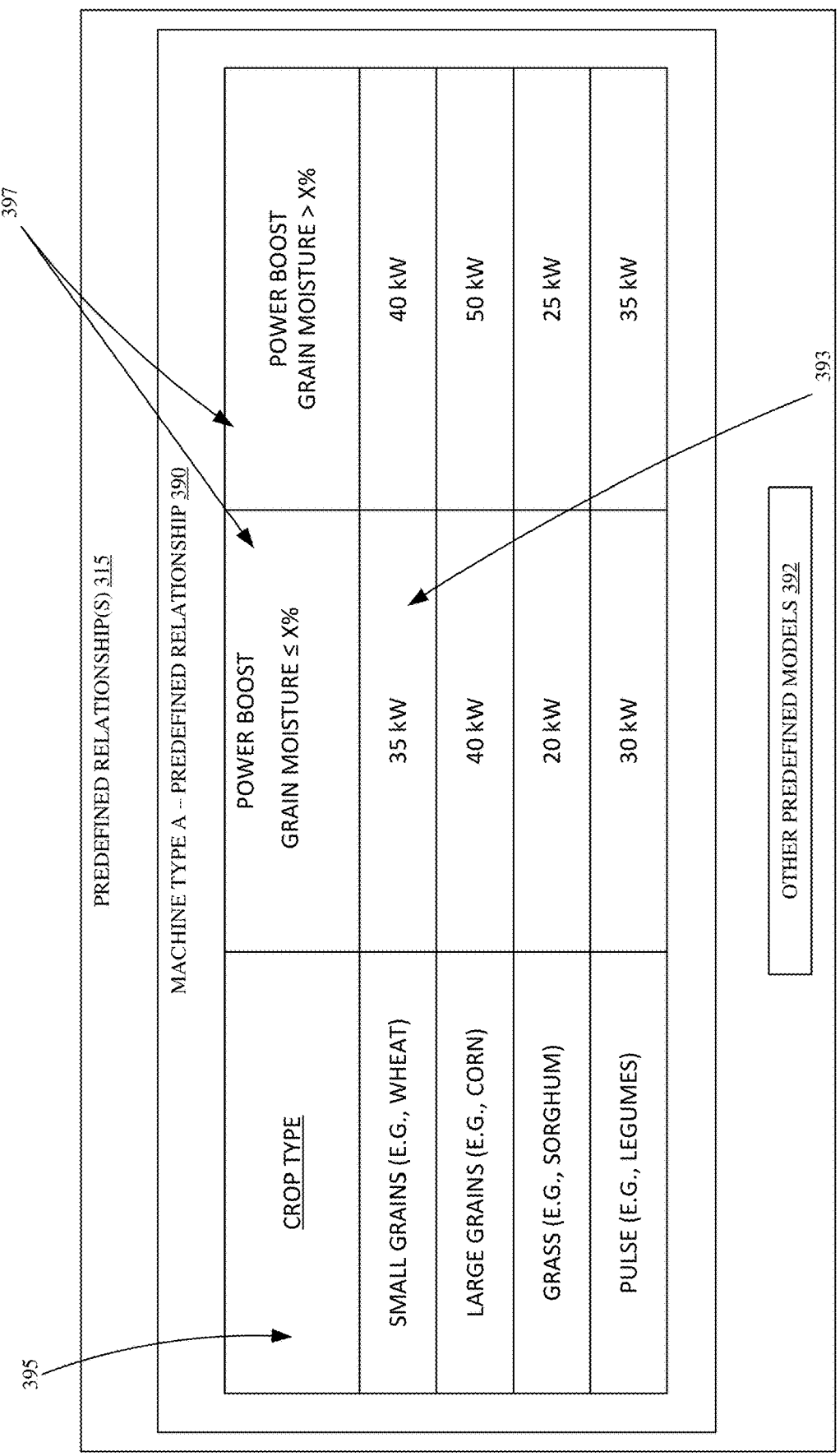
FIG. 3A is a block diagram showing one example of predefined models in more detail.

FIG. 3A is a block diagram showing one example of predefined relationships 315 in more detail. As illustrated, predefined relationships 315 include a machine type A predefined relationship 390 and can include various other types of predefined relationships 392. As previously discussed, relationship selection logic 337 may select a particular predefined relationship 315, such as based on machine data 317 (e.g., machine type). The agricultural harvester 100 may be a particular type of harvester (e.g., type A), for which machine type A predefined relationship 390 is suited for. Thus, relationship selection logic 337 parses predefined relationships 315 to identify machine type A predefined relationship 390 based on the machine data 317 of agricultural harvester 100. In other examples, operator or user preferences may be used as selection criteria by relationship selection logic 337. As illustrated, relationship 390 identifies a relationship between a power characteristic 393 (e.g., material transfer subsystem power requirement or usage) and a plurality of agricultural characteristics, illustratively shown as crop type 395 and crop moisture 397. Control system 314 can illustratively identify the crop type 395 being harvested such as based on operator or user input, sensor input (e.g., plant characteristic sensor 374 [e.g., camera] input), information maps 358 (e.g., seeding map may indicate crop type [genotype] at the field), or based on other inputs, such as the type of header 102 coupled to agricultural harvester 100. Control system 314 can identify the grain moisture 397 based on operator or user input, sensor input (e.g., plant characteristic sensor 374 [e.g., grain moisture sensor] input), information maps 358 (e.g., crop moisture map may indicate crop moisture values at the field), or based on other inputs. Based on the identified crop type 395 and grain moisture 397 and the relationship 390, control system 314 identifies a power characteristic value 393, illustratively shown as an auxiliary subsystem (e.g., material transfer subsystem) power usage (or power requirement) value. Thus, the crop type 395 and crop moisture 397 are provided as inputs to relationship 390 which then generates or indicates, as a model output, a corresponding power characteristic value 393. FIG. 3A also illustrates that a threshold can be used for an agricultural characteristic. In the illustrated example, crop moisture equal to or less than X (e.g., 14%) will provide particular power characteristic values, whereas crop moisture greater than X (e.g., 14%) will provide other particular power characteristic values, for the same type of crop.

As an illustrative example, control system 314 may identify the crop type 395 as large grains (e.g., corn) and may identify the grain moisture as 15%. Thus, control system 314 identifies, as a power characteristic value 393, 50 KW (as the required power or power usage of material transfer subsystem for a material transfer operation) based on the crop type 395, the crop moisture 397, and relationship 390. Control system 314 (e.g., power distribution controllers 335) then controls agricultural harvester 100 based on the identified power characteristic value, such as to control powerplant subsystem 340 to boost to provide additional power for material transfer subsystem 340 or to control one or more primary subsystems 341 (or items of one or more primary subsystems 341) to reduce the power requirement or usage of the one or more primary subsystems 341 (or items of one or more primary subsystems 341), or both. In one example, where the required power for a material transfer operation (e.g., 50 kW) creates a power deficit (exceeds the power output of the engine 344), power distribution controllers 335 may reduce the required power or power usage of one or more primary subsystems 341 (or one or more items of one or more primary subsystems 341). In some examples, the powerplant subsystem 340 may be boosted and one or more primary subsystems 341 (or one or more items thereof) may be controlled to reduce power usage or power requirement.

Figure 3B:
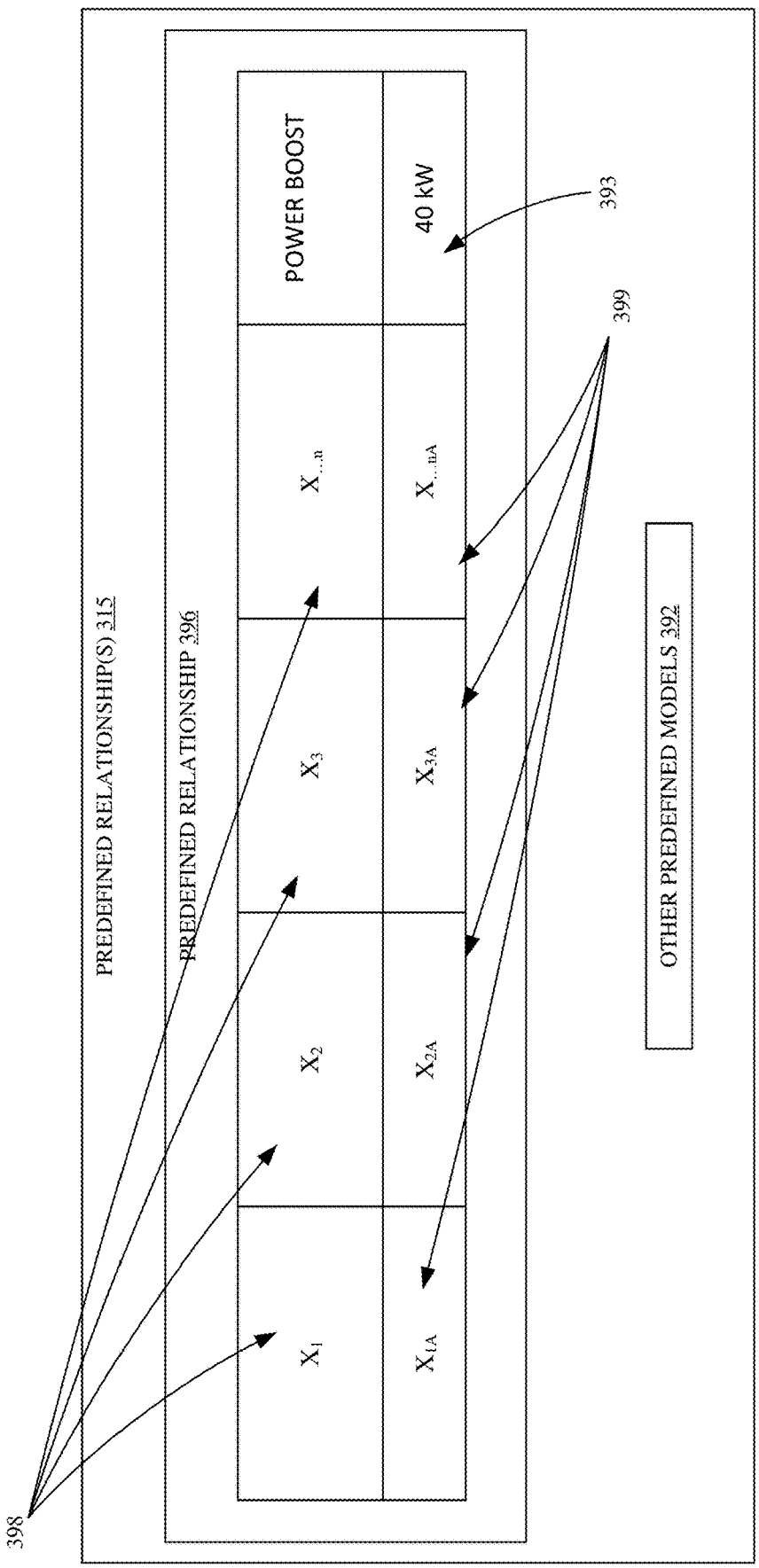
FIG. 3B is a block diagram showing one example of predefined models in more detail.

FIG. 3B is a block diagram showing one example of predefined relationships 315 in more detail. As illustrated in FIG. 3B, a predefined relationship 396 can have any number of inputs 398 as illustrated by $X_1$ through $X \ldots_n$ in the illustrated example. These inputs can be any of a wide variety of characteristics, such as operating parameters, field characteristics, plant characteristics, environmental characteristics, as well as various other characteristics. Control system 314 obtains values 399 for the input variables, from one or more sources, such as in-situ sensors 308, information maps 358, operator or user inputs, as well as various other sources. Based on the model 398, and the input variable values 399, a power characteristic value 393 can be provided as an output. In the illustrated example, the power characteristic value 393 is an auxiliary subsystem (e.g., material transfer system) power usage or power requirement value.

It will be understood that the input variable values can be values of the characteristics at a given time or a given location, or can be aggregated values over a period of time or a over a plurality of locations. For instance, in the case of crop moisture, an on-board crop moisture sensor may sense the moisture of grain as it travels through the agricultural harvester 100. To generate the power characteristic value for a material transfer subsystem performing a material transfer operation, it may be desirable to have the moisture of the crop material in the on-board tank 132. The moisture of the grain can vary along the traveled path of the machine 100, and thus, it may be desirable to have an aggregated value of the grain moisture, as sensed by the on-board crop moisture sensor, over a period of time or over a given distance, such as over the time or over the traveled path since the last time a material transfer operation was performed or over the time or over the traveled path of the machine since the harvesting machine began performing the harvesting operation (e.g., such as when a previous material transfer operation has not yet been performed).

The desired input value (e.g., an aggregated value or a value at a given time or a given location) may depend on the power characteristic value being generated. For example, when predicting a power usage or requirement for a material transfer system in a machine with an on-board grain tank, an aggregated value for certain characteristics may be desirable, such as an aggregated moisture value of the crop material in the on-board tank. On the other hand, when generating a power usage or power requirement for other subsystems, values corresponding to the geographic location may be more desirable. In some instances, even with a harvester with an on-board grain tank, a value for a given time or a given location may be desirable. For instance, when generating a predictive a power usage or requirement for a material transfer subsystem, the current pile profile (e.g., angle of repose) of the crop material pile may be desired.

The desired value may also depend on the type of machine being used. For example, a combine harvester, such as agricultural harvester 100, has an on-board grain tank and only periodically transfers material. Thus, for characteristics of the grain (or related characteristics) it may be desirable to have an aggregated value. Whereas for a forage harvester, that continually transfers material throughout an operation, it may be desirable to have a value corresponding to a given time or a given location.

It will also be understood that while the illustrated examples of FIGS. 3A and 3B show auxiliary subsystem power requirement or power usage as an output power characteristic value, in other examples, other power characteristic values can be output alternatively, or in addition to an auxiliary subsystem power requirement or power usage. For example, the predefined relationships 315 may output one or more of total power requirement or power usage or power requirement or power usage for one or more subsystems (e.g., one or more of primary subsystems 341 or one or more auxiliary subsystems 343, or both), or both.

Figure 4:
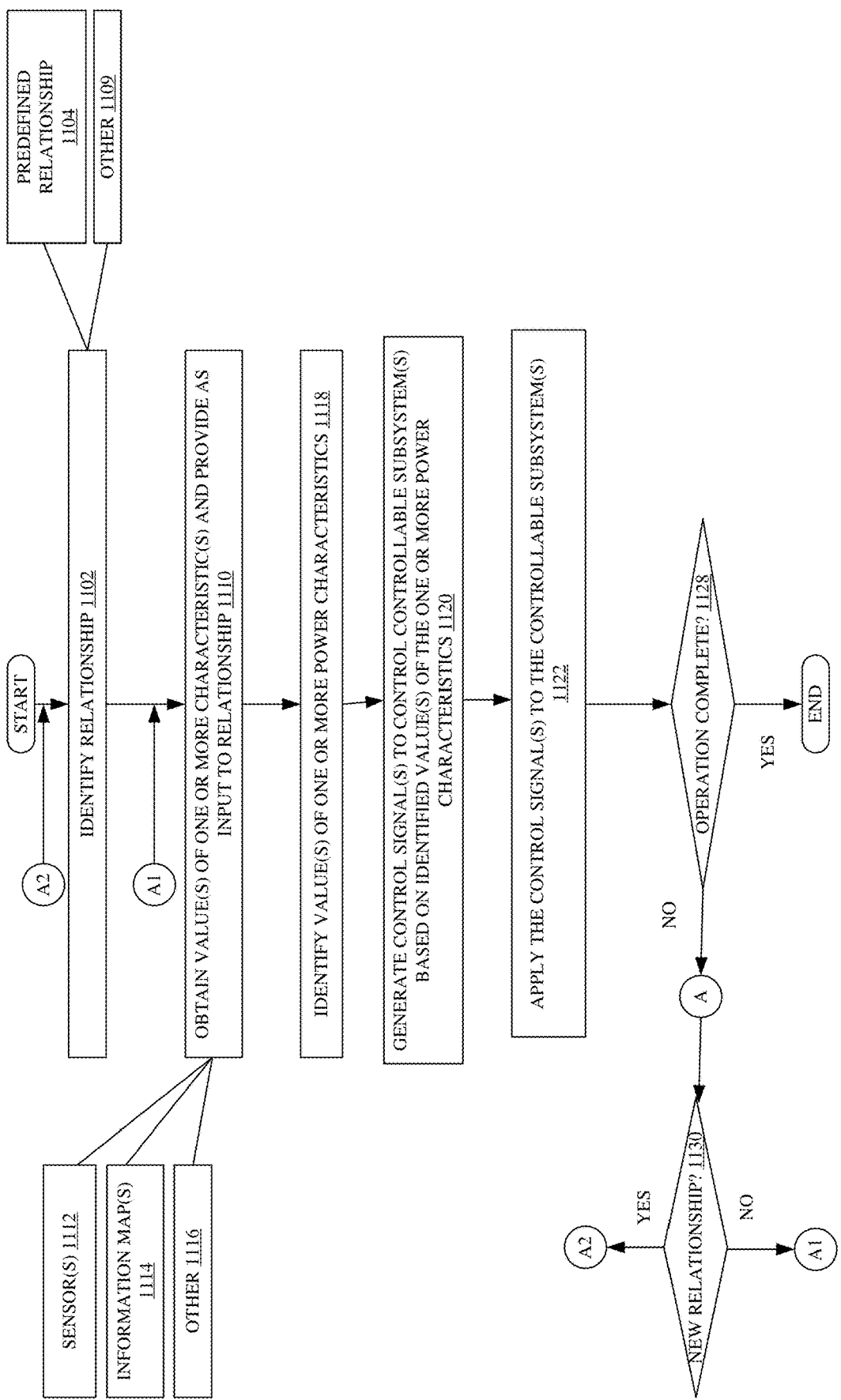
FIG. 4 is a flow diagram showing one example operation of an agricultural harvesting system architecture in using a model for control.

FIG. 4 shows a flow diagram illustrating one example of the operation of agricultural harvesting system architecture 300 in using a relationship for control.

At block 1102, relationship selection logic 337, of control system 314, identifies a relationship to use in the control of agricultural harvesting machine 100, based on a selection criteria, such as timing during the operation, operator or user preference, machine data, as well as various other selection criteria. In one example, relationship selection logic 337 selects a predefined model 315, as indicated by block 1104. In other examples, relationship selection logic 337 may select other types of models, as indicated by block 1109.

At block 1110, control system 314 obtains values of one or more characteristics and provides the obtained values as inputs to the identified model. The one or more characteristics can be, for example, one or more operating parameters, one or more plant characteristics, one or more field characteristics, one or more environmental characteristics, as well as various other characteristics. The one or more characteristics can be obtained from in-situ sensors 308, as indicated by block 1112. The one or more characteristics can be obtained from information maps 358, as indicated by block 1114. The one or more characteristics can be obtained in other ways, such as by operator or user input, as indicated by block 1116.

At block 1118, control system 314 identifies values of one or more power characteristics, such as one or more of a total power usage value or total power requirement value, a subsystem power usage value (e.g., auxiliary subsystem, such as material transfer subsystem, power usage value) or subsystem power requirement value (e.g., auxiliary subsystem, such as material transfer subsystem, power requirement value), and an item power usage value (e.g., conveyance mechanism 134 power usage value) or an item power requirement value (e.g., conveyance mechanism 134 power requirement value), based on the identified relationship and the obtained values as one or more relationship inputs.

At block 1120, control system 314 generates control signals to control one or more controllable subsystems based on the identified value(s) of the one or more power characteristics. For example, control system 314 may generate control signals to control one of the controllable subsystems 316 at block 1120. Additionally, or alternatively, control system 314 may generate control signals to control one or more interface mechanisms (e.g., 318 or 364, or both) to provide a display, alert, notification, or other indication. Various other control signals can be generated.

At block 1122, the control signals are applied to the controllable subsystems.

At block 1128, it is determined if the operation has been completed. If the operation has not been completed, processing proceeds to block 1130 where it is determined if a new relationship is to be used. For example, the previously identified relationship may have provided less than satisfactory performance results, in which case, relationship selection logic 337 may determine that a new relationship should be selected. In other examples, the operator or user May provide an input commanding the selection of a new relationship. Various other criteria may require the selection of a new model. In any case, if a new relationship is to be selected, processing proceeds at block 1102. If a new relationship is not to be selected, processing proceeds to block 1110.

If, at block 1128, it is determined that the operation has be completed, then the operation ends.

Figure 5:
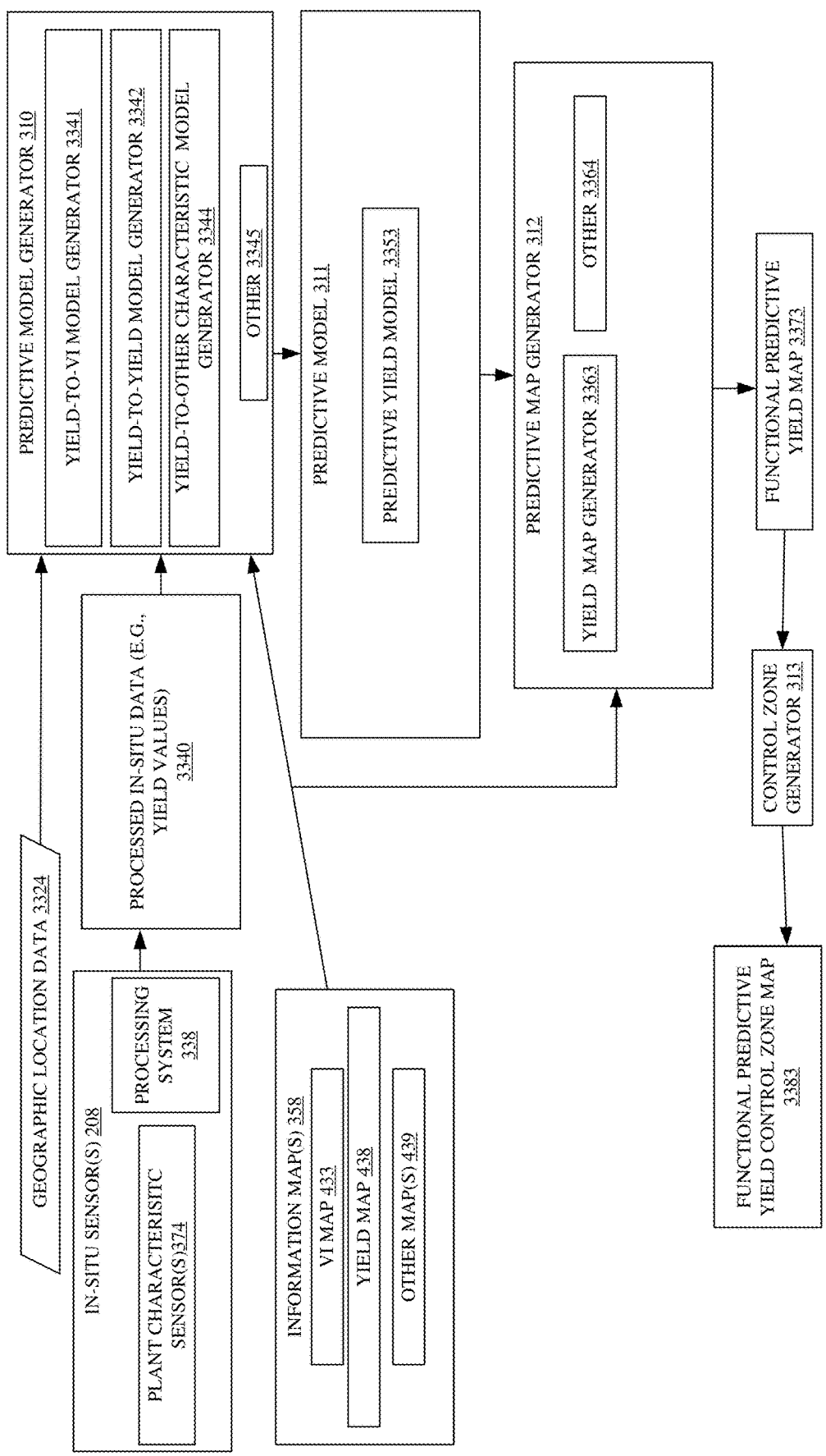
FIG. 5 is a block diagram showing one example of a predictive model generator and a predictive map generator.

FIG. 5 is a block diagram of a portion of the agricultural harvesting system architecture 300 shown in FIG. 2. Particularly, FIG. 5 shows, among other things, examples of the predictive model generator 310 in more detail. FIG. 5 also illustrates the information flow among the various components shown. The predictive model generator 310 receives one or more of a vegetative index (VI) map 433, a yield map 438, such as a predictive yield map or a historical yield map, and another type of map 439. The predictive model generator 310 receives processed sensor data 3340 indicative of yield values. The processing system 338 processes sensor data generated from in-situ sensors 308 to generate processed sensor data 3340. In-situ sensors 308 illustratively include plant characteristics sensors 374, such as yield sensors, as well as processing system 338. While processing system 338 is shown as part of in-situ sensors 338, in other examples, processing system 338 is separate from in-situ sensors 308 (such as the example shown in FIG. 2). In some examples, plant characteristic sensors 374, such as yield sensors, may be located on-board mobile harvesting machine 100.

Predictive model generator 310 also receives a geographic location 3324, or an indication of a geographic location, such as from geographic positions sensor 304. Geographic location 3324 illustratively represents the geographic location of a value detected by in-situ sensors 308. In some examples, the geographic position of the mobile machine 100, as detected by geographic position sensors 304, will not be the same as the geographic position on the field to which a value detected by in-situ sensors 308 corresponds. It will be appreciated, that the geographic position indicated by geographic position sensor 304, along with timing, machine speed and heading, machine dimensions, sensor position (e.g., relative to geographic position sensor), sensor parameters, as well as various other data, can be used to derive a geographic location at the field to which a value a detected by an in-situ sensor 308 corresponds.

As shown in FIG. 5, the example predictive model generator 310 includes yield-to-vegetative index (VI) model generator 3341, yield-to-yield model generator 3342, and yield-to-other characteristic model generator 3344. In other examples, the predictive model generator 310 may include additional, fewer, or different components than those shown in the example of FIG. 5. Consequently, in some examples, the predictive model generator 310 may include other items 3345 as well, which may include other types of predictive model generators to generate other types of yield models.

Yield-to-VI model generator 3341 identifies a relationship between yield value(s) detected in in-situ sensor data 3340, at geographic location(s) to which the yield value(s), detected in the in-situ sensor data 3340, correspond, and vegetative index (VI) value(s) from the VI map 433 corresponding to the same geographic location(s) to which the detected yield value(s) correspond. Based on this relationship established by yield-to-VI model generator 3341, yield-to-VI model generator 3341 generates a predictive yield model. The predictive yield model is used by predictive yield map generator 3363 to predict yield at different locations in the field based upon the georeferenced VI values contained in the VI map 433 corresponding to the same locations in the field. Thus, for a given location in the field, a yield value can be predicted at the given location based on the predictive yield model and the VI value, from the VI map 433, corresponding to that given location.

Yield-to-yield model generator 3342 identifies a relationship between yield value(s) detected in in-situ sensor data 3340, at geographic location(s) to which the yield value(s), detected in the in-situ sensor data 3340, correspond, and yield value(s) (e.g., mapped historical yield values or mapped predictive yield values) from the yield map 4338 corresponding to the same geographic location(s) to which the detected yield value(s) correspond. Based on this relationship established by yield-to-yield model generator 3342, yield-to-yield model generator 3342 generates a predictive yield model. The predictive yield model is used by predictive yield map generator 3363 to predict yield at different locations in the field based upon the georeferenced yield values contained in the yield map 438 corresponding to the same locations in the field. Thus, for a given location in the field, a yield value can be predicted at the given location based on the predictive yield model and the yield value, from the yield map 438, corresponding to that given location.

Yield-to-other characteristic model generator 3344 identifies a relationship between yield value(s) detected in in-situ sensor data 3340, at geographic location(s) to which the yield value(s), detected in the in-situ sensor data 3340, correspond, and other characteristic value(s) from an other map 439 corresponding to the same geographic location(s) to which the detected yield value(s) correspond. Based on this relationship established by yield-to-other characteristic model generator 3344, yield-to-other characteristic model generator 3344 generates a predictive yield model. The predictive yield model is used by predictive yield map generator 3363 to predict yield at different locations in the field based upon the georeferenced other characteristic values contained in the other map 439 corresponding to the same locations in the field. Thus, for a given location in the field, a yield value can be predicted at the given location based on the predictive yield model and the other characteristic value, from the other map 439, corresponding to that given location.

In light of the above, the predictive model generator 310 is operable to produce a plurality of predictive power models, such as one or more of the predictive power models generated by model generators 3341, 3342, 3344 and 3345. In another example, two or more of the predictive models described above may be combined into a single predictive yield model, such as a predictive yield model that predicts yield based upon two or more of the VI values, the mapped yield values, and the other characteristic values at different locations in the field. Any of these yield models, or combinations thereof, are represented collectively by predictive yield model 3353 in FIG. 5.

The predictive yield model 3353 is provided to predictive map generator 312. In the example of FIG. 5, predictive map generator 312 includes a predictive yield map generator 3363. In other examples, predictive map generator 312 may include additional or different map generators. Thus, in some examples, predictive map generator 312 may include other items 3364 which may include other types of map generators to generate other types of maps.

Predictive yield map generator 3363 receives one or more of the VI map 433, the yield map 438, and an other map 439, along with the predictive yield model 3353 which predicts yield based upon one or more of a VI value, a yield value, and an other characteristic value, and generates a predictive map that predicts yield at different locations in the field, such as functional predictive yield map 3373.

Predictive map generator 312 thus outputs a functional predictive yield map 3373 that is predictive of yield. The functional predictive yield map 3373 is a predictive map 264. The functional predictive yield map 3373 predicts yield at different locations in a field. The functional predictive yield map 3373 may be provided to control zone generator 313, control system 314, or both. Control zone generator 313 generates control zones and incorporates those control zones into the functional predictive yield map 3373 to produce a predictive control zone map 265, that is a functional predictive yield control zone map 3383. One or both of functional predictive yield map 3373 and functional predictive yield control zone map 3383 may be provided to control system 314, which generates control signals to control one or more of the controllable subsystems 316 based upon the functional predictive yield map 3373, the functional predictive yield control zone map 3383, or both.

Figure 6:
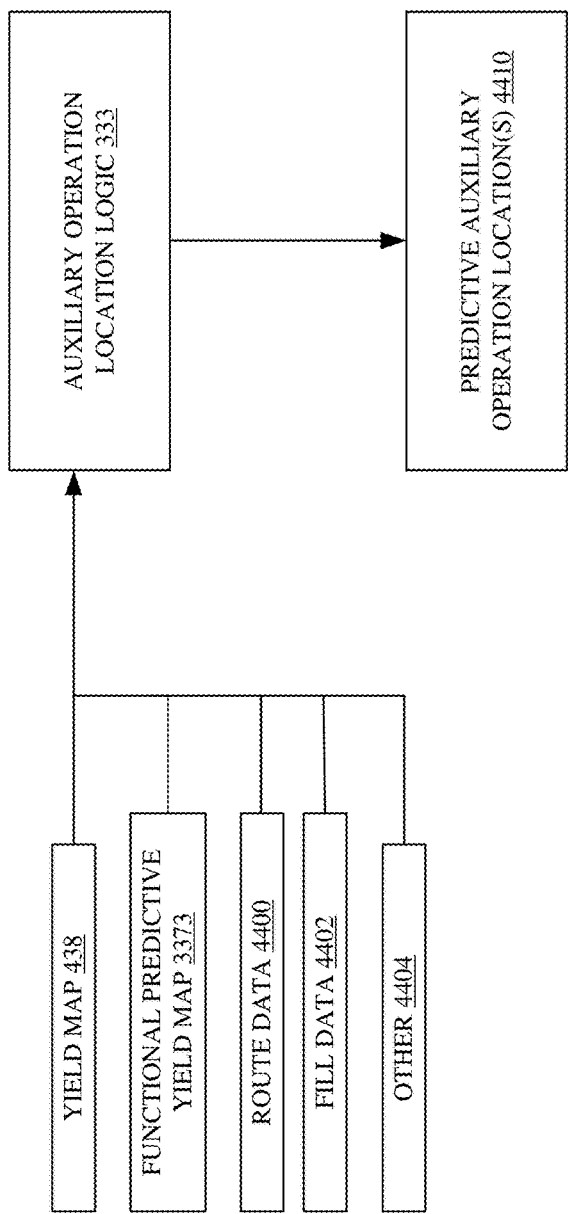
FIG. 6 is a block diagram showing one example of auxiliary operation location logic of the control system shown in FIG. 2.

FIG. 6 is a block diagram of a portion of the agricultural harvesting system architecture 300 shown in FIG. 2. Particularly, FIG. 6 shows, among other things, examples of the auxiliary operation location logic 333 in more detail. FIG. 6 also illustrates the information flow among the various components shown. Auxiliary operation location logic 333 receives a yield map, such as yield map 438, functional predictive yield map 3373, or another type of yield map, route data 4400, fill data 4402, as well as various other data 4404.

Route data 4400 illustratively indicates a route of mobile harvesting machine 100 at the field, including the route already traveled and the route to be travelled. Route data 4400 can be derived from sensor information, such as from geographic position sensors 304 or heading/speed sensors 325, or both. Route data 4400 may be in the form of a map, such as prescribed route map. Route data 4400 may be an output from control system 314, such as a commanded or planned route at the field. Route data 4400 may be obtained in various other ways, such as from an operator or user input.

Fill data 4402 includes data indicative of a fill level of the on-board tank 132 of harvester 100. The fill level of the on-board tank 132 may be derived from sensors 308, such as a tank camera (e.g., 150), yield or mass flow sensors, weight sensors (e.g., load cells, strain gauges, etc.) that detect a weight of material in the on-board tank, as well as various other sensors. Fill data 4402 also indicates fill capacity of the on-board tank (e.g., volume capacity or weight capacity, or both) as well as fill level threshold data. The fill capacity can be stored in data store 302, such as part of machine data 317. The fill level threshold data can be provided by an operator or user or generated by control system 314, or obtained in various other ways. The fill level threshold data can also be stored in data store 302.

Auxiliary operation location logic 333 can also receive various other data 4404, for example, but not by limitation, the operational characteristics and parameters of the material transfer subsystem, such as the speeds or speed ranges of auger/blower 134, the material transfer rate of the material transfer subsystem (e.g., 5 bushels per second, etc.), as well as various other information. The operational characteristics of the material transfer subsystem can be stored in data store 302, such as part of machine data 317.

Auxiliary operation location logic 333 illustratively identifies one or more predictive auxiliary operation locations at the field at which mobile harvesting machine 100 operates. Predictive auxiliary operation locations are indicative of locations at the field, along the route of mobile harvesting machine 100 at which a material transfer operation will be performed. The location(s) 4410 can cover a zone of the field along the route of the machine that stretches from a predictive starting point to a predictive ending point. In this way, as will be described below, the power characteristics of the machine 100 (e.g., the material transfer subsystem power usage or power requirement) during a material transfer operation can be predicted. Based on the current fill level of the mobile harvesting machine 100, as indicated by fill level data 4402, fill capacity or fill threshold, as indicated by fill level data 4402, the route of the machine, as indicated by route data 4400, as well as yield values along the route, as indicated by a yield map (e.g., yield map 438 or functional predictive yield map 3373), as well as operational characteristics of the material transfer subsystem (e.g., auger/blower speeds, material transfer rate, etc.), as indicated by other data 4404, auxiliary operation location logic 333 can identify one or more predictive auxiliary operation location(s). Auxiliary operation location logic 333 can aggregate yield values (as indicated by a yield map) along the route of the mobile harvesting machine 100 to identify a location along the route at which the harvesting machine 100 will be full (e.g., to capacity or to a threshold level) and thus the predictive location at which the material transfer operation will be initiated. In some examples, the location at which the material transfer operation will be initiated can be located earlier in the route, separated from the location at which the harvesting machine 100 will be full, such as by a threshold distance. Auxiliary operation location logic 333 can also identify a location at which the material transfer operation will be ended. In some examples, the end location may be identified as the location at which the material transfer subsystem will have transferred a given amount of crop material, or at which it will be emptied to a threshold level, or it may be prior to or at the end of a pass.

Figure 7:
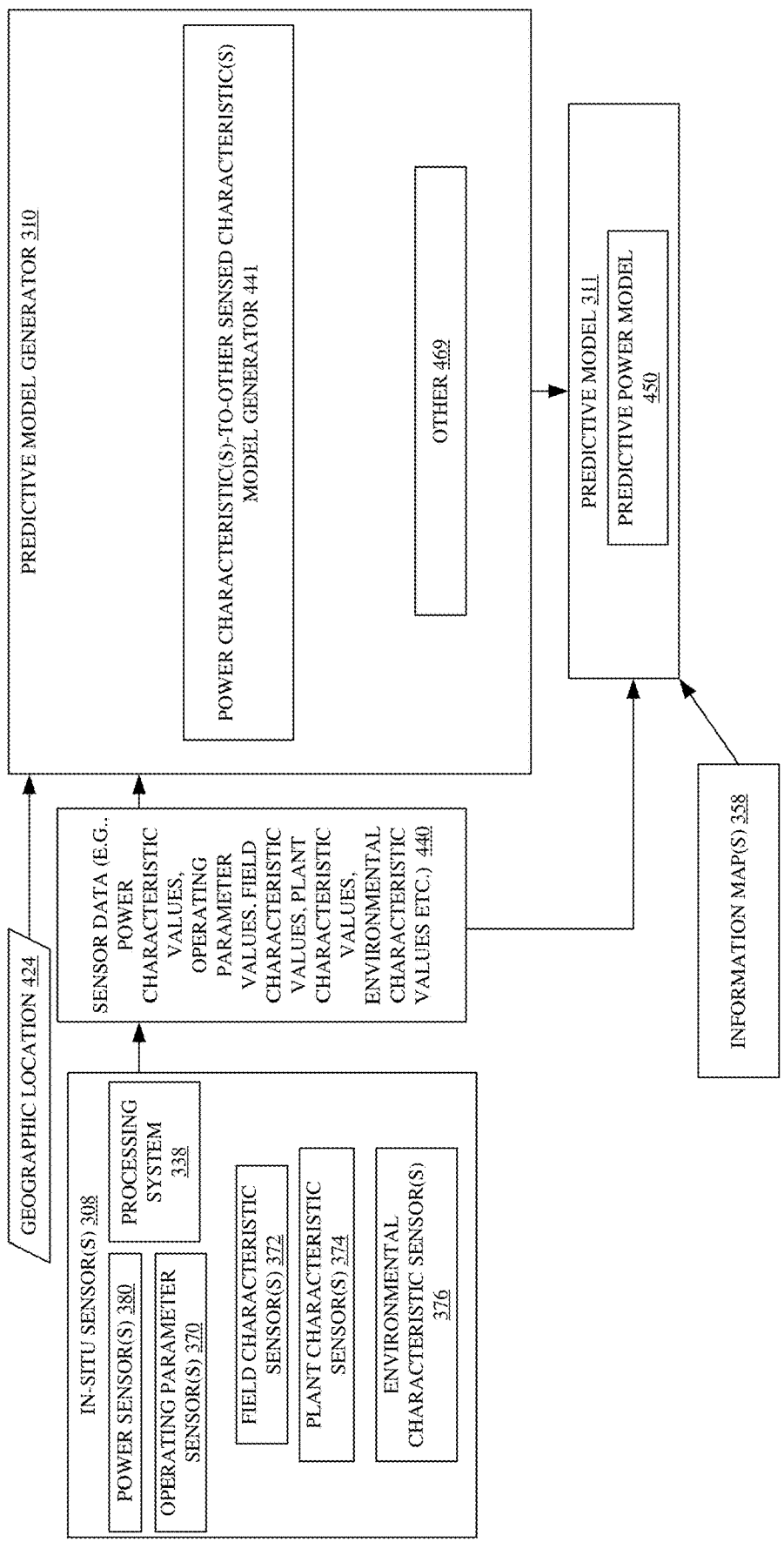
FIG. 7 is a block diagram showing one example of a predictive model generator.

FIG. 7 is a block diagram of a portion of the agricultural harvesting system architecture 300 shown in FIG. 2. Particularly, FIG. 7 shows, among other things, examples of the predictive model generator 310 in more detail. FIG. 7 also illustrates the information flow among the various components shown. The predictive model generator 310 receives processed sensor data 440 indicative of values of one or more power characteristics and one or more of values of one or more operating parameters, values of one or more field characteristics, values of one or more plant characteristics, and values of one or more environmental characteristics. The processing system 338 processes sensor data generated from in-situ sensors 308 to generate processed sensor data 440. While processing system 338 is shown as part of in-situ sensors 338, in other examples, processing system 338 is separate from in-situ sensors 308 (such as the example shown in FIG. 2).

Predictive model generator 310 also receives a geographic location 424, or an indication of a geographic location, such as from geographic positions sensor 304. Geographic location 424 illustratively represents the geographic location of a value detected by in-situ sensors 308. In some examples, the geographic position of the mobile machine 100, as detected by geographic position sensors 304, will not be the same as the geographic position on the field to which a value detected by in-situ sensors 308 corresponds. It will be appreciated, that the geographic position indicated by geographic position sensor 304, along with timing, machine speed and heading, machine dimensions, sensor position (e.g., relative to geographic position sensor), sensor parameters (e.g., sensor field of view), as well as various other data, can be used to derive a geographic location at the field to which a value a detected by an in-situ sensor 308 corresponds.

As shown in FIG. 7, the example predictive model generator 310 includes power characteristic(s)-to-other sensed characteristic(s) model generator 441. In other examples, the predictive model generator 310 may include additional, fewer, or different components than those shown in the example of FIG. 7. Consequently, in some examples, the predictive model generator 310 may include other items 469 as well, which may include other types of predictive model generators to generate other types of power models.

Power characteristic(s)-to-other sensed characteristic(s) model generator 441 identifies a relationship between value(s) of one or more power characteristics detected in in-situ sensor data 440, at geographic location(s) to which the value(s) of the one or more power characteristics detected in the in-situ sensor data 440, correspond, and value(s) of one or more other sensed characteristics (e.g., one or more of value(s) of operating parameter(s), value(s) of field characteristic(s), value(s) of plant characteristic(s), and value(s) of environmental characteristic(s)) detected in the in-situ sensor data 440 corresponding to the same geographic location(s) to which the detected value(s) of the one or more power characteristics correspond. Based on this relationship established by power characteristic(s) to-other sensed characteristic(s) model generator 441, power characteristic(s) to-other sensed characteristic(s) model generator 441 generates a predictive power model. The predictive power model is used by control system 314 to predict value(s) of one or more power characteristics based on further value(s) of one or more other characteristics (e.g., one or more of value(s) of operating parameter(s), value(s) of field characteristic(s), value(s) of plant characteristic(s), and value(s) of environmental characteristic(s)) detected in in-situ sensor data 440 or provided by another source, such as information maps 358. Thus, one or more power characteristics can be predicted based on the predictive power model 450 and value(s) of one or more other characteristics.

It will be understood that the values of the one or more other sensed characteristics corresponding to the same geographic location(s) as the detected values of the one or more power characteristic(s) may not be the instantaneous value of the characteristic at the given location, but rather, may be an aggregated value of the characteristic as detected over a period of time (e.g., since the last time material was transferred from the on-board tank, or if no previous material transfer operation, since the time the harvesting operation started) along the harvesting machine's route. In the example of attempting to predict, as the power characteristic value, a material transfer subsystem power requirement or power usage, it is desirable to have an idea of the characteristics of the crop material as stored in the on-board tank 132. For example, the moisture of the crop material in the on-board tank 132. For other characteristics, it may be desirable to have an instantaneous value, that is, the value at the given location, for instance, the angle of repose of the crop material pile in the on-board tank 132 at the given location, the machine dynamics (e.g., pitch roll, yaw) the given location, the wind at the given location, etc. In either case, it will be understood that the value(s) of one or more other sensed characteristics (e.g., one or more of value(s) of operating parameter(s), value(s) of field characteristic(s), value(s) of plant characteristic(s), and value(s) of environmental characteristic(s)) detected in the in-situ sensor data 440 corresponding to the same geographic location(s) to which the detected value(s) of the one or more power characteristics correspond can be the values of the characteristics at the locations of the detected 6 power characteristics or can be an aggregated value of the characteristics up to the locations of the detected power characteristics. Processing system 338 can be configured to generate the values as desired for each characteristic.

The predictive value(s) of the one or more power characteristics can be used by control system 314 to control one or more controllable subsystems 316, can be provided to operator 360 or user 364, or both, such as via display, or can be provided to another machine operating at the worksite. Thus, it can be seen in the example of FIG. 7, that predictive model generator can generate a predictive power model, such as predictive power model 450, that models a relationship between sensed values one or more power characteristics and sensed values of one or more other agricultural characteristics. The predictive power model can be used to predict values of one or more power characteristics. Power characteristics can include, total power usage or power requirement of agricultural harvester 100, power usage or power requirement of one or more subsystems (e.g., power usage or power requirement of an auxiliary subsystem 343, such as material transfer subsystem), and power usage or power requirement of one or more items of agricultural harvester 100 (e.g., conveyance mechanism 134 power usage or power requirement). Thus, predictive power model 450 can predict one or more of total power usage or power requirement values, power usage or power requirement of one or more subsystems (e.g., power usage or power requirement of an auxiliary subsystem 343, such as material transfer subsystem), and power usage or power requirement of one or more items (e.g., power usage or power requirement of conveyance mechanism 134).

Figure 8:
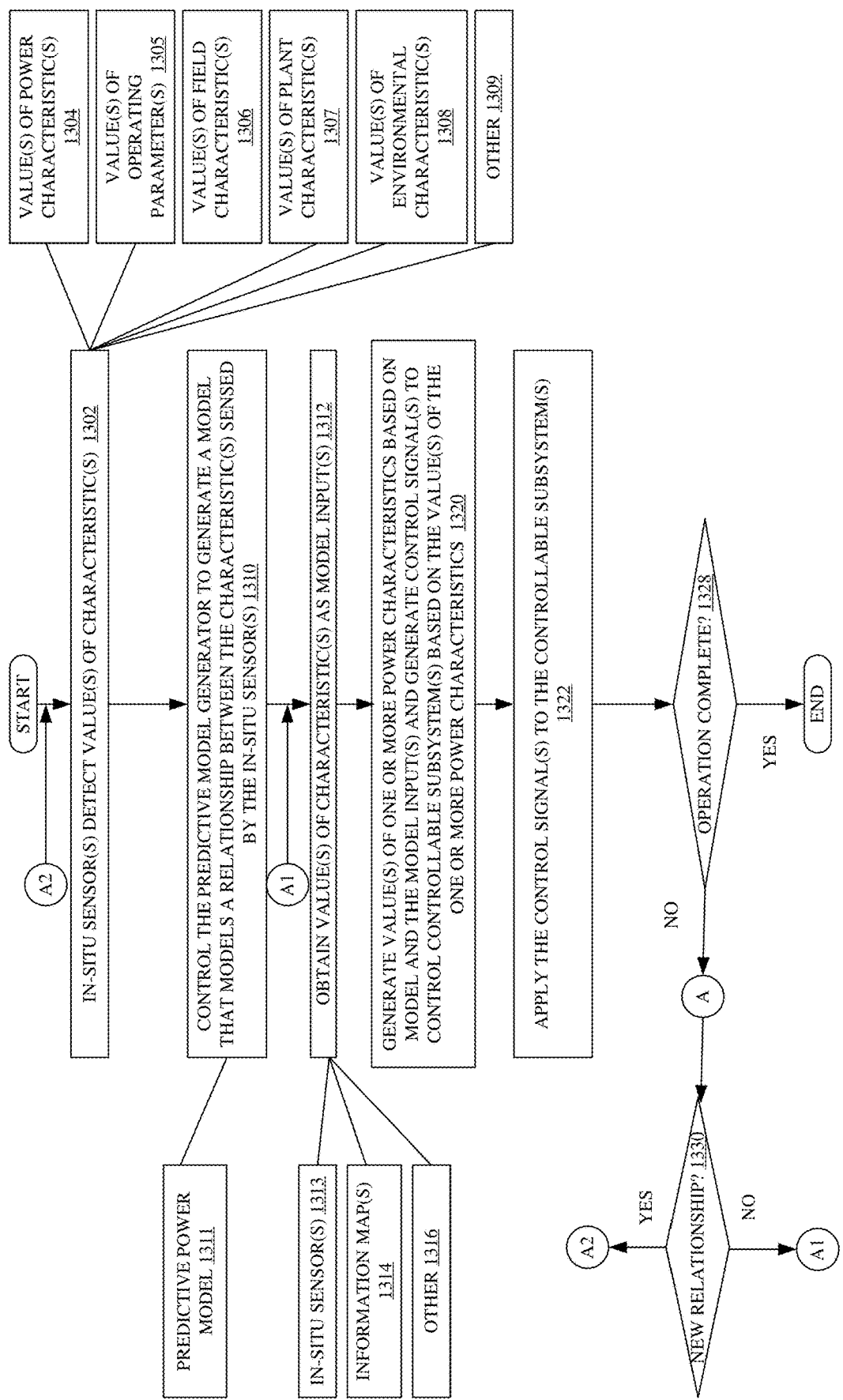
FIG. 8 shows a flow diagram illustrating one example of operation of an agricultural harvesting system architecture in generating a predictive model.

FIG. 8 shows a flow diagram illustrating one example of the operation of agricultural harvesting system architecture 300 in generating a model.

At block 1302, one or more in-situ sensors 308 generate sensor data indicative of value(s) of one or more characteristics. For example, power sensors 380 generate sensor data indicative of value(s) of one or more power characteristics, as indicated by block 1304. Operating parameter sensors 370 generate sensor data indicative of value(s) of one or more operating parameters, as indicated by block 1305. Field characteristic sensors 372 generate sensor data indicative of value(s) of one or more field characteristics, as indicated by block 1306. Plant characteristic sensors 374 generate sensor data indicative of value(s) of one or more plant characteristics, as indicated by block 1307. Environmental characteristic sensors 376 generate sensor data indicative of one or more environmental characteristics, as indicated by block 1308. Various other in-situ sensors may generate sensor data indicative of various other characteristics, as indicated by block 1309.

At block 1310, predictive model generator 310 controls one or more of the model generators 441 and 469 to generate a model that models the relationship between the values of characteristics detected by the in-situ sensors 308. Predictive model generator generates a predictive power model 450 that predicts values of one or more power characteristics based on one or more of value(s) of one or more operating parameters, value(s) of one or more field characteristics, value(s) of one or more plant characteristics, value(s) of one or more environmental characteristics, and value(s) of one or more other characteristics. Generating a predictive power model, such as predictive power model 450, is indicated by block 1311.

At block 1312, agricultural system 300 obtains additional values of one or more characteristics, such as one or more of operating parameters, field characteristics, plant characteristics, environmental characteristics, and other characteristics that are to be used as model inputs. The values may be detected by in-situ sensors 308, as indicated by block 1313. The values may be obtained from information maps 358, as indicted by block 1314. The values may obtained from various other sources, as indicated by block 1316. As described previously, the values May be aggregated values (such as aggregated along the route of the machine 100) or may be instantaneous values.

At block 1320, predictive power model 450 generates value(s) of one or more power characteristics based on the model input values obtained at block 1312 and control system 314 generates control signals to control one or more controllable subsystems based on the value(s) of one or more power characteristics generated by the predictive power model 450. For example, control system 314 may generate control signals to control one of the controllable subsystems 316 at block 1120. For example, power distribution controller 335 may generate control signals to control the power distribution based on the value(s) of one or more power characteristics generated by the predictive power model 450. For example, power distribution controllers 335 may control powerplant subsystem 340 to generate the required power as predicted by predictive power model 450. For instance, power distribution controllers 335 may generate control signals to control motor/generator 345 to provide a power boost to power an auxiliary operation (e.g., a material transfer operation), based on the required power as provided by predictive power model 450. In other examples, power distribution controllers 335 may generate control signals to control motor/generator 345 or engine 344, or both, to output power based on predictive power characteristic values as provided by predictive power model. For instance, a power deficit May occur in scenarios other than when an auxiliary operation is to be performed, for instance, a power deficit may occur in various scenarios and with variance in characteristics at the field. For example, a power deficit may occur when the harvester is traveling uphill, through moister soil, when processing moist crop, as well as various other scenarios. In any case, it will be understood that power distribution controllers 335 can control motor/generator 345 or engine 344 to provide additional power regardless of whether an auxiliary operation is to be performed, for instance, they may be controlled to provide additional power when a power deficit is indicated by the predictive power characteristic values provided by predictive power model 450. In yet other examples, power distribution controllers 335 may generate control signals to control motor/generator 345 to generate energy to charge stored energy supply 346 based on predictive power characteristic values as provided by predictive power model 450, such as predictive power characteristic values that indicate a power surplus. Additionally, or alternatively, control system 314 may generate control signals to control one or more interface mechanisms (e.g., 318 or 364, or both) to provide a display, alert, notification, or other indication. Various other control signals can be generated.

At block 1322, the control signals are applied to the controllable subsystems.

At block 1328, it is determined if the operation has been completed. If the operation has not been completed, processing proceeds to block 1330 where it is determined if a new model is to be used. For example, the model 450 may be updated periodically, based on some learning trigger criteria, such as an amount of time or distance traveled, based on deviation between predictive values and detected values, based on operator or user preferences, as well as various other learning trigger criteria. In other examples, the predictive model 450 may be updated continuously throughout the operation. In any case, if a new model is to be generated, processing proceeds at block 1302. If a new model is not to be generated, processing proceeds to block 1310.

If, at block 1328, it is determined that the operation has been completed, then the operation ends.

Figure 9:
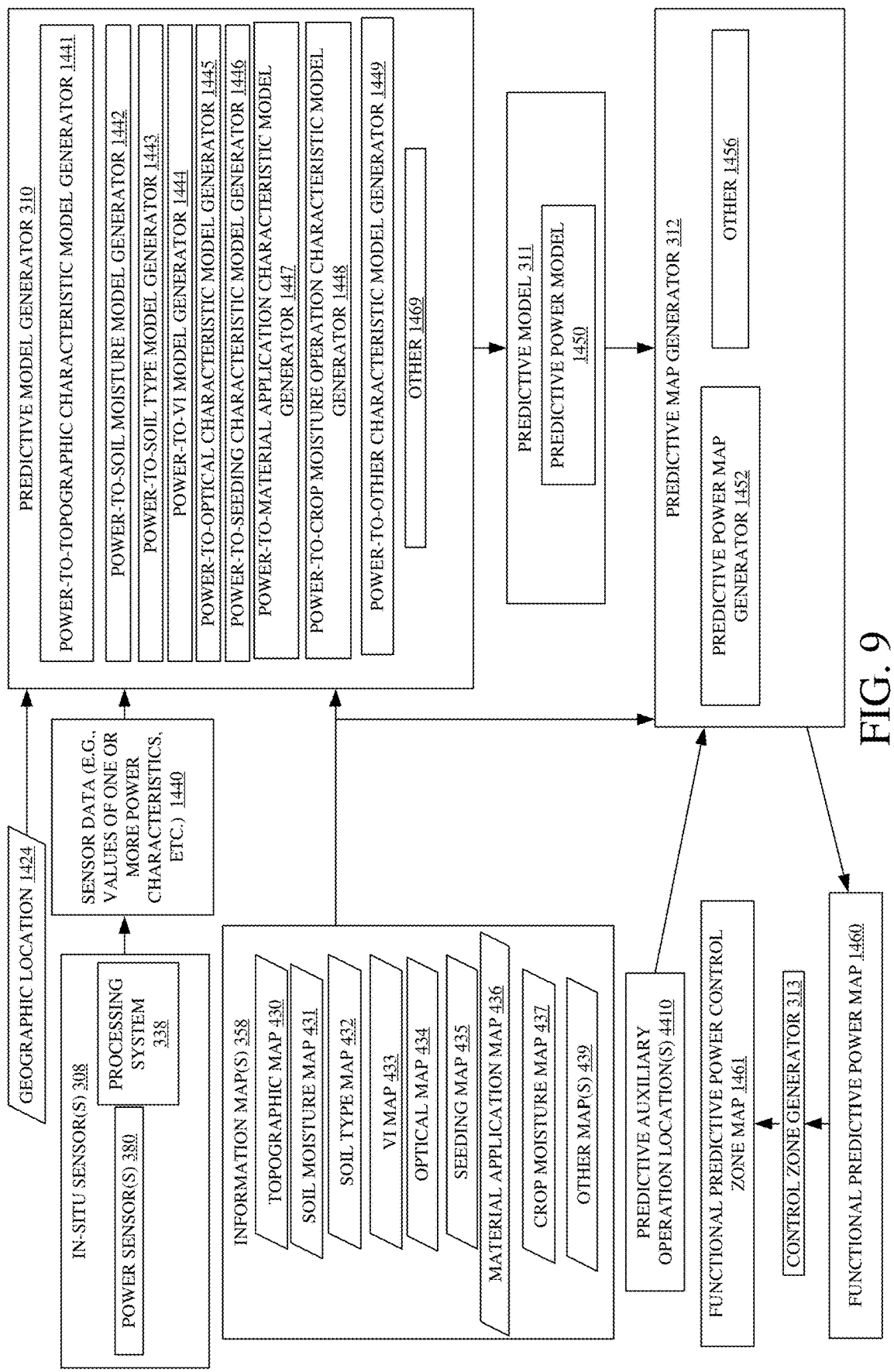
FIG. 9 is a block diagram showing one example of a predictive model generator and predictive map generator.

FIG. 9 is a block diagram of a portion of the agricultural harvesting system architecture 300 shown in FIG. 2. Particularly, FIG. 9 shows, among other things, examples of the predictive model generator 310 and the predictive map generator 312 in more detail. FIG. 9 also illustrates information flow among the various components shown. The predictive model generator 310 receives one or more of a topographic map 430, a soil moisture map 431, a soil type map 432, a vegetative index (VI) map 433, an optical map 434, one or more prior operation maps, such as seeding map 435 and material application map 436, a crop moisture map 437, and another type of map 439. Predictive model generator 310 also receives a geographic location information 1424, or an indication of a geographic locations, such as from geographic positions sensor 304. Geographic location information 1424 illustratively represents the geographic locations to which values detected by in-situ sensors 308 correspond. In some examples, the geographic position of the mobile machine 100, as detected by geographic position sensors 304, will not be the same as the geographic position on the field to which a value detected by in-situ sensors 308 corresponds. It will be appreciated, that the geographic position indicated by geographic position sensor 304, along with timing, machine speed and heading, machine dimensions, machine processing delays, sensor position (e.g., relative to geographic position sensor), sensor parameters (e.g., sensor field of view), as well as various other data, can be used to derive a geographic location at the field to which a value a detected by an in-situ sensor 308 corresponds.

In-situ sensors 308 illustratively include power sensors 380, as well as processing system 338. In some examples, processing system 338 is separate from in-situ sensors 308 (such as the example shown in FIG. 2). In some instances, power sensors 380 may be located on-board mobile harvesting machine 100. The processing system 338 processes sensor data generated from power sensors 380 to generate processed sensor data 1440 indicative of values of one or more power characteristics. The power characteristic values may indicate one or more of total power usage or power requirement, subsystem power usage or power requirement, and item (or component) power usage or power requirement.

As shown in FIG. 9, the example predictive model generator 310 includes a power characteristic(s)-to-topographic characteristic model generator 1441, a power characteristic(s)-to-soil moisture model generator 1442, a power characteristic(s)-to-soil type model generator 1443, power characteristic(s)-to-vegetative index (VI) model generator 1444, a power characteristic(s)-to-optical characteristic model generator 1445, a power characteristic(s)-to-seeding characteristic model generator 1446, a power characteristic(s)-to-material application characteristic model generator 1447, a power characteristic(s)-to-crop moisture model generator 1448, and a power characteristic(s)-to-other characteristic model generator 1449. In other examples, the predictive model generator 310 may include additional, fewer, or different components than those shown in the example of FIG. 9. Consequently, in some examples, the predictive model generator 310 may include other items 1469 as well, which may include other types of predictive model generators to generate other types of power models.

Power characteristic(s)-to-topographic characteristic model generator 1441 identifies a relationship between value(s) of one or more power characteristics detected in in-situ sensor data 1440, at geographic location(s) to which the value(s) of the one or more power characteristics detected in the in-situ sensor data 1440, correspond, and topographic characteristic value(s) from the topographic map 430 corresponding to the same geographic location(s) to which the detected value(s) of the one or more power characteristics correspond. Based on this relationship established by power characteristic(s)-to-topographic characteristic model generator 1441, power characteristic(s)-to-topographic characteristic model generator 1441 generates a predictive power model. The predictive power model is used by predictive power map generator 1452 to predict one or more power characteristics at different locations in the field based upon the georeferenced topographic characteristic values contained in the topographic map 430 corresponding to the same locations in the field. Thus, for a given location in the field, a value of one or more power characteristics, can be predicted at the given location based on the predictive power model and the topographic characteristic value, from the topographic map 430, corresponding to that given location.

Power characteristic(s)-to-soil moisture model generator 1442 identifies a relationship between value(s) of one or more power characteristics detected in in-situ sensor data 1440, at geographic location(s) to which the value(s) of the one or more power characteristics detected in the in-situ sensor data 1440, correspond, and soil moisture value(s) from the soil moisture map 431 corresponding to the same geographic location(s) to which the detected value(s) of the one or more power characteristics correspond. Based on this relationship established by power characteristic(s)-to-soil moisture model generator 1442, power characteristic(s)-to-soil moisture model generator 1442 generates a predictive power model. The predictive power model is used by predictive power map generator 1452 to predict one or more power characteristics at different locations in the field based upon the georeferenced soil moisture values contained in the soil moisture map 431 corresponding to the same locations in the field. Thus, for a given location in the field, a value of one or more power characteristics, can be predicted at the given location based on the predictive power model and the soil moisture value, from the soil moisture map 431, corresponding to that given location.

Power characteristic(s)-to-soil type model generator 1443 identifies a relationship between value(s) of one or more power characteristics detected in in-situ sensor data 1440, at geographic location(s) to which the value(s) of the one or more power characteristics detected in the in-situ sensor data 1440, correspond, and soil type value(s) from the soil type map 432 corresponding to the same geographic location(s) to which the detected value(s) of the one or more power characteristics correspond. Based on this relationship established by power characteristic(s)-to-soil type model generator 1443, power characteristic(s)-to-soil type model generator 1443 generates a predictive power model. The predictive power model is used by predictive power map generator 1452 to predict one or more power characteristics at different locations in the field based upon the georeferenced soil type values contained in the soil type map 432 corresponding to the same locations in the field. Thus, for a given location in the field, a value of one or more power characteristics, can be predicted at the given location based on the predictive power model and the soil type value, from the soil type map 432, corresponding to that given location.

Power characteristic(s)-to-VI model generator 1444 identifies a relationship between value(s) of one or more power characteristics detected in in-situ sensor data 1440, at geographic location(s) to which the value(s) of the one or more power characteristics detected in the in-situ sensor data 1440, correspond, and VI value(s) from the VI map 433 corresponding to the same geographic location(s) to which the detected value(s) of the one or more power characteristics correspond. Based on this relationship established by power characteristic(s)-to-VI model generator 1444, power characteristic(s)-to-VI model generator 1444 generates a predictive power model. The predictive power model is used by predictive power map generator 1452 to predict one or more power characteristics at different locations in the field based upon the georeferenced VI values contained in the VI map 433 corresponding to the same locations in the field. Thus, for a given location in the field, a value of one or more power characteristics, can be predicted at the given location based on the predictive power model and the VI value, from the VI map 433, corresponding to that given location.

Power characteristic(s)-to-optical characteristic model generator 1445 identifies a relationship between value(s) of one or more power characteristics detected in in-situ sensor data 1440, at geographic location(s) to which the value(s) of the one or more power characteristics detected in the in-situ sensor data 1440, correspond, and optical characteristic value(s) from the optical map 434 corresponding to the same geographic location(s) to which the detected value(s) of the one or more power characteristics correspond. Based on this relationship established by power characteristic(s)-to-optical characteristic model generator 1445, power characteristic(s)-to-optical characteristic model generator 1445 generates a predictive power model. The predictive power model is used by predictive power map generator 1452 to predict one or more power characteristics at different locations in the field based upon the georeferenced optical characteristic values contained in the optical map 434 corresponding to the same locations in the field. Thus, for a given location in the field, a value of one or more power characteristics, can be predicted at the given location based on the predictive power model and the optical characteristic value, from the optical map 434, corresponding to that given location.

Power characteristic(s)-to-seeding characteristic model generator 1446 identifies a relationship between value(s) of one or more power characteristics detected in in-situ sensor data 1440, at geographic location(s) to which the value(s) of the one or more power characteristics detected in the in-situ sensor data 1440, correspond, and seeding characteristic value(s) from the seeding map 435 corresponding to the same geographic location(s) to which the detected value(s) of the one or more power characteristics correspond. Based on this relationship established by power characteristic(s)-to-seeding characteristic model generator 1446, power characteristic(s)-to-seeding characteristic model generator 1446 generates a predictive power model. The predictive power model is used by predictive power map generator 1452 to predict one or more power characteristics at different locations in the field based upon the georeferenced seeding characteristic values contained in the seeding map 435 corresponding to the same locations in the field. Thus, for a given location in the field, a value of one or more power characteristics, can be predicted at the given location based on the predictive power model and the seeding characteristic value, from the seeding map 435, corresponding to that given location.

Power characteristic(s)-to-material application characteristic model generator 1447 identifies a relationship between value(s) of one or more power characteristics detected in in-situ sensor data 1440, at geographic location(s) to which the value(s) of the one or more power characteristics detected in the in-situ sensor data 1440, correspond, and material application characteristic value(s) from the material application map 436 corresponding to the same geographic location(s) to which the detected value(s) of the one or more power characteristics correspond. Based on this relationship established by power characteristic(s)-to-material application characteristic model generator 1447, power characteristic(s)-to-material application characteristic model generator 1447 generates a predictive power model. The predictive power model is used by predictive power map generator 1452 to predict one or more power characteristics at different locations in the field based upon the georeferenced material application characteristic values contained in the material application map 436 corresponding to the same locations in the field. Thus, for a given location in the field, a value of one or more power characteristics, can be predicted at the given location based on the predictive power model and the material application characteristic value, from the material application map 436, corresponding to that given location.

Power characteristic(s)-to-crop moisture model generator 1448 identifies a relationship between value(s) of one or more power characteristics detected in in-situ sensor data 1440, at geographic location(s) to which the value(s) of the one or more power characteristics detected in the in-situ sensor data 1440, correspond, and crop moisture value(s) from the crop moisture map 437 corresponding to the same geographic location(s) to which the detected value(s) of the one or more power characteristics correspond. Based on this relationship established by power characteristic(s)-to-crop moisture model generator 1448, power characteristic(s)-to-crop moisture model generator 1448 generates a predictive power model. The predictive power model is used by predictive power map generator 1452 to predict one or more power characteristics at different locations in the field based upon the georeferenced crop moisture values contained in the crop moisture map 437 corresponding to the same locations in the field. Thus, for a given location in the field, a value of one or more power characteristics, can be predicted at the given location based on the predictive power model and the crop moisture value, from the crop moisture map 437, corresponding to that given location.

Power characteristic(s)-to-other characteristic model generator 1449 identifies a relationship between value(s) of one or more power characteristics detected in in-situ sensor data 1440, at geographic location(s) to which the value(s) of the one or more power characteristics detected in the in-situ sensor data 1440, correspond, and other characteristic value(s) from an other map 439 corresponding to the same geographic location(s) to which the detected value(s) of the one or more power characteristics correspond. Based on this relationship established by power characteristic(s)-to-other characteristic model generator 1449, power characteristic(s)-to-other characteristic model generator 1449 generates a predictive power model. The predictive power model is used by predictive power map generator 1452 to predict one or more power characteristics at different locations in the field based upon the georeferenced other characteristic values contained in the other map 439 corresponding to the same locations in the field. Thus, for a given 9 location in the field, a value of one or more power characteristics, can be predicted at the given location based on the predictive power model and the other characteristic value, from the other map 439, corresponding to that given location.

It will be understood that the values of the one or more mapped characteristics corresponding to the same geographic location(s) as the detected values of the one or more power characteristic(s) may not be the value of the characteristic(s) at the given location in the map(s), but rather, may be aggregated value(s) of the characteristic(s) over a traveled path of the machine (e.g., the path traveled since the last time material was transferred from the on-board tank, or if no previous material transfer operation, the path travelled since the time the harvesting operation started). In the example of attempting to predict, as the power characteristic value, a material transfer subsystem power requirement or power usage, it is desirable to have an idea of the characteristics of the crop material as stored in the on-board tank 132. For example, the moisture of the crop material in the on-board tank 132. For other characteristics, it may be desirable to have an instantaneous value, that is, the value at the given location, for instance, the angle of repose of the crop material pile in the on-board tank 132 at the given location, which may be indicated by the topographic characteristic value (e.g., from the topographic map 430) at the location of the machine. Additionally, when sensing the power characteristic values of other subsystems, an aggregated value may not be necessary or desirable. In either case, it will be understood that the value(s) of one or more mapped characteristics in the information maps 358 corresponding to the same geographic location(s) to which the detected value(s) of the one or more power characteristics correspond can be the values of the characteristics at the locations of the detected power characteristics or can be an aggregated value of the characteristics up to the locations of the detected power characteristics. Predictive model generator 310 can be configured to parse and aggregate the values as desired for each.

In light of the above, the predictive model generator 310 is operable to produce a plurality of predictive power models, such as one or more of the predictive power models generated by model generators 1441, 1442, 1443, 1444, 1445, 1446, 1447, 1448, 1449, and 1469. In another example, two or more of the predictive models described above may be combined into a single predictive power model, such as a predictive power model that predicts one or more power characteristics based upon two or more of the topographic values, the soil moisture values, the soil type values, the vegetative index (VI) values, the optical characteristic values, the seeding characteristic values, the material application characteristic values, the crop moisture values, and the other characteristic values at different locations in the field. Any of these power models, or combinations thereof, are represented collectively by predictive power model 1450 in FIG. 9.

The predictive power model 1450 is provided to predictive map generator 312. In the example of FIG. 9, predictive map generator 312 includes a predictive power map generator 1452. In other examples, predictive map generator 312 may include additional or different map generators. Thus, in some examples, predictive map generator 312 may include other items 1456 which may include other types of map generators to generate other types of maps.

Predictive power map generator 1452 receives one or more of the topographic map 430, the soil moisture map 431, the soil type map 432, the VI map 433, the optical map 434, the seeding map 435, the material application map 436, the crop moisture map 437, and an other map 439, along with the predictive power model 1450 which predicts one or more power characteristics based upon one or more of a topographic value, a soil moisture value, a soil type value, a VI value, an optical characteristic value, a seeding characteristic value, a material application characteristic value, a crop moisture value, and an other characteristic value, and generates a predictive map that predicts one or more power characteristics at different locations in the field, such as functional predictive power map 1460.

As shown in FIG. 9, predictive map generator 1452 also receives predictive auxiliary operation location(s) 4410. In this way, predictive map generator 1452 can predict the values of one or more power characteristics at the predictive auxiliary operation location(s). For example, predictive map generator 1452 may predict one or more of the total power usage or requirement at the predictive auxiliary operation location(s) 4410, the power usage or requirement of individual subsystems, such as one or more primary subsystems 341 or one or more auxiliary subsystems 343 (e.g., material transfer subsystem), or both, at the predictive auxiliary operation location(s) 4410, and the power usage or requirement of individual components of the mobile machine 100 (e.g., power usage or requirement of conveyance mechanism 134). In other examples, the values of the one or more power characteristics can be predicted at any location at the field.

Predictive map generator 312 outputs a functional predictive power map 1460 that is predictive of one or more power characteristics. The functional predictive power map 1460 is a predictive map 264. The functional predictive power map 1460 predicts one or more power characteristics at different locations in a field. The functional predictive power map 1460 may be provided to control zone generator 313, control system 314, or both. Control zone generator 313 generates control zones and incorporates those control zones into the functional predictive power map 1460 to produce a predictive control zone map 265, that is a functional predictive power control zone map 1461. One or both of functional predictive power map 1460 and functional predictive power control zone map 1461 may be provided to control system 314, which generates control signals to control one or more of the controllable subsystems 316 based upon the functional predictive power map 1460, the functional predictive power control zone map 1461, or both.

Figure 10A:
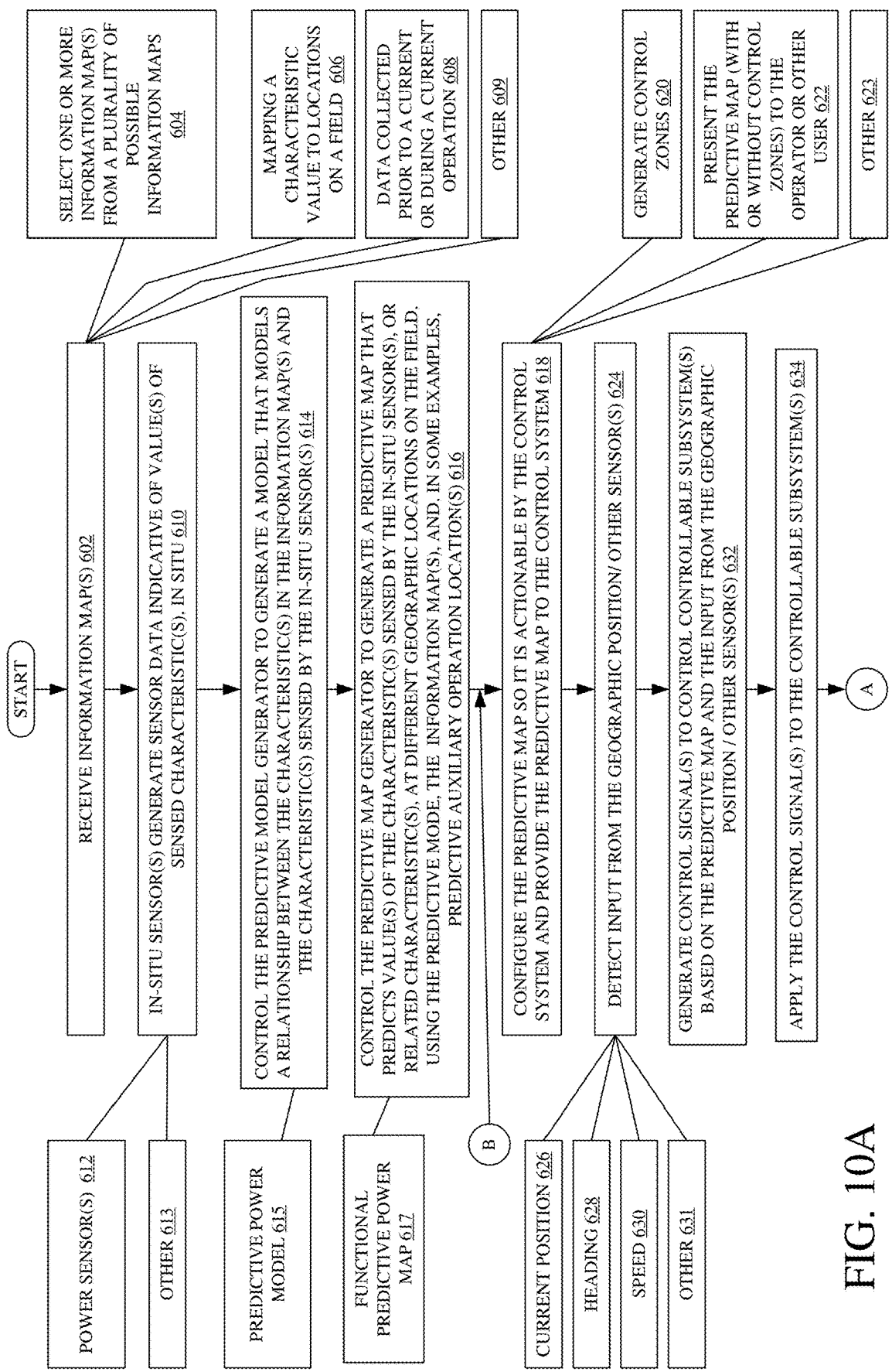
FIGS. 10A-10B (collectively referred to herein as FIG. 10) show a flow diagram illustrating one example of operation of an agricultural harvesting system architecture in generating a map.
Figure 10B:
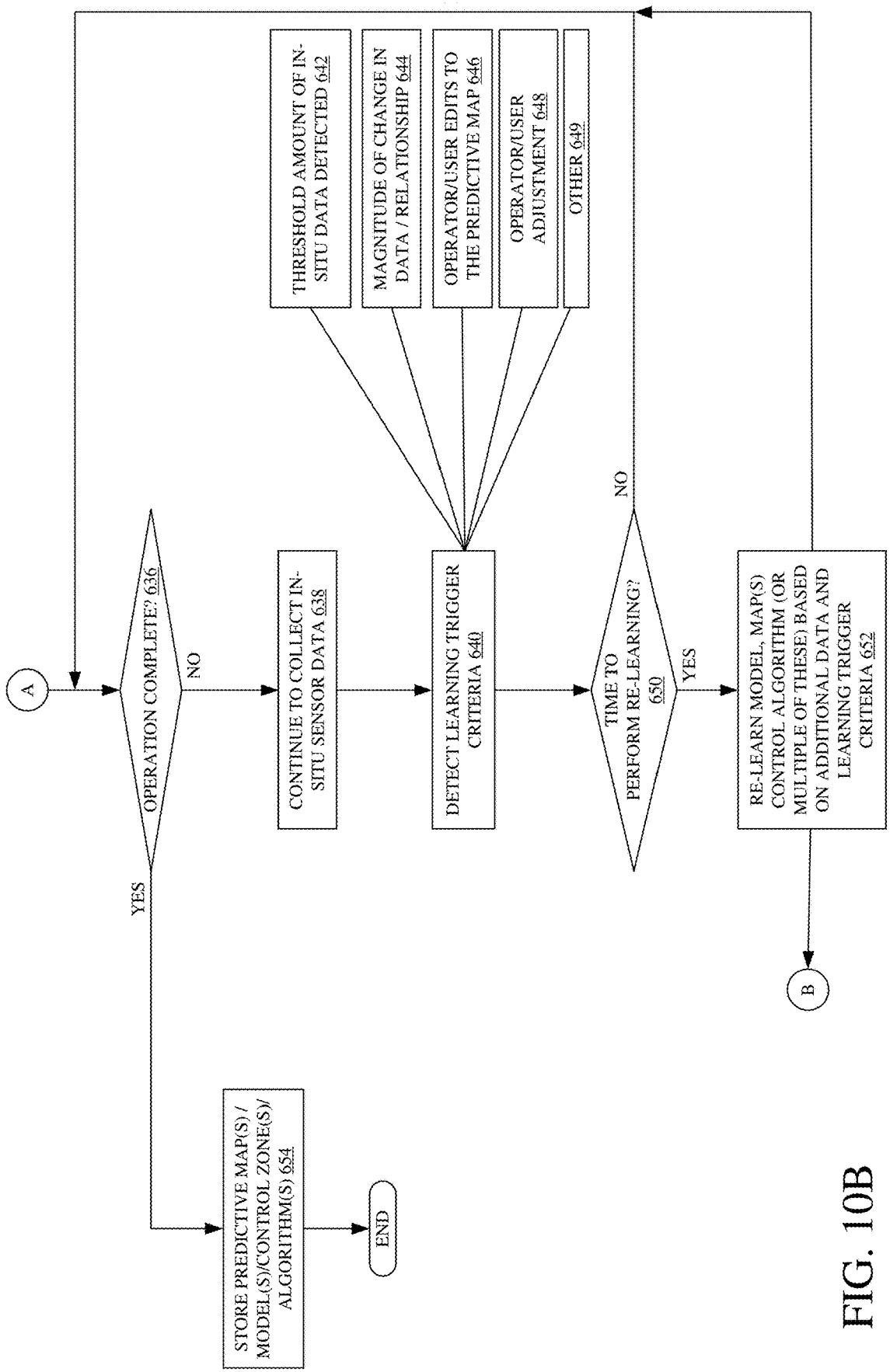

FIGS. 10A-10B (collectively referred to herein as FIG. 10) show a flow diagram illustrating one example of the operation of agricultural harvesting system architecture 300 in generating a predictive model and a predictive map.

At block 602, agricultural system 300 receives one or more maps, such as one or more information maps 358. Examples of information maps 358 or receiving information maps 358 are discussed with respect to blocks 604, 606, 608, and 609. As discussed above, information maps 358 map values of a variable, corresponding to a characteristic, to different locations in the field, as indicated at block 606. As indicated at block 604, receiving the information maps 358 may involve selecting one or more of a plurality of possible information maps 358 that are available. For instance, one information map 358 may be a topographic map, such as topographic map 430. Another information map 358 may be a soil moisture map, such as soil moisture map 431. Another information map 358 may be a soil type map, such as soil type map 432. Another information map 358 may be a vegetative index (VI) map, such as VI map 433. Another information map 358 may be an optical map, such as optical map 434. Another information map 358 may be a prior operation map, for instance a seeding map, such as seeding map 435. Another information map 358 may be a prior operation map, for instance a material application map, such as material application map 436. Another information map 358 may be a crop moisture map, such as crop moisture map 437. Another information map 358 may be a yield map, such as yield map 438. Information maps 358 may include various other types of maps that map various other characteristics, such as other maps 467.

The process by which one or more information maps 358 are selected can be manual, semi-automated, or automated. The information maps 358 can be based on data collected prior to a current operation or based on data collected during a current operation as indicated by block 608. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations May be outfitted with one or more sensors that generate sensor data indicative of one or more characteristics. For example, the sensed characteristics during a previous operation be used as data to generate the information maps 358. In other examples, and as described above, the information maps 358 may be predictive maps having predictive values, such as a predictive soil moisture map having predictive soil moisture values, a predictive crop moisture map having predictive crop moisture values, or another type of predictive map having predictive values of another characteristic. The predictive information map 358 can be generated by predictive map generator 312 based on a model generated by predictive model generator 310. The data for the information maps 358 can be obtained by agricultural system 300 using communication system 306 and stored in data store 302. The data for the information maps 358 can be obtained by agricultural system 300 using communication system 306 in other ways as well, and this is indicated by block 609 in the flow diagram of FIG. 10.

As mobile harvesting machine 100 is operating, in-situ sensors 308 generate sensor data (e.g., signals, images, etc.) indicative of one or more in-situ data values indicative of one or more characteristics, as indicated by block 610. For example, power characteristic sensors 380 generate sensor data indicative of one or more in-situ data values indicative of one or more power characteristics (e.g., one or more of total power usage or total power requirement, subsystem power usage or subsystem power requirement, and item power usage or item power requirement), as indicated by block 611. In some examples, data from in-situ sensors 308 is georeferenced using position, heading, or speed data, as well as machine dimension information, machine processing delay sensor position information, sensor parameter information, etc.

At block 614, predictive model generator 310 controls one or more of the model generators 1441, 1442, 1443, 1444, 1445, 1446, 1447, 1448, 1449, and 1469 to generate a model that models the relationship between the mapped values, such as the topographic values, the soil moisture values, the soil type values, the vegetative index (VI) values, the optical characteristic values, the seeding characteristic values, the material application characteristic values, the crop moisture values, and the other characteristic values contained in the respective information map and the values of one or more power characteristics sensed by the in-situ sensors 308. Predictive model generator 310 generates a predictive power model 1450 that predicts values of one or more power characteristics based on one or more of topographic values, soil moisture values, soil type values, VI values, optical characteristic values, seeding characteristic values, material application characteristic values, crop moisture values, and other characteristic values, as indicated by block 615.

At block 616, the relationship(s) or model(s) generated by predictive model generator 310 is provided to predictive map generator 312. Predictive map generator 312 generates a functional predictive power map 1460 that predicts values of one or more power characteristics (or sensor values indicative of one or more power characteristics) at different geographic locations in a field at which mobile machine 100 is operating using the predictive power model 1450 and one or more of the information maps 358, such as topographic map 430, soil moisture map 431, soil type map 432, VI map 433, optical map 434, seeding map 435, material application map 436, crop moisture map 437, and an other map 439. In some examples, at block 616, one or more predictive auxiliary operation locations 4410 are also provided to predictive map generator 312, such that predictive map generator 312 generates a functional predictive power map 1460 that predicts values of one or more power characteristic (or sensor values indicative of one or more power characteristics) at the one or more predictive auxiliary operation locations 4410.

It should be noted that, in some examples, the functional predictive power map 1460 may include two or more different map layers. Each map layer may represent a different data type, for instance, a functional predictive power map 1460 that provides two or more of a map layer that provides one or more predictive power characteristics based on topographic characteristic values from topographic map 430, a map layer that provides one or more predictive power characteristics based on soil moisture values from soil moisture map 431, a map layer that provides one or more predictive power characteristics based on soil type values from soil type map 432, a map layer that provides one or more predictive power characteristics based on VI values from VI map 433, a map layer that provides one or more predictive power characteristics based on optical characteristic values from optical map 434, a map layer that provides one or more predictive power characteristics based on seeding characteristic values from seeding map 435, a map layer that provides one or more predictive power characteristics based on material application characteristic values from material application map 436, a map layer that provides one or more predictive power characteristics based on crop moisture values from crop moisture map 437, and a map layer that provides one or more predictive power characteristics based on other characteristic values from an other map 439. Additionally, or alternatively, functional predictive power map 1460 can include a map layer that provides one or more predictive power characteristics based on two or more of topographic characteristic values from topographic map 430, soil moisture values from soil moisture map 431, soil type values from soil type map 432, VI values from VI map 433, optical characteristic values from optical map 434, seeding characteristic values from seeding map 435, material application characteristic values from material application map 437, crop moisture values from crop moisture map 437, and other characteristic values from an other map 439.

Providing a predictive power map, such as functional predictive power map 1460 is indicated by block 617.

At block 618, predictive map generator 312 configures the functional predictive power map 1460 so that the functional predictive power map 1460 is actionable (or consumable) by control system 314. Predictive map generator 312 can provide the functional predictive power map 1460 to the control system 314 or to control zone generator 313, or both. Some examples of the different ways in which the functional predictive power map 1460 can be configured or output are described with respect to blocks 618, 620, 622, and 623. For instance, predictive map generator 312 configures functional predictive power map 1460 so that functional predictive power map 1460 includes values that can be read by control system 314 and used as the basis for generating control signals for one or more of the different controllable subsystems of mobile harvesting machine 100, as indicated by block 618.

At block 620, control zone generator 313 can divide the functional predictive power map 1460 into control zones based on the values on the functional predictive power map 1460 to generate functional predictive power control zone map 1461. Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system 314, the controllable subsystems 316, based on wear considerations, or on other criteria.

At block 622, predictive map generator 312 configures functional predictive power map 1460 for presentation to an operator or other user. At block 622, control zone generator 313 can configure functional predictive power control zone map 1461 for presentation to an operator or other user. When presented to an operator or other user, the presentation of the functional predictive power map 1460 or of functional predictive power control zone map 1461, or both, may contain one or more of the predictive values on the functional predictive power map 1460 correlated to geographic location, the control zones of functional predictive power control zone map 1461 correlated to geographic location, and settings values or control parameters that are used based on the predicted values on functional predictive power map 1460 or control zones on functional predictive power control zone map 1461. The presentation can, in another example, include more abstracted information or more detailed information. The presentation can also include a confidence level that indicates an accuracy with which the predictive values on functional predictive power map 1460 or the control zones on functional predictive power control zone map 1461 conform to measured values that may be measured by sensors on mobile harvesting machine 100 as mobile harvesting machine 100 operates at the worksite. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of mobile harvesting machine 100 may be unable to see the information corresponding to the functional predictive power map 1460 or make any changes to machine operation. A supervisor, such as a supervisor at a remote location, however, may be able to see the functional predictive power map 1460 on the display but be prevented from making any changes. A manager, who may be at a separate remote location, may be able to see all of the elements on functional predictive power map 1460 and also be able to change the functional predictive power map 1460. In some instances, the functional predictive power map 1460 accessible and changeable by a manager located remotely may be used in machine control. This is one example of an authorization hierarchy that may be implemented. The functional predictive power map 1460 or functional predictive power control zone map 1461, or both, can be configured in other ways as well, as indicated by block 623.

At block 624, input from geographic position sensor 304 and other in-situ sensors 308 are received by the control system 314. Particularly, at block 626, control system 314 detects an input from the geographic position sensor 304 identifying a geographic location of mobile harvesting machine 100. Block 628 represents receipt by the control system 314 of sensor inputs indicative of trajectory or heading of mobile harvesting machine 100, and block 630 represents receipt by the control system 314 of a speed of mobile harvesting machine 100. Block 631 represents receipt by the control system 314 of other information from various other in-situ sensors 308.

At block 632, control system 314 generates control signals to control the controllable subsystems based on the functional predictive power map 1460 or the functional predictive power control zone map 1461, or both, and the input from the geographic position sensor 304 and any other in-situ sensors 308. At block 634, control system 314 applies the control signals to the controllable subsystems. It will be appreciated that the particular control signals that are generated, and the particular controllable subsystems that are controlled, may vary based upon one or more different things. For example, the control signals that are generated and the controllable subsystems that are controlled may be based on the type of functional predictive power map 1460 or functional predictive power control zone map 1461, or both, that is being used. Similarly, the control signals that are generated and the controllable subsystems that are controlled and the timing of the control signals can be based on various latencies of mobile machine 100 and the responsiveness of the controllable subsystems.

By way of example, primary subsystem(s) controller(s) 331 of control system 314 can generate control signals to control one or more primary subsystem(s) 341 to control one or more operating parameters of the one or more primary subsystems 341, based on the functional predictive power map 1460 or the functional predictive power control zone map 1461, or both.

In another example, auxiliary subsystem(s) controllers 334 of control system 314 can generate control signals to control one or more auxiliary subsystem(s) to control one or more operating parameters of the one or more auxiliary subsystem(s) 343, based on the functional predictive power map 1460 or the functional predictive power control zone map 1461, or both.

In another example, power distribution controller(s) 335 of control system 314 can generate control signals to control a controllable subsystem 316. Power distribution controller(s) 335 can generate control signals based on the functional predictive power map 1460 or the functional predictive power control zone map 1461, or both. For example, power distribution controller(s) 335 can generate control signals to control hybrid powerplant subsystem 340. For example, power distribution controller(s) 335 can generate control signals to control (e.g., adjust, such as increase or reduce) the power output of the hybrid powerplant subsystem 340. Controlling the hybrid powerplant subsystem to adjust the power output can include controlling the engine 344 or the motor/generator 345, or both. For example, power distribution controller(s) 335 can generate control signals to control the speed of the engine 344 or to control the speed of the motor/generator 345, or both. In another example, power distribution controller(s) 335 may generate control signals to supply more or less stored energy (e.g., fuel) from the stored energy supply 346 (e.g., fuel tanks) to the engine 344 or to supply more or less stored energy (e.g., stored electrical energy) from the stored energy supply (e.g., electrical storage device, such as batteries, capacitors, etc.), or both.

In another example, power distribution controller(s) 335 can generate control signals to control motor/generator 345 to provide power to other items of mobile harvesting machine 100. For example, power distribution controllers 335 can generate control signals to control motor/generator 345 to charge stored energy supply 346 (e.g., batteries, capacitors, etc.). In another example, power distribution controllers 335 can generate control signals to control motor/generator 345 to power other components of mobile machine 100 by drawing (or discharging) stored energy from stored energy supply 346.

In another example, power distribution controller(s) 335 may control primary subsystem(s) controller(s) 331 to set or adjust operating parameter(s) of the primary subsystem(s) 341, such as to adjust (e.g., reduce) a power requirement of one or more primary subsystems 341. In another example, power distribution controller(s) 335 may control auxiliary subsystem(s) 343 to set or adjust operating parameters of the auxiliary subsystem(s) 343, such as to adjust (e.g., reduce) a power requirement of one or more auxiliary subsystem(s) 343.

In another example, interface controller 330 of control system 314 can generate control signals to control an interface mechanism (e.g., 318 or 364) to generate a display, alert, notification, or other indication based on or indicative of functional predictive power map 1460 or functional predictive power control zone map 1461, or both.

In another example, communication system controller 329 of control system 314 can generate control signals to control communication system 306 to communicate functional predictive power map 1460 or functional predictive power control zone map 1461, or both, to 11 another item of agricultural system 300 (e.g., remote computing systems 368 or user interfaces 364).

These are merely examples. Control system 314 can generate various other control signals to control various other items of mobile machine 100 (or agricultural system 300) based on functional predictive power map 1460 or functional predictive power control zone map 1461, or both.

At block 636, a determination is made as to whether the operation has been completed. If the operation is not completed, the processing advances to block 638 where in-situ sensor data from geographic position sensor 304 and in-situ sensors 308 (and perhaps other sensors) continue to be read.

In some examples, at block 640, agricultural harvesting system 300 can also detect learning trigger criteria to perform machine learning on one or more of the functional predictive power map 1460, functional predictive power control zone map 1461, predictive power model 1450, the zones generated by control zone generator 313, one or more control algorithms implemented by the controllers in the control system 314, and other triggered learning.

The learning trigger criteria can include any of a wide variety of different criteria. Some examples of detecting trigger criteria are discussed with respect to blocks 642, 644, 646, 648, and 649. For instance, in some examples, triggered learning can involve recreation of a relationship used to generate a predictive model when a threshold amount of in-situ sensor data are obtained from in-situ sensors 308. In such examples, receipt of an amount of in-situ sensor data from the in-situ sensors 308 that exceeds a threshold triggers or causes the predictive model generator 310 to generate a new predictive model that is used by predictive map generator 312. Thus, as mobile machine 100 continues an operation, receipt of the threshold amount of in-situ sensor data from the in-situ sensors 308 triggers the creation of a new relationship represented by a new power model 1450 generated by predictive model generator 310. Further, a new functional predictive power map 1460, a new functional predictive power control zone map 1461, or both, can be generated using the new predictive power model 1450. Block 642 represents detecting a threshold amount of in-situ sensor data used to trigger creation of a new predictive model.

In other examples, the learning trigger criteria may be based on how much the in-situ sensor data from the in-situ sensors 308 are changing, such as over time or compared to previous values. For example, if variations within the in-situ sensor data (or the relationship between the in-situ sensor data and the information in the one or more information maps 358) are within a selected range or is less than a defined amount, or below a threshold value, then a new predictive model is not generated by the predictive model generator 310. As a result, the predictive map generator 312 does not generate a new functional predictive power map 1460, a new functional predictive power control zone map 1461, or both. However, if variations within the in-situ sensor data are outside of the selected range, are greater than the defined amount, or are above the threshold value, for example, then the predictive model generator 310 generates a new predictive power model 1450 using all or a portion of the newly received in-situ sensor data that the predictive map generator 312 uses to generate a new functional predictive power map 1460 which can be provided to control zone generator 313 for the creation of a new functional predictive power control zone map 1461. At block 644, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of a new predictive power model 1450, a new functional predictive power map 1460, and a new functional predictive power control zone map 1461. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 314, or other items. In another example, transitioning of mobile machine 100 to a different topography or to a different control zone may be used as learning trigger criteria as well.

In some instances, operator 360 or user 366 can also edit the functional predictive power map 1460 or functional predictive power control zone map 1461, or both. The edits can change a value on the functional predictive power map 1460, change a size, shape, position, or existence of a control zone on functional predictive power control zone map 1461, or both. Block 646 shows that edited information can be used as learning trigger criteria.

In some instances, it may also be that operator 360 or user 366 observes that automated control of a controllable subsystem 316, is not what the operator or user desires. In such instances, the operator 360 or user 366 may provide a manual adjustment to the controllable subsystem 316 reflecting that the operator 360 or user 366 desires the controllable subsystem 316 to operate in a different way than is being commanded by control system 314. Thus, manual alteration of a setting by the operator 360 or user 366 can cause one or more of predictive model generator 310 to generate a new predictive power model 1450, predictive map generator 312 to generate a new functional predictive power map 1460, control zone generator 313 to generate one or more new control zones on functional predictive power control zone map 1461, and control system 314 to relearn a control algorithm or to perform machine learning on one or more of the controller components in control system 314 based upon the adjustment by the operator 360 or user 366, as shown in block 648. Block 649 represents the use of other triggered learning criteria.

In other examples, relearning may be performed periodically or intermittently based, for example, upon a selected time interval such as a discrete time interval or a variable time interval, as indicated by block 650.

If relearning is triggered, whether based upon learning trigger criteria or based upon passage of a time interval, as indicated by block 650, then one or more of the predictive model generator 310, predictive map generator 312, control zone generator 313, and control system 314 performs machine learning to generate a new predictive model, a new predictive map, a new control zone, and a new control algorithm, respectively, based upon the learning trigger criteria. The new predictive model, the new predictive map, the new control zone, and the new control algorithm are generated using any additional data that has been collected since the last learning operation was performed. Performing relearning is indicated by block 652.

If the operation has been completed, operation moves from block 652 to block 654 where one or more of the functional predictive power map 1460, functional predictive power control zone map 1461, the predictive power model 1450, the control zone(s), and the control algorithm(s), are stored. The functional predictive power map 1460, functional predictive power control zone map 1461, predictive power model 1450, control zone(s), and control algorithm(s), may be stored locally on data store 302 or sent to a remote system using communication system 306 for later use.

If the operation has not been completed, operation moves from block 652 to block 618 such that the one or more of the new predictive model, the new functional predictive map, the new functional predictive control zone map, the new control zone(s), and the new control algorithm(s) can be used in the control of mobile harvesting machine 100.

Figure 11:
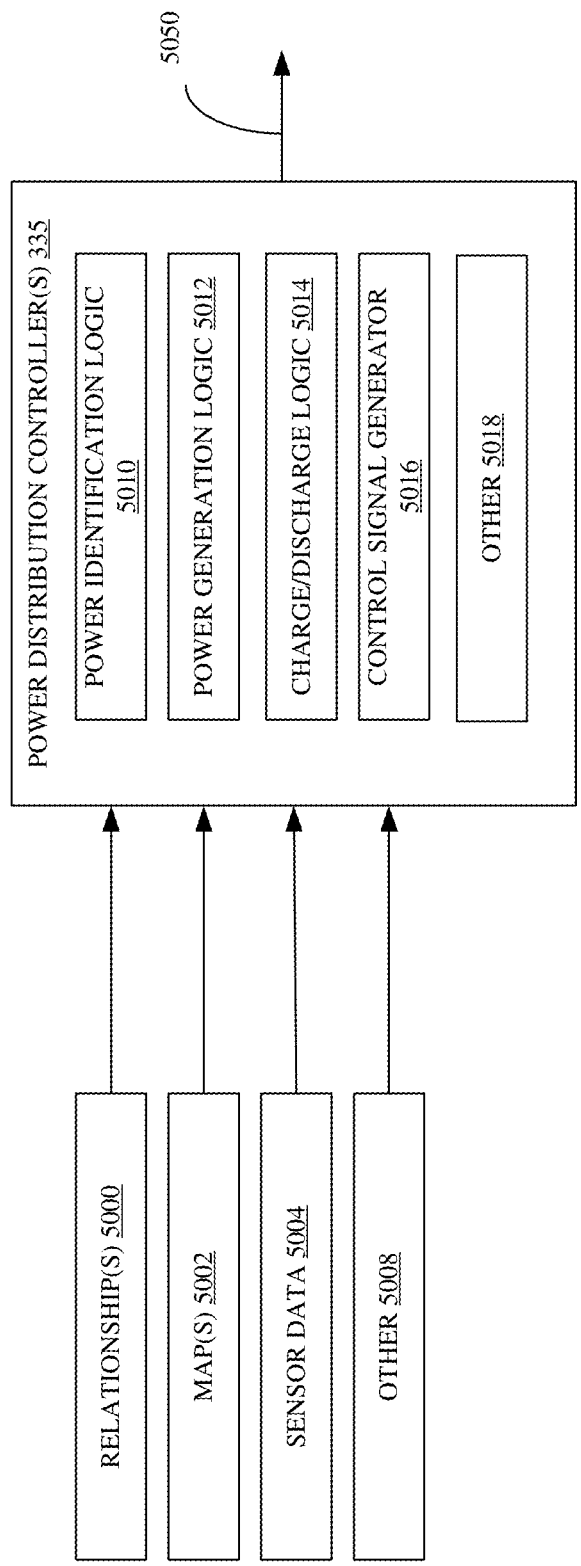
FIG. 11 is a block diagram showing one example of the power distribution controllers of the control system shown in FIG. 2.

FIG. 11 is a block diagram of a portion of the agricultural harvesting system architecture 300 shown in FIG. 2. Particularly, FIG. 11 shows, among other things, examples of power distribution controller(s) 335 in more detail. FIG. 11 also illustrates the information flow among the various components shown. As illustrated, power distribution controller(s) 335 include power identification logic 5010, power generation logic 5012, charge/discharge logic 5014, control signal generator 5016, and can include various other items 5018. Power distribution controller(s) 335 can receive one or more relationships 5000, one or more maps 5002, sensor data 5004, and various other data 5008. Relationships 5000 can include predefined relationships 315, or model(s) 311 (e.g., power model 450, etc.), as well as other types of relationships. Maps 5002 can include predictive power maps, such as functional predictive power map 1460 or functional predictive power control zone map 1461, or both. Sensor data 5004 can include data generated by sensors 308 or by processing system 338, or both. Other data 5008 can include various other data, such as route data of the machine indicative of a route of the mobile harvesting machine 100 at the field, which can be in the form of a route map, a route provided by an operator or user, based on a heading of the mobile machine 100, or may be an output of control system 314.

Power identification logic 5010 illustratively identifies power usage or power requirement, or both, of mobile harvesting machine 100 or of components of mobile harvesting machine 100, or both. For example, power identification logic 5010 can identify current power usage or current power requirement, or both, of mobile harvesting machine 100 or of components of mobile harvesting machine 100, or both, based on sensor data 5004 generated by sensors 308, such as power sensors 380, as well as various other sensors. Power identification logic 5010 also illustratively identifies future power usage and power requirement of mobile harvesting machine 100 or of components of mobile harvesting machine 100, or both. For example, power identification logic 5010 can identify future power usage or future power requirement, or both, of mobile harvesting machine 100 or of components of mobile harvesting machine 100, or both, based on a relationship 5000, such as a predefined relationship 315 or a predictive power model 450, or based on one or more maps 5002, such as functional predictive power map 1460 or functional predictive power control zone map 1461, or both.

Power generation logic 5012 illustratively identifies parameters at which to operate powerplant subsystem 340 to generate the required power identified by power identification logic. This can include identifying an amount of stored energy to supply engine 344 or motor/generator 345, or both, from stored energy supply 346. This can also include identifying a speed at which to operator engine 344 or motor/generator 345, or both.

Charge/discharge logic 5014 illustratively determines when to control motor/generator 345 to charge stored energy supply 346 (e.g., batteries, capacitors, etc.), when to stop charging stored energy supply 346, when to discharge stored energy supply 346, and when to stop discharging stored energy supply 346. As an example, power identification logic 5010 may identify an increased load or power deficit in an upcoming area of the field along the route of mobile harvesting machine 100 such that the required power will exceed the power capacity of engine 344. In such a case, charge/discharge logic 5014 can determine that electrical energy from stored energy supply 346 should be provided to motor generator 345 such that motor/generator 345 provides power boost. Power generation logic 5012 may identify, in such circumstances, the amount of power output that should be provided by motor/generator 345 and engine 344 to cover the required power, and thus, can identify an amount of electrical energy to discharge to motor/generator 345 such that motor/generator 345 provides the identified amount of power. Charge/discharge logic 5014 may also determine whether to discharge power from stored energy supply 346 based the state of charge of the stored energy supply 346, which may be indicated by sensor data 5004 (e.g., based on data generated by state of charge sensors of sensors 308). For example, where the state of charge of stored energy supply 346 is not sufficient to provide boost, charge/discharge logic 5014 may identify that energy is not to be discharged.

In other examples, charge/discharge logic 5014 may manage the charging and discharging of stored energy supply 346 based on predictive power characteristic values at the field, which may be identified by power identification logic 5010 based on a relationship 5000 or based on a map 5002. In addition to predictive power characteristic values, charge/discharge logic 5014 may also consider various other data, such as the geographic location of mobile harvesting machine 100, the route or heading of mobile harvesting machine 100, and/or the travel speed of mobile harvesting machine 100, as well as various other data, such as the state of charge of stored energy supply 346.

For example, power identification logic 5010 may identify, based on relationships 5000 or maps 5002, areas of the field at which there is a power surplus (e.g., that the power usage or requirement of the machine is below the power output capacity of the engine 344). In such an example, charge/discharge logic 5014 may identify that the motor/generator 345 should generate energy to charge stored energy supply 346 while mobile harvesting machine 100 is operating at those geographic locations. Further consideration can be given to the state of charge of the stored energy supply 346. For instance, where the stored energy supply 346 is charged to capacity or to a threshold level, charge/discharge logic 5014 may determine that the stored energy supply should not be charged, even in areas of power surplus. In some examples, the threshold level may be a default value, or may be based on predictive power characteristic values at the field. For instance, the threshold value may be based on the amount of power boost that will be required of motor/generator 345 at the field, such that stored energy supply 346 is charged to or maintains the amount of energy required to provide boost at those areas. Thus charge/discharge logic 5014 can determine whether or not to charge stored energy supply 346 based on the predictive power characteristic values at the field, such that the stored energy supply 346 will be charged to have or maintain a sufficient level of charge to meet the predictive power usage or requirement at the field or may not be charged when stored energy supply 346 has sufficient charge to meet the predictive power usage or requirement at the field.

In another example, power identification logic 5010 may identify, based on relationships 5000 or maps 5002, areas of the field at which there is a power deficit (e.g., that the power usage or requirement of the machine is beyond the power output capacity of the engine 344). In such an example, charge/discharge logic 5014 may identify that the motor/generator 345 should provide power boost by drawing energy from stored energy supply 346 while mobile harvesting machine 100 is operating at those geographic locations.

Boosting by the motor/generator 345 may not be reserved only for power deficits. In some examples, boosting by the motor/generator 345 may be used wherever possible (e.g., based on state of charge and charge capacity or charge threshold) in order to increase fuel efficiency of the mobile harvesting machine 100. For example, where the state of charge of the stored energy supply 346 is sufficient to provide boosting and where doing so will not drain the stored energy supply 346 below a required amount of energy for a boost at a future location at the field, energy may be discharged from stored energy supply 346.

Control signal generator 5016 illustratively generates control signal(s) 5050 to control controllable subsystems 316 based on the identifications or determinations made by the various logic of power distribution controller(s) 335. Control signal generator 5016 also identifies a timing at which to provide control signal(s) 5050 based on one or more inputs, such as the geographic location of mobile harvesting machine 100 (e.g., as indicated by sensor data 5004, such as by data generated by geographic position sensors 304), the heading of mobile harvesting machine 100 (e.g., as indicated by sensor data 5004, such as by data generated by heading/speed sensors 325), and the speed of mobile harvesting machine 100 (e.g., as indicated by sensor data 5004, such as by data generated by heading/speed sensors 325).

Figure 12:
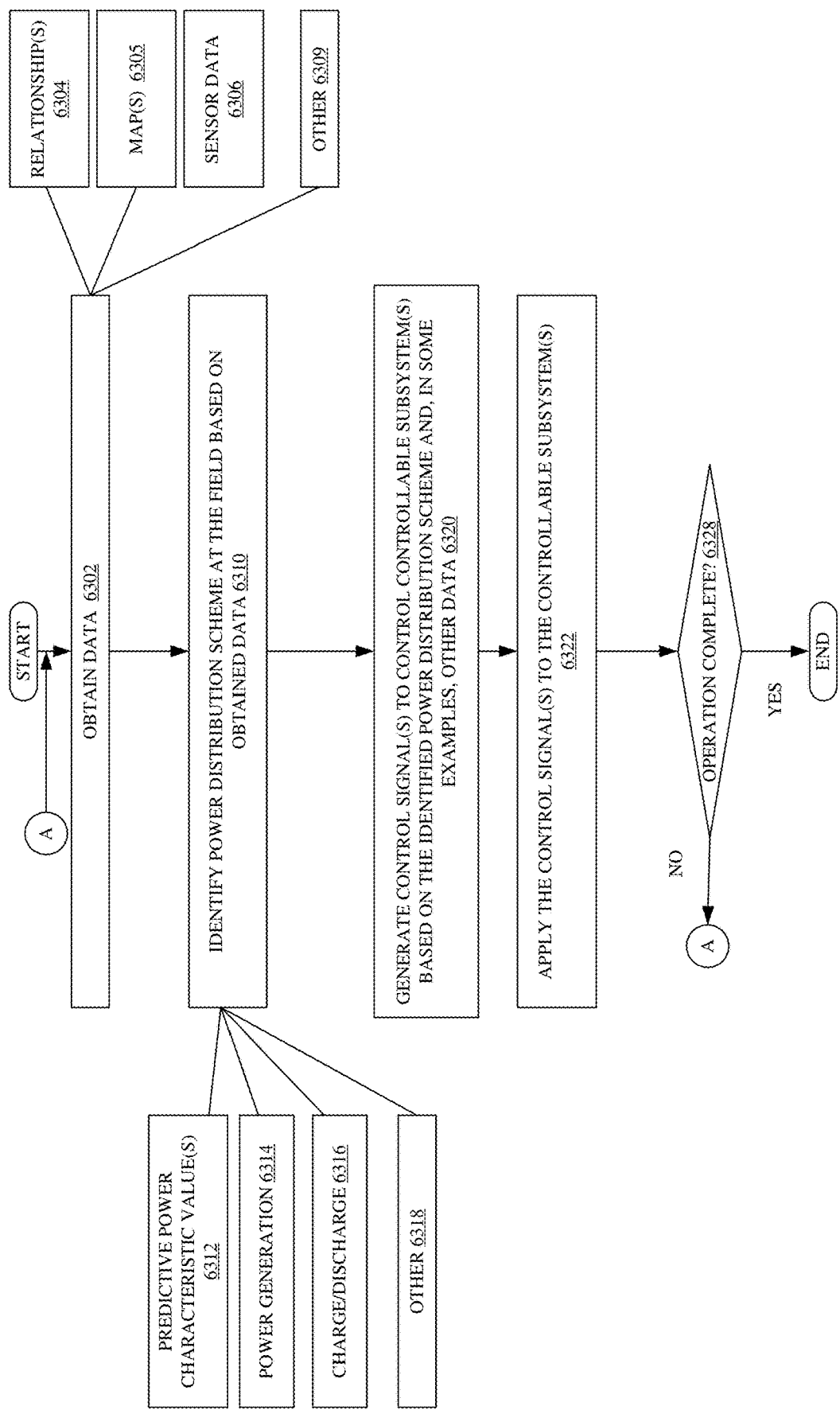
FIG. 12 shows a flow diagram illustrating one example of operation of an agricultural harvesting system in controlling power distribution.

FIG. 12 shows a flow diagram illustrating one example operation of agricultural harvesting system architecture 300 controlling power distribution of mobile harvesting machine 100.

At block 6302, power distribution controller(s) 335, of control system 314, obtain various data. As indicated by block 1304, power distribution controller(s) 335 can obtain one or more relationships 5000, such as one or more of predefined relationships 315 or models 311, such as predictive power model 450. As indicated by block 6305, power distribution controllers(s) 335 can obtain one or more maps 5002, such as a predictive power map, for example functional predictive power map 1460 or functional predictive power control zone map 1461, or both. As indicated by block 6306, power distribution controller(s) 335 can obtain sensor data 5004, such as sensor data generated by sensors 308 or processed sensor data generated by processing system 338, or both. Power distribution controllers 335 can obtain various other data 5008 as indicated by block 6318.

At block 6310 power distribution controller(s) 335 identify a power distribution scheme based on the obtained data. Identifying the power distribution scheme can include power identification logic 5010 identifying predictive power characteristic values at the field as indicated by block 6312. Power identification logic 5010 can identify predictive power characteristic values based on a relationship 5000 (e.g., predefined relationship 315, power model 450, etc.) or based on a predictive power map, such as functional predictive power map 1460 or functional predictive power control zone map 1461, or both. Power identification logic 5010 can further identify areas of predictive power deficit at the field and areas of predictive power surplus. Identifying the power distribution scheme can include power generation logic 5012 identifying an amount of power to be generated by powerplant subsystem 340, such as an amount of power to be output by engine 344 or motor/generator 345, or both. In identifying an amount of power to be generated, power generation logic 5012 can identify parameters of the powerplant subsystem 340 to be implemented such as a speed of engine 344 or a speed of motor/generator 345 or both. Identifying the power to be generated is indicated by block 6314. As indicated by block 6316, identifying the power distribution scheme can include charge/discharge logic 5014 determine whether to charge stored energy supply 346 (e.g., batteries, capacitors, etc.) or whether to discharge energy from stored energy supply 346. For example, charge/discharge logic 5014 may determine to charge stored energy supply 346 (via motor/generator 345) or discharge stored energy from stored energy supply to motor/generator 345 based on outputs from power identification logic 5010 or power generation logic 5012, or both. Identifying the power distribution scheme can include various other identifications, determinations, or steps, as indicated by block 6318.

At block 6320, control signal generator 5016 generates control signal(s) to control powerplant subsystem 340 based on the identified power distribution scheme, as well, in some examples, based on other data such as geographic location of mobile machine 100, the route and heading of mobile machine 100, and the travel speed of mobile machine 100. For example, control signal generator 5016 can generate control signals to control powerplant subsystem 340 to operate at parameters (e.g., speed of engine 344 or speed of motor/generator 345, or both) to generate a power based on a predictive power usage or requirement. In another example, control signal generator 5016 can generate control signals to control powerplant subsystem 340 to charge stored energy supply 346 (e.g., batteries, capacitors, etc.) or to discharge energy from stored energy supply 346. These are merely some examples. Power distribution controller(s) 335 can generate various control signal(s) to control controllable subsystems 316 in various ways. At block 6322, the control signals are applied to the controllable subsystems.

At block 6328 it is determined if the operation is complete. If the operation is not complete, processing returns to block 6302. If the operation has been completed then processing ends.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or the same worksite at a future time.

The revision of the model in response to new data may employ machine learning methods. Without limitation, machine learning methods may include memory networks, Bayes systems, decisions trees, Eigenvectors, Eigenvalues and Machine Learning, Evolutionary and Genetic Algorithms, Cluster Analysis, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value varies from a predictive value of the characteristic, such as by a threshold amount. This deviation May only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation cross the threshold are used to generate a linear equation. The linear equation is used to adjust the predictive characteristic value in areas of the worksite (which have not yet been operated on in the current operation, such as unharvested areas) in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as one or more of a topographic map, a soil moisture map, a soil type map, a vegetative index (VI) map, an optical map, a seeding map, a material application map, a crop moisture map, and another type of map.

In-situ sensors generate sensor data indicative of in-situ characteristic values, such as in-situ values of one or more power characteristics.

A predictive model generator generates one or more predictive models based on the one or more obtained maps and the in-situ sensor data, such as a predictive power model.

A predictive map generator generates one or more functional predictive maps based on a model generated by the predictive model generator and the one or more obtained maps. For example, the predictive map generator may generate a functional predictive power map that maps predictive values of one or more power characteristics to one or more locations on the worksite based on a predictive power model and the one or more obtained maps.

Control zones, which include machine settings values, can be incorporated into the functional predictive power map to generate a functional predictive power map with control zones.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained maps. The functional predictive maps or the functional predictive control zone maps, or both, are then revised based on the revised model(s) and the values in the obtained maps.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic and interactions. It will be appreciated that any or all of such systems, components, logic and interactions may be implemented by hardware items, such as processors, memory, or other processing components, some of which are described below, that perform the functions associated with those systems, components, or logic, or interactions. In addition, any or all of the systems, components, logic and interactions may be implemented by software that is loaded into a memory and is subsequently executed by a processor or server or other computing component, as described below. Any or all of the systems, components, logic and interactions May also be implemented by different combinations of hardware, software, firmware, etc., some examples of which are described below. These are some examples of different structures that May be used to implement any or all of the systems, components, logic and interactions described above. Other structures may be used as well.

Figure 13:
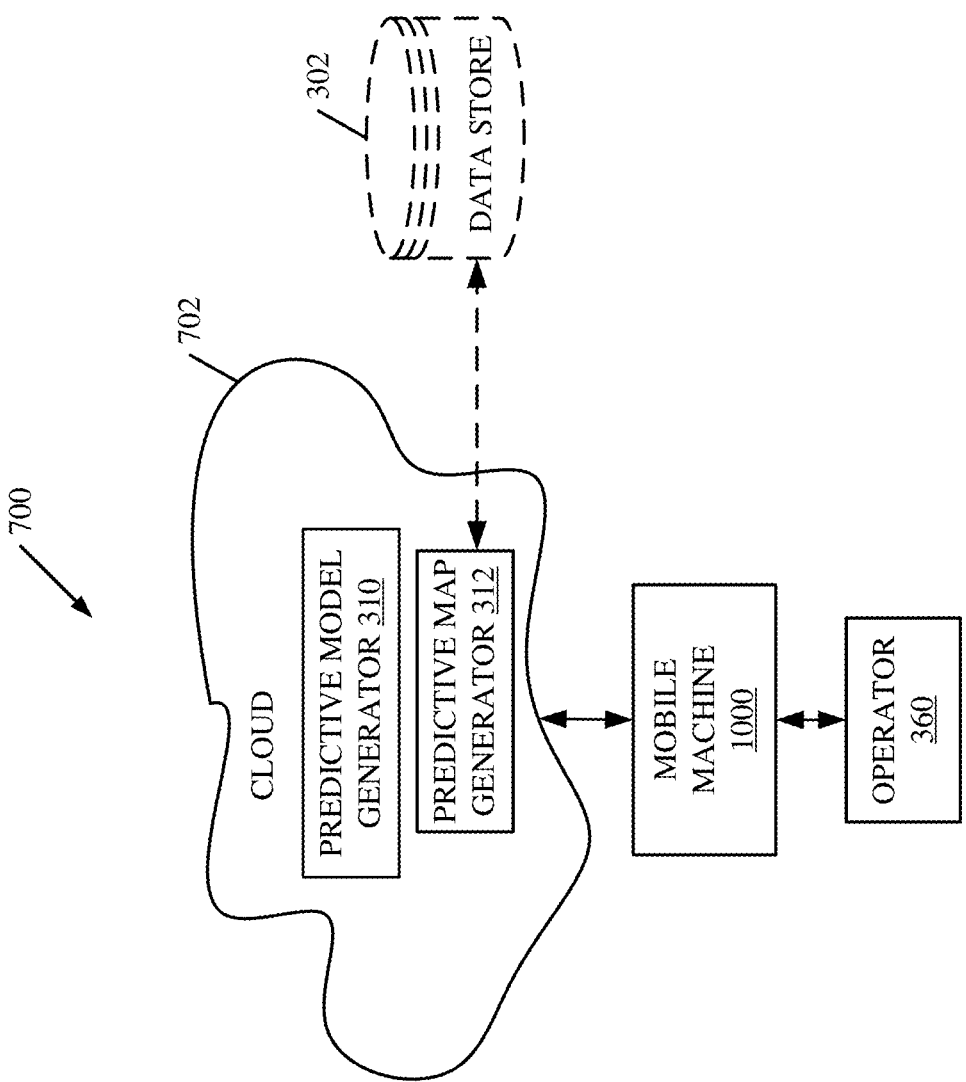
FIG. 13 is a block diagram showing one example of a mobile agricultural harvesting machine in communication with a remote server environment.

FIG. 13 is a block diagram of mobile harvesting machine 1000, which may be similar to mobile harvesting machine 100 shown in FIG. 2. The mobile machine 1000 communicates with elements in a remote server architecture 700. In some examples, remote server architecture 700 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 2 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 13, some items are similar to those shown in FIG. 2 and those items are similarly numbered. FIG. 13 specifically shows that predictive model generator 310 or predictive map generator 312, or both, may be located at a server location 702 that is remote from the mobile machine 1000. Therefore, in the example shown in FIG. 9, mobile machine 1000 accesses systems through remote server location 702. In other examples, various other items May also be located at server location 702, such as data store 302, map selector 309, predictive model 311, functional predictive maps 263 (including predictive maps 264 and predictive control zone maps 265), control zone generator 313, control system 314 (or components thereof), and processing system 338.

FIG. 13 also depicts another example of a remote server architecture. FIG. 13 shows that some elements of FIG. 2 may be disposed at a remote server location 702 while others May be located elsewhere. By way of example, data store 302 may be disposed at a location separate from location 702 and accessed via the remote server at location 702. Regardless of where the elements are located, the elements can be accessed directly by mobile machine 1000 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the mobile machine 1000 comes close to the machine containing the information collection system, such as a fuel truck prior to fueling, the information collection system collects the information from the mobile machine 1000 using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein.

Further, the information may be stored on the mobile machine 1000 until the mobile machine 1000 enters an area having wireless communication coverage. The mobile machine 1000, itself, may send the information to another network.

It will also be noted that the elements of FIG. 2, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 700 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 14:
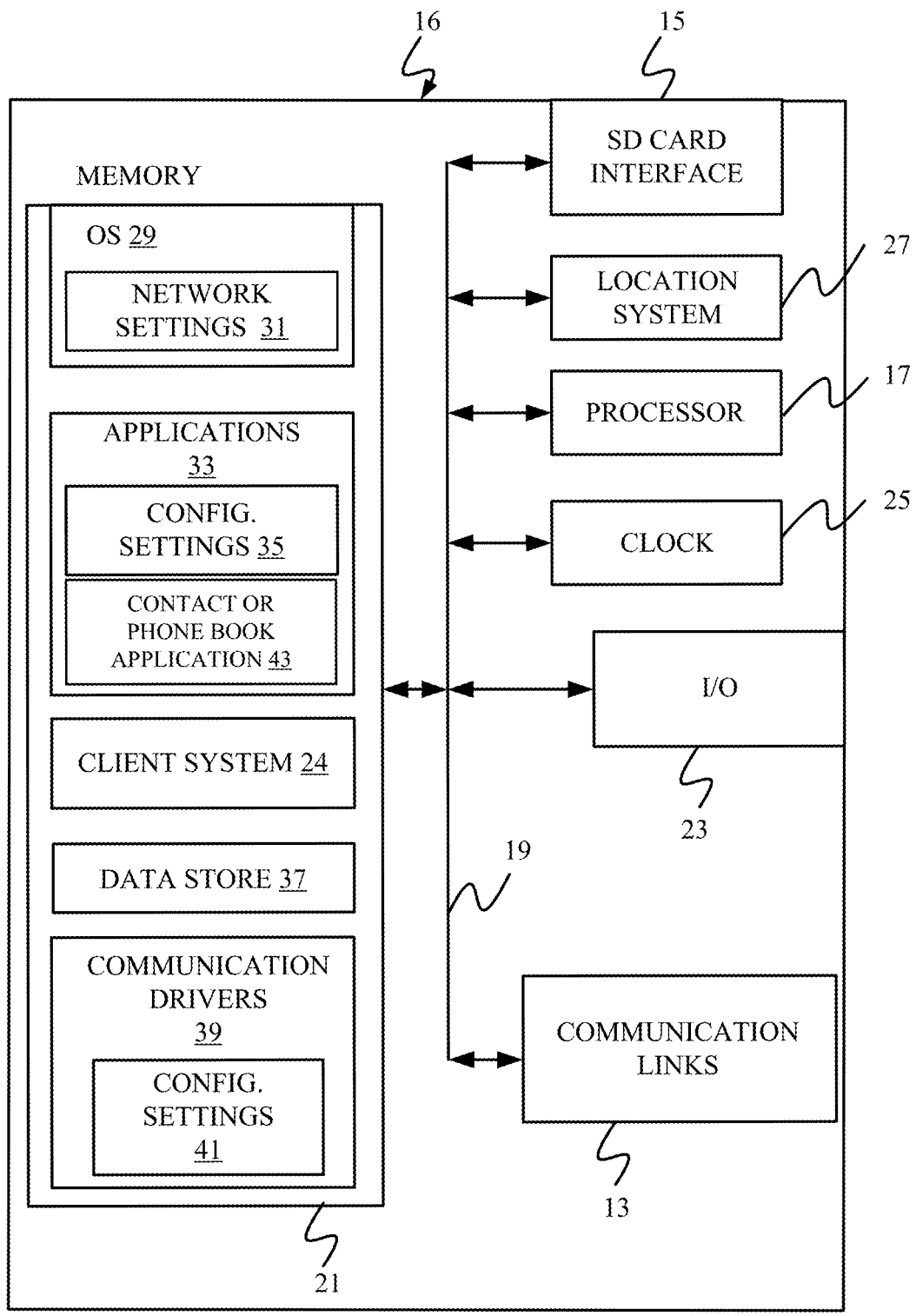
FIGS. 14-16 show examples of mobile devices that can be used in an agricultural harvesting system.
Figure 15:
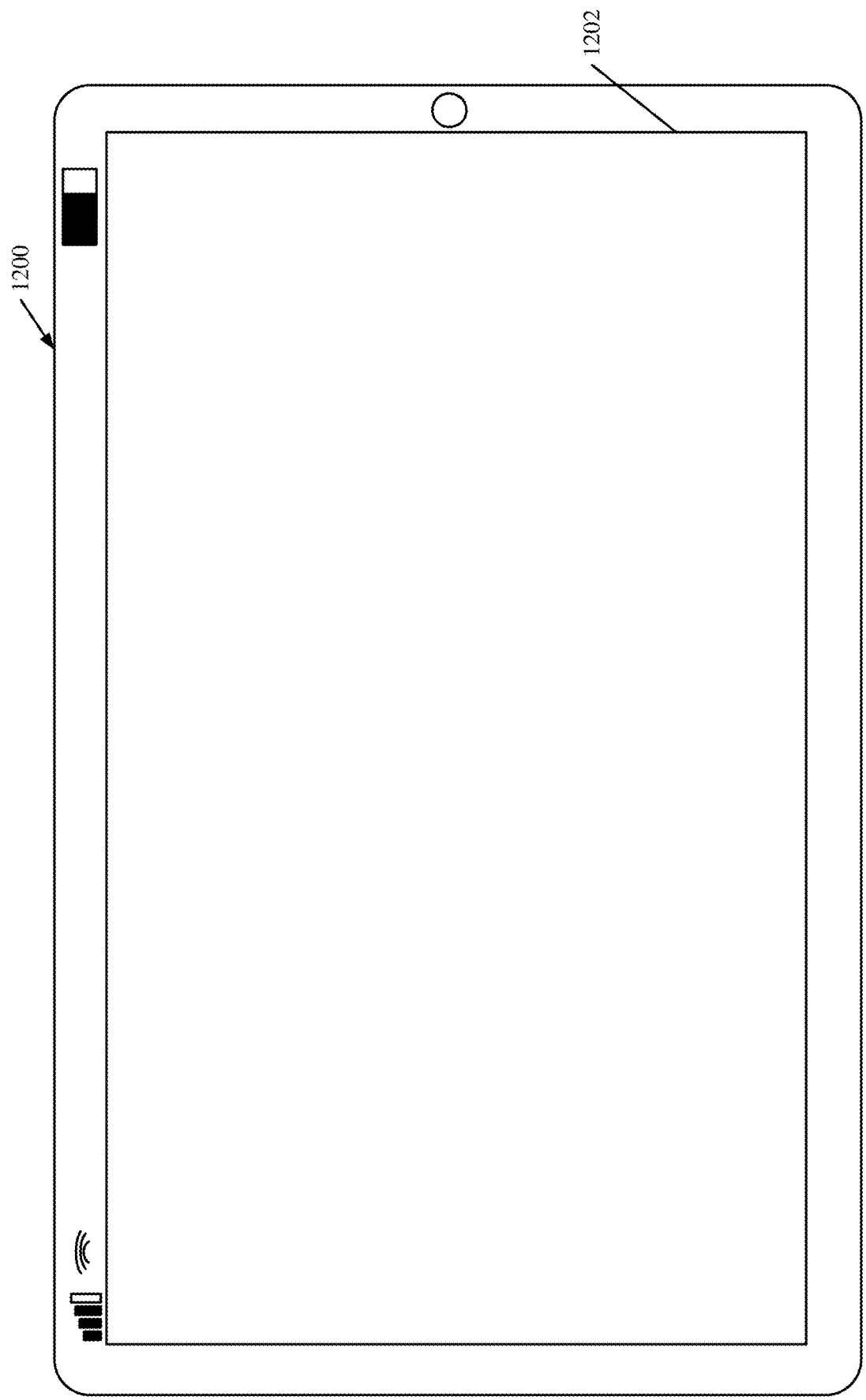
Figure 16:
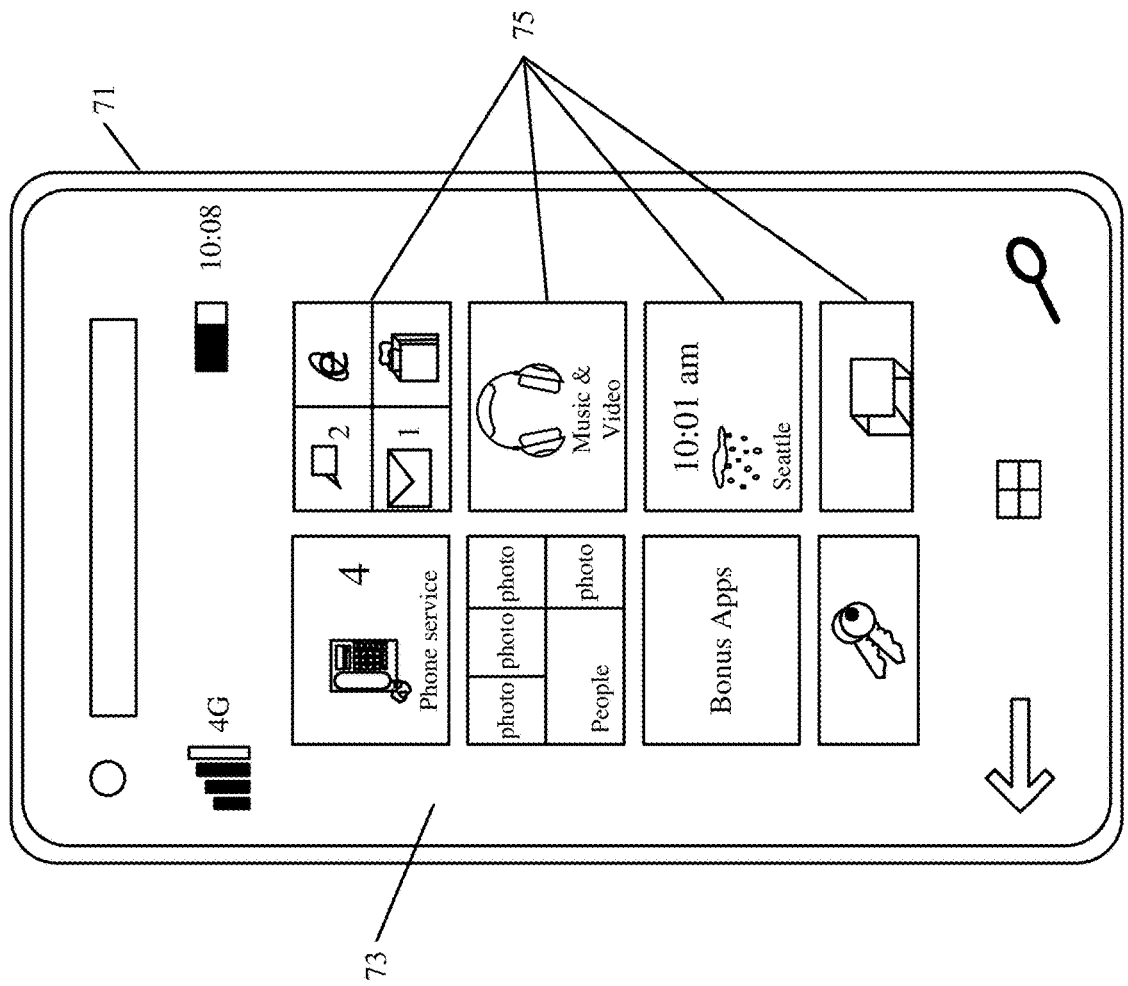

FIG. 14 is a simplified block diagram of one illustrative example of a handheld or mobile computing device that can be used as a user's or client's hand held device 16, in which the present system (or parts of it) can be deployed. For instance, a mobile device can be deployed in the operator compartment of mobile machine 100 for use in generating, processing, or displaying the maps discussed above. FIGS. 15-16 are examples of handheld or mobile devices.

FIG. 14 provides a general block diagram of the components of a client device 16 that can run some components shown in FIG. 2, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 15 shows one example in which device 16 is a tablet computer 1200. In FIG. 15, computer 1200 is shown with user interface display screen 1202. Screen 1202 can be a touch screen or a pen-enabled interface that receives inputs from a pen or stylus. Tablet computer 1200, may also use an on-screen virtual keyboard. Of course, computer 1200 might also be attached to a keyboard or other user input device through a suitable attachment mechanism, such as a wireless link or USB port, for instance. Computer 1200 may also illustratively receive voice inputs as well.

FIG. 16 is similar to FIG. 15 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 17:
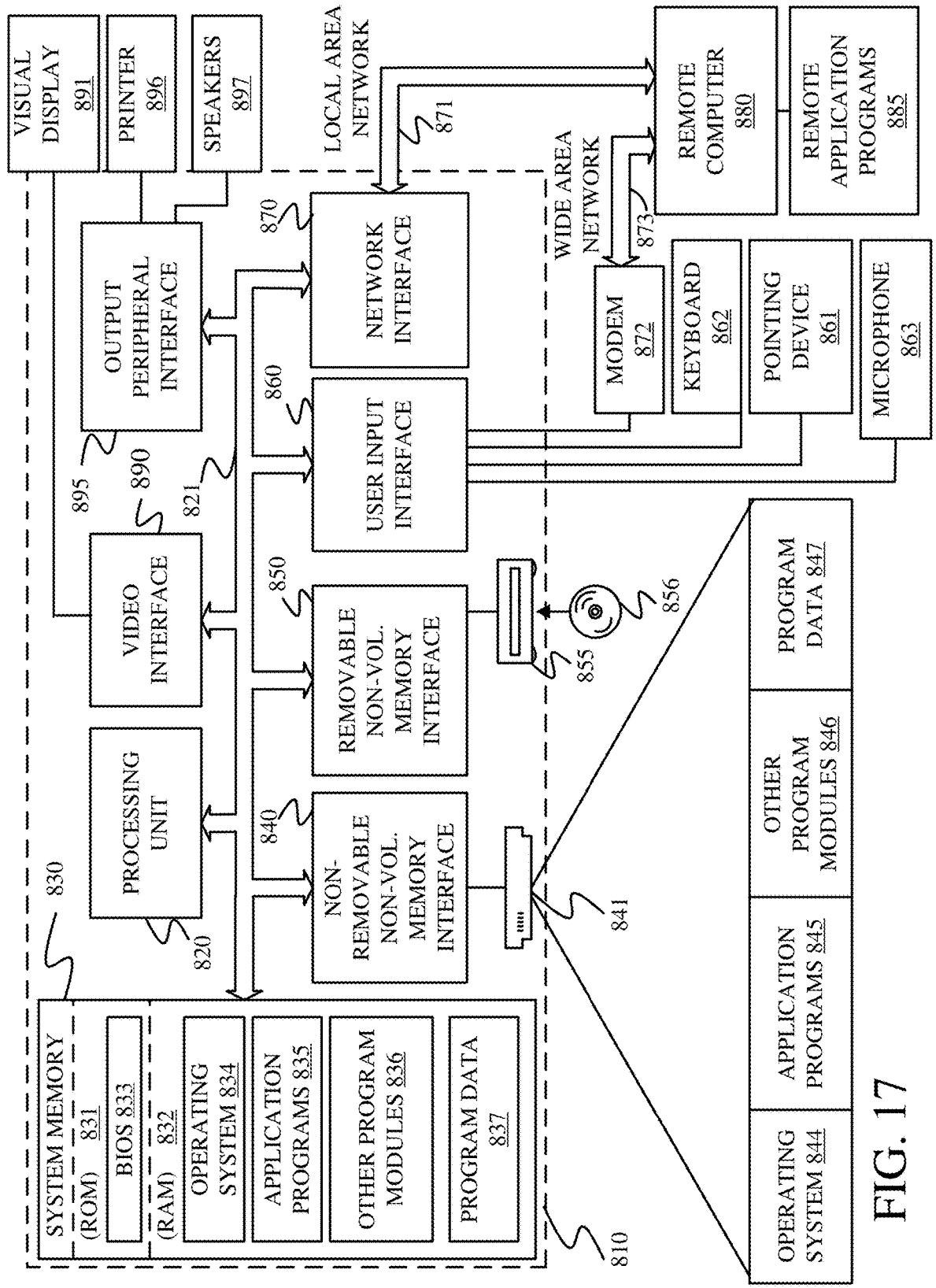
FIG. 17 is a block diagram showing one example of a computing environment that can be used in an agricultural harvesting system.

FIG. 17 is one example of a computing environment in which elements of FIG. can be deployed. With reference to FIG. 17, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in 19 corresponding portions of FIG. 17.

Computer 810 typically includes a variety of computer readable media. Computer readable media may be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory or both such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data or program modules or both that are immediately accessible to and/or presently being operated on by processing unit 820. By way of example, and not limitation, FIG. 17 illustrates operating system 834, application programs 835, other program modules 836, and program data 837.

The computer 810 may also include other removable/non-removable volatile/nonvolatile computer storage media. By way of example only, FIG. 17 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 810. In FIG. 17, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 17 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:
    a control system configured to:
        obtain an input value of a characteristic corresponding to a geographic location;
        obtain a predictive power model, the predictive power model modeling a relationship between values of the characteristic and values of a power characteristic and configured to receive the input value of the characteristic corresponding to the geographic location and output an output value of the power characteristic corresponding to the geographic location; and
        generate a control signal to control a mobile agricultural machine based, at least, on the output value of the power characteristic.

2. The agricultural system of claim 1, wherein the relationship is a predefined model.

3. The agricultural system of claim 1 and further comprising:
    an in-situ power sensor configured to detect values of the power characteristic;
    a predictive model generator that generates the predictive power model based, at least, on the values of the power characteristic detected by the in-situ power sensor.

4. The agricultural system of claim 1 and further comprising:
    an in-situ power sensor configured to detect a value of the power characteristic;
    a predictive model generator configured to:
        obtain an information map that maps values of the characteristic corresponding to different geographic locations, the different geographic locations including the geographic location; and
        generate the predictive power model based, at least, on the value of the power characteristic detected by the in-situ power sensor and a value of the characteristic in the information map; and
    a predictive map generator configured to generate a functional predictive power map of a field that maps predictive values of the power characteristic to at least some of the different geographic locations based on the values of the characteristic in the information map and based on the predictive power model; and
    wherein the control system is configured to generate the control signal based on the functional predictive power map.

5. The agricultural system of claim 1, wherein the control system is further configured to identify a predictive auxiliary operation location indicative of a location where an auxiliary operation is likely to be performed at a field.

6. The agricultural system of claim 1, wherein the control system is configured to identify, as the output value of the power characteristic, a power requirement value indicative of an amount of power required by the mobile agricultural machine.

7. The agricultural system of claim 1, wherein the control signal controls the mobile agricultural machine to adjust a power output of a powerplant subsystem of the mobile agricultural machine.

8. The agricultural system of claim 1, wherein the control signal controls the mobile agricultural machine to charge a storage device of the mobile agricultural machine.

9. The agricultural system of claim 1, wherein the control signal controls the mobile agricultural machine to discharge stored energy from a storage device of the mobile agricultural machine.

10. A method of controlling a mobile agricultural machine, the method comprising:
    obtaining a value of a characteristic corresponding to a geographic location;
    obtaining a value of a power characteristic corresponding to the geographic location;
    generating a predictive model that models a relationship between the characteristic and the power characteristic based on the value of the power characteristic corresponding to the geographic location and the value of the characteristic corresponding to the geographic location, the predictive model configured to obtain, as a model input, an input value of the characteristic and generate, as a model output, a predictive value of the power characteristic based on the relationship between the characteristic and the power characteristic; and
    controlling the mobile agricultural machine based, at least, on the predictive value of the power characteristic.

11. The method of claim 10, wherein obtaining the value of the characteristic corresponding to the geographic location comprises detecting, with an in-situ sensor, the value of the characteristic.

12. The method of claim 10 wherein obtaining the value of the characteristic corresponding to the geographic location comprises obtaining the value of the characteristic from an information map that maps values of the characteristic to different geographic locations including the geographic location, the method further comprising:
    detecting, with an in-situ sensor, the value of the power characteristic corresponding to the geographic location;
    generating the predictive model based, at least, on the value of the power characteristic, detected by the in-situ sensor, corresponding to the geographic location and the value of the characteristic, from the information map, corresponding to the geographic location; and
    generating a functional predictive map, that maps predictive values of the power characteristic to at least some of the different geographic locations based on values of the characteristic in the information map and the predictive model; and wherein controlling the mobile agricultural machine comprises controlling the mobile agricultural machine based on the functional predictive map.

13. The method of claim 10, wherein controlling the mobile agricultural machine comprises controlling the mobile agricultural machine to adjust power output of a powerplant subsystem of the mobile agricultural machine.

14. The method of claim 10, wherein controlling the mobile agricultural machine comprises controlling the mobile agricultural machine to charge a storage device of the mobile agricultural machine.

15. The method of claim 10, wherein controlling the mobile agricultural machine comprises controlling the mobile agricultural machine to discharge stored energy from a storage device of the mobile agricultural machine.

16. A system configured to control a mobile work machine, the system comprising:
  one or more processors; and
  memory storing instructions executable by the one or more processors that, when executed by the one or more processors, configure the system to:
    obtain a value of a characteristic corresponding to a geographic location;
    obtain a predictive model, the predictive model modeling a relationship between values of the characteristic and values of a power characteristic and configured to receive, as an input, the value of the characteristic corresponding to the geographic location and to generate, as an output, a predictive value of the power characteristic corresponding to the geographic location; and
    control the mobile work machine based, at least, on the predictive value of the power characteristic corresponding to the geographic location.

17. The system of claim 16, wherein the instructions, when executed by the one or more processors, configure the system to control the mobile work machine based, at least, on the predictive value of the power characteristic corresponding to the geographic location, by controlling the mobile work machine to adjust a power output of a powerplant subsystem of the mobile work machine based, at least, on the predictive value of the power characteristic corresponding to the geographic location.

18. The system of claim 16, wherein the instructions, when executed by the one or more processors, configure the system to control the mobile work machine based, at least, on the predictive value of the power characteristic corresponding to the geographic location, by controlling the mobile work machine to charge a storage device of the mobile work machine based, at least, on the predictive value of the power characteristic corresponding to the geographic location.

19. The system of claim 16, wherein the instructions, when executed by the one or more processors, configure the system to control the mobile work machine based, at least, on the predictive value of the power characteristic corresponding to the geographic location, by controlling the mobile work machine to discharge stored energy of a storage device of the mobile work machine based, at least, on the predictive value of the power characteristic corresponding to the geographic location.

20. The system of claim 16, wherein the predictive model is a predefined model.

* * * * *